(12) United States Patent
Sanchez et al.

(10) Patent No.: US 11,055,368 B1
(45) Date of Patent: *Jul. 6, 2021

(54) DATABASE SEARCHING BASED ON USER-DEFINABLE PARAMETERS

(71) Applicant: GrowPath, Inc., Durham, NC (US)

(72) Inventors: Eric Jason Sanchez, Cary, NC (US); Jan Schroeder, Chapel Hill, NC (US); Richard Christopher Low, Durham, NC (US)

(73) Assignee: Growpath, LLC, Durham, NC (US)

( * ) Notice: Subject to any disclaimer, the term of this patent is extended or adjusted under 35 U.S.C. 154(b) by 109 days.

This patent is subject to a terminal disclaimer.

(21) Appl. No.: 16/656,474

(22) Filed: Oct. 17, 2019

Related U.S. Application Data

(63) Continuation of application No. 15/697,809, filed on Sep. 7, 2017, now Pat. No. 10,503,790, which is a continuation of application No. 15/434,564, filed on Feb. 16, 2017, now Pat. No. 9,785,312.

(60) Provisional application No. 62/296,595, filed on Feb. 17, 2016.

(51) Int. Cl.
*G06F 16/951* (2019.01)
*G06Q 30/02* (2012.01)

(52) U.S. Cl.
CPC .......... *G06F 16/951* (2019.01); *G06Q 30/02* (2013.01); *G06Q 30/0203* (2013.01)

(58) Field of Classification Search
CPC ... G06F 16/951; G06Q 30/02; G06Q 30/0203
USPC ........................................................ 707/700
See application file for complete search history.

(56) References Cited

U.S. PATENT DOCUMENTS

| | | | |
|---|---|---|---|
| 8,996,391 B2 | 3/2015 | Stibel et al. | |
| 10,157,426 B1 * | 12/2018 | Wang | G06Q 40/123 |
| 2003/0130904 A1 * | 7/2003 | Katz | G06Q 30/0267 |
| | | | 705/26.41 |
| 2005/0047395 A1 * | 3/2005 | Narin | H04M 3/42323 |
| | | | 370/352 |
| 2005/0108103 A1 * | 5/2005 | Roberts | G06Q 30/02 |
| | | | 705/14.44 |
| 2005/0177599 A1 | 8/2005 | Goodman | |
| 2006/0059031 A1 | 3/2006 | Hertel-Szabadi | |
| 2007/0204308 A1 | 8/2007 | Nicholas et al. | |
| 2007/0208573 A1 | 9/2007 | Malden et al. | |

OTHER PUBLICATIONS

Needles Case Management Software for Law Firms, web printed Feb. 16, 2017.
Algoriz lets you build trading algorithms with no coding required, posted Mar. 3, 2017 to Techcrunch.com.

* cited by examiner

*Primary Examiner* — Evan Aspinwall
(74) *Attorney, Agent, or Firm* — Deepak Malhotra; Tara J. Williams

(57) ABSTRACT

A method of evaluating data in a database, the method including causing a workstation to display a graphical user interface which a user can use to create a screening rule by defining at least one screening condition and by entering a score, whether the score is applied to evaluate data in the database if the screening condition is met, whereby no knowledge of a programming language is required to create the screening rule. Other systems and methods are also provided.

20 Claims, 74 Drawing Sheets

FIG. 7

ConverTrack https://intake.upcyclelegal.com/questions.html?utf8=✓&filter[specialty..id]=43

Specialty: [IP Intake for Demonstration - IP ▽] — 292

Position: [4] — 294

Name: [Have you ever seen this invention before?] — 296

Response type: — 298

Lookup:

Code

Show Text On Digest:

Active:

Help Text:

| Test |
| Text Area |
| Number |
| Date |
| Datetime |
| Yes No |
| Select One |
| Group Start |

308

Create Question — 310    Cancel — 312

Screening Rules

| Specialty | Description | Screening Conditions | Score | |
|---|---|---|---|---|
| IP Intake for Demonstration -IP | Description = Mouse Trap | How would you best describe it?: in [ Better than the Mouse Trap ] | 1000 | Edit |
| IP Intake for Demonstration -IP | Description = Not Worth Time | How would you best describe it?: in [ Probably not worth anyone's time ] | -1000 | Edit |
| IP Intake for Demonstration -IP | Description = Potential | How would you best describe it?: in [It has real potential] | 25 | Edit |
| IP Intake for Demonstration -IP | Great Idea = Yes | Do you have a great idea: yes | 50 | Edit |
| IP Intake for Demonstration -IP | Idea = No | Do you have a great idea: no | -1000 | Edit |
| IP Intake for Demonstration -IP | Perfect | Will it generate a lot of revenue?: yes<br>How would you best describe it?: in [ Better than the Mouse Trap ] | 1000000 | Edit |
| IP Intake for Demonstration -IP | Revenue = No | Will it generate a lot of revenue?: no | -50 | Edit |
| IP Intake for Demonstration -IP | Revenue = Yes | Will it generate a lot of revenue?: yes | 25 | Edit |

[ New Screening Rule ]   [ Download CSV ]   [ Download Condition Details CSV ]

Calls

| Started | Line Name | Picked Up At | Station | Duration |
|---|---|---|---|---|
| 12/16/15 04:29:24PM | 5016 | | | |
| 12/16/15 04:28:59PM | Main Number (916-688-4991) 🔍→ | 12/16/15 04:29:01PM | 14104 → | 44s |
| 12/16/15 04:27:13PM | Main Number (916-688-4991) 🔍→ | 12/16/15 04:27:16PM | 14102 → | 142s (2 minutes) |
| 12/16/15 04:26:36PM | 1010 | 12/16/15 04:26:36PM | 14152 → | |
| 12/16/15 04:25:39PM | Main Number (916-688-4991) 🔍→ | 12/16/15 04:25:41PM | 18127 → | 42s |
| 12/16/15 04:25:14PM | 1004 | 12/16/15 04:25:24PM | 13402 → | 22s |
| 12/16/15 04:24:25PM | Main Number (916-688-4991) 🔍→ | 12/16/15 04:24:28PM | 17101 → | 46s |
| 12/16/15 04:23:22PM | Main Number (916-688-4991) 🔍→ | 12/16/15 04:23:24PM | 13102 → | 42s |
| 12/16/15 04:22:07PM | 0498 🔍→ | 12/16/15 04:22:17PM | 18150 → | 68s (1 minutes) |
| 12/16/15 04:21:50PM | 1010 🔍→ | 12/16/15 04:21:55PM | 17300 → | 23s |
| 12/16/15 04:21:45PM | Main Number (916-688-4991) 🔍→ | 12/16/15 04:22:03PM | 18111 → | 522s (9 minutes) |
| 12/16/15 04:21:27PM | Main Number (916-688-4991) 🔍→ | 12/16/15 04:22:02PM | 14108 → | 101s (2 minutes) |
| 12/16/15 04:20:14PM | Main Number (916-688-4991) 🔍→ | 12/16/15 04:20:22PM | 13120 → | 41s |
| 12/16/15 04:20:04PM | Main Number (916-688-4991) 🔍→ | 12/16/15 04:20:06PM | 18150 → | 113s (2 minutes) |
| 12/16/15 04:19:41PM | Fax Server 🔍→ | 12/16/15 04:19:51PM | 14119 → | 69s (1 minutes) |
| 12/16/15 04:18:45PM | Main Number (916-688-4991) 🔍→ | 12/16/15 04:18:49PM | 17200 → | 27s |
| 12/16/15 04:17:08PM | Main Number (916-688-4991) 🔍→ | 12/16/15 04:17:11PM | 18150 → | 23s |
| 12/16/15 04:16:33PM | 4676 🔍→ | | 13102 → | |
| 12/16/15 04:15:49PM | Main Number (916-688-4991) 🔍→ | 12/16/15 04:15:55PM | 13130 → | 21s |
| ... | ... | ... | ... | ... |

Total: 18,240,529,534min (about 34704 years)

Previous 1 2 3 4 5 6 7 8 9 ... 13656 13657 Next→

FIG. 18A

| Caller Number | Caller ID | OAI Call ID | Intake |
|---|---|---|---|
| 17045443503 | Insurers | 1XX5301 | Create Intake |
| 19195258233 | DEE MALHOTRA | 1XX5201 | Create Intake |
| 19195911983 | WIRELESS CALLER | 1XX4*01 | Create Intake |
| 19198143222 | KCDS | 1XX4501 | Create Intake |
| 12523436037 | WIRELESS CALLER | 1XX4001 | Create Intake |
| 19197436185 | NDSG MC IND COM | 1XX3F01 | Create Intake |
| 12522887726 | WIRELESS CALLER | 1XX3901 | Create Intake |
| 12522539311 | WIRELESS CALLER | 1XX3201 | Create Intake |
|  |  | 1XX2#01 | Create Intake |
| 19198143222 | KCDS | 1XX2501 | Create Intake |
| 19104018065 | WIRELESS CALLER | 1XX2201 | Create Intake |
| 19192653069 | NADIA YUNIKOV | 1XX2101 | Create Intake |
| 19602377282 | UNKNOWN NAME | 1XX1801 | Create Intake |
| 18004422075 | UNKNOWN NAME | 1XX1701 | Create Intake |
| 16032451054 | CARCO | 1XX1301 | Create Intake |
| 19192693135 | MICHAEL SMITH | 1XX0P01 | Create Intake |
| 19199045134 | WIRELESS CALLER | 1XX0*01 | Create Intake |
| 19199415549 | FAMILY DENTAL | 1XX0501 | Create Intake |
| 19193230722 | WIRELESS CALLER | 1XX0201 | Create Intake |
| ... | ... | ... | ... |

FIG. 18B

| FIG. 19A | FIG. 19B | FIG. 19 |
|---|---|---|

| Case Admin | 550 ▸ General | ▸ Configure 574 |
|---|---|---|
| Checklists 570 Client | ∧ Name 572 | Checklistable Type |
| James Scott Farrin 552 | ED - Appraiser | Involvement |
| James Scott Farrin 553 | ED - Condemnation | Case |
| James Scott Farrin 554 | ED - Demand | Case |
| James Scott Farrin 555 | ED - Discovery (fr Nor) | Case |
| James Scott Farrin 556 | ED - Discovery (to Nor) | Case |
| James Scott Farrin 557 | ED - Initial | Case |
| James Scott Farrin 558 | ED - Mediation | Case |
| James Scott Farrin 559 | ED - NEG | Case |
| James Scott Farrin 560 | ED - Pre-DMD-Review | Case |
| James Scott Farrin 561 | ED - PRR | Case |
| James Scott Farrin 562 | ED - Rec'd Complaint | Case |
| James Scott Farrin 563 | ED - Trial | Case |
| James Scott Farrin 564 | ED - WOC | Case |
| James Scott Farrin 565 | PI - ALL-Defendant DWI | Case |
| James Scott Farrin 566 | PI - ALL-Property Damage | Case |

| | | |
|---|---|---|
| Operations  🏠 ▦ 👤 🔍 👥 📄 ☺ ▸EJS | | HELP |

576 ↗

Filter condition      582

-Select Checklistable ▲
Type-

[ ]

Case
Record Request
Insurance Policy
Involvement
Note

- Case Practice Area:ED
- Involvement Type:["Appraiser-Condemnors", "Appraiser-PO"]

- Case Practice Area:ED
- Case DOI during:["after"=>"01/01/0001","before"=>" "]

- Case Practice Area:ED

- Case Practice Area:ED      2      Edit
- Case DOI during:["after"=>" ","before=>"01/01/0001"]

- Case Practice Area:ED      4      Edit
- Case DOI during:["after"=>" ","before"=>"01/01/0001"]

- Case Practice Area:ED      3      Edit    580

- Case Practice Area:ED      5      Edit
- Case Question ID answered: 109
- Case DOI during:["after"=>" ","before"=>01/01/0001"]

- Case Practice Area:ED      1      Edit
- Case Status:["Neg"]

- Case Practice Area:ED      2      Edit
- Case Status:["HDP"]

- Case Practice Area:ED      5      Edit

- Case Practice Area:ED      5      Edit
- Case DOI during:["after"=>" ","before"=>01/01/0001"]

- Case Practice Area:ED      9      Edit
- Case Question ID answered: 152
- Case DOI during:["after"=>" ","before"=>01/01/0001"]

- Case Practice Area:ED      2      Edit
- Case Status:["WOC"]

- Case Question ID answered: 428      1      Edit
- Case Practice Area:PI

- Case Practice Area:PI      1      Edit
- Case Question ID answered: 419

| Checklists 570 Client | 572 ^ Name | Checklistable Type |
|---|---|---|
| James Scott Farrin | ED - Condemnation | Case |
| James Scott Farrin | ED - Demand | Case |
| James Scott Farrin | ED - Discovery (fr Nor) | Case |
| James Scott Farrin | ED - Discovery (to Nor) | Case |
| James Scott Farrin | ED - Initial | Case |
| James Scott Farrin | ED - Mediation | Case |
| James Scott Farrin | ED - NEG | Case |
| James Scott Farrin | ED - Pre-DMD-Review | Case |
| James Scott Farrin | ED - PRR | Case |
| James Scott Farrin | ED - Rec'd Complaint | Case |
| James Scott Farrin | ED - Trial | Case |
| James Scott Farrin | ED - WOC | Case |
| James Scott Farrin | PI - ALL-Defendant DWI | Case |
| James Scott Farrin | PI - ALL-Property Damage | Case |
| James Scott Farrin | PI - ALL-WOM | Case |

FIG. 20A

|  | Eric | − | ☐ | ✕ |

√&filter%5Bchecklistable_type%5D=Casey%3A%3Acase 576      580

← ▸ Operations   [⌂] [▦] [☻] [🔍] [☻/🏠] [▭] [☺] ▸EJS   HELP

582 — Case   ✕ ▽

Filter condition     578 — Checklist Items

| Filter condition | Checklist Items | |
|---|---|---|
| • Case Practice Area:ED<br>• Case DOI during:["after"=>"01/01/0001","before"=>" "] | 12 | Edit |
| • Case Practice Area:ED | 6 | Edit |
| • Case Practice Area:ED<br>• Case DOI during:["after"=>" ","before"=>"01/01/0001"] | 2 | Edit |
| • Case Practice Area:ED<br>• Case DOI during:["after"=>" ","before"=>"01/01/0001"] | 4 | Edit |
| • Case Practice Area:ED | 3 | Edit |
| • Case Practice Area:ED<br>• Case Question ID answered: 109<br>• Case DOI during:["after"=>" ","before"=>01/01/0001"] | 5 | Edit |
| • Case Practice Area:ED<br>• Case Status:["Neg"] | 1 | Edit |
| • Case Practice Area:ED<br>• Case Status:["HDP"] | 2 | Edit |
| • Case Practice Area:ED | 5 | Edit |
| • Case Practice Area:ED<br>• Case DOI during:["after"=>" ","before"=>01/01/0001"] | 5 | Edit |
| • Case Practice Area:ED<br>• Case Question ID answered: 152<br>• Case DOI during:["after"=>" ","before"=>01/01/0001"] | 9 | Edit |
| • Case Practice Area:ED<br>• Case Status:["WOC"] | 2 | Edit |
| • Case Question ID answered: 418<br>• Case Practice Area:PI | 1 | Edit |
| • Case Practice Area:PI<br>• Case Question ID answered: 429 | 1 | Edit |
| • Case Practice Area:ED<br>• Case Status:["WOM"] | 4 | Edit |

| | | | | | |
|---|---|---|---|---|---|
| Id (600) | Checklist template (602) | Position (604) | Name (606) | Filter condition (608) | Trigger method (610) |
| 373 / 584 | ED-Condemnation | 0 | Appraiser | | |
| 375 / 585 | ED-Condemnation | 0 | Discovery (from Nor) | | |
| 472 / 586 | ED-Condemnation | 0 | Discovery Served on Condemnor | | |
| 474 / 587 | ED-Condemnation | 0 | Discovery to Client for review | • Question ID date answer during: Answer for Question 114 is after "14 days ago" | |
| 374 / 588 | ED-Condemnation | 0 | Discovery (to Nor) | | |
| 471 / 589 | ED-Condemnation | 0 | Draft Discovery | | |
| 475 / 590 | ED-Condemnation | 0 | Draft Extension of Time for Discovery | • Case Question ID answered: 114 | |
| 376 / 591 | ED-Condemnation | 0 | Mediation | | |
| 473 / 592 | ED-Condemnation | 0 | Nor Discovery to Atty for Review | • Case Question ID answered: 114 | |
| 372 / 593 | ED-Condemnation | 0 | Received Complaint | | |
| 476 / 594 | ED-Condemnation | 0 | Send Extension of Time for Discovery | | |
| 377 / 595 | ED-Condemnation | 0 | Trial | | |

New Checklist Item (583)

FIG. 21A

| | | | | | | | | |
|---|---|---|---|---|---|---|---|---|
| | | | | | Name | Child Item Of | Select Parent Checklist Item ▼ ☐ Roots only Only | |
| Days due (612) | Repeating (614) | Limi-tations (616) | Keep once triggered (618) | Assignee/ Assgn. Inv. Type (620) | Mail merge template (622) | Parent (624) | Children (626) | Comment (628) |
| 0 | No | No | No | Primary Paralegal | | | 0 | Edit (630) |
| 0 | No | No | No | Primary Paralegal | | | 0 | Edit |
| 7 | No | No | No | Primary Paralegal | | Draft Discovery | 0 | Edit |
| 0 | No | No | No | Primary Paralegal | | | 0 | Edit |
| 0 | No | No | No | Primary Paralegal | | | 0 | Edit |
| 30 | No | No | No | Primary Paralegal | | Received Complaint | 1 | Edit |
| 0 | No | No | No | Primary Paralegal | | | 1 | Edit |
| 0 | No | No | No | Primary Paralegal | | | 0 | Edit |
| 0 | No | No | No | Primary Paralegal | | | 0 | Edit |
| 0 | No | No | No | Primary Paralegal | | | 1 | Edit |
| 7 | No | No | No | Primary Paralegal | | Draft Extension of Time for Discovery | 0 | Edit |
| 0 | No | No | No | Primary Paralegal | | | 0 | Edit |

Displaying all 12 Checklist Items

[Eric]

Limitation          Keep once triggered
☐                   ☐

Aria:ED      - Case DOI during: ["after"=>"01/01/0001","before"=>""] ).

only when the parent task is
will be the completion date

If the Trigger Method is provided, the Due Date will be Days Due after the date returned by sending that trigger method to the Case. If no date is returned, the calculation is based on the date that this task becomes applicable.

If no Trigger Method is provided, and this Checklist Item has a Parent Checklist Item, the Due Date calculation is based on the Completion Date of the parent.

Otherwise the Due Date is will be Days Due after the day that the task is being created (the day the checklist template item first becomes applicable).

Leave blank if no Mail Merge should be triggered.
Only Mail Merges applicable to Cases are available.
Mail Merges might trigger a Record Request, but this is up to the Mail Merge Template itself!

[Cancel] [Delete]

Created by EJS on 12/01/2016 at 08:46am
Updated by EJS on 12/01/2016 at 08:59am

Casee

← → C ⟳ | 🔒 Secure | https://farrin.caseesoftware.com/checklist_template_items?filter%5Bchecklist_template_id%5D=42

☐ Bookmarks  ☐ConverTrack  ❀ConverTrack  ❀Casee  ❀STAGING  ❀Audit Logs

Checklist Items for Checklist "ED-Condemnation"
for Checklist Type Case — 640

Position — 643    Name — 644
[0]    [Draft Discovery]

Additional Conditions for Qualifying Cases
Note: This Checklist Item is only applicable if all Filter condition are fulfilled in addition to Checklist's Filter condition ( - Case Practice Add Rule — 648    450    652    If you pick a Parent, this Checklist Item will be applicable
Parent Checklist Item                    completed. The default Trigger Method (when left blank
[Received Complaint  ▾]  [× ▾]           of the Parent Checklist Item.

Who will be assigned to the Task
[Primary Paralegal  ▾]   OR   [Staff Person  ▾]

When is the Task due?
Days due    Trigger method                              Repeating
[30]  days after   [_____▾]  of the Case.   ☐ — 657
      654                ↓ 656
                   ┌─────────────────────────────┐
                   │ ▾                       ▓▾ │
                   │ case_close_date          ▓  │
                   │ case_date_of_incident    ▓  │
                   │ case_date_of_incident_change│
                   │ case_open_date              │
                   │ closed_on                   │
                   │ created_at                  │
                   │ explicit_statute_of_limitations_on│
                   │ status_change_date          │
                   └─────────────────────────────┘
When Task completed
Mail merge template                             [Update Checklist Item]

FIG. 25A

| FIG. 25A | FIG. 25B | FIG. 25

Limitation     Keep once triggered

Aria:ED    - Case DOI during: ["after"=>"01/01/0001","before"=>" "] ).

only when the parent task is
will be the completion date

If the Trigger Method is provided, the Due Date will be Days Due after the date returned by sending that trigger method
to the Case. If no date is returned, the calculation is based on the date that this task becomes applicable.

If no Trigger Method is provided, and this Checklist Item has a Parent Checklist Item, the
Due Date calculation is based on the Completion Date of the parent.

Otherwise the Due Date is will be Days Due after the day that the task is being created (the
day the checklist template item first becomes applicable).

Leave blank if no Mail Merge should be triggered.
Only Mail Merges applicable to Cases are available.
Mail Merges might trigger a Record Request, but this is up to the Mail Merge Template itself!

[Cancel] [Delete]     Created by EJS on 12/01/2016 at 08:46am
    Updated by EJS on 12/01/2016 at 08:59am

□ Limitation   Keep once triggered
                □

Aria:ED   Case DOI during: ["after"=>"01/01/0001","before"=>" " ] ).

only when the parent task is
will be the completion date

If the Trigger Method is provided, the Due Date will be Days Due after the date returned by sending that trigger method
to the Case. If no date is returned, the calculation is based on the date that this task becomes applicable.

If no Trigger Method is provided, and this Checklist Item has a Parent Checklist Item, the
Due Date calculation is based on the Completion Date of the parent.

Otherwise the Due Date is will be Days Due after the day that the task is being created (the
day the checklist template item first becomes applicable).

Leave blank if no Mail Merge should be triggered.
Only Mail Merges applicable to Cases are available.
Mail Merges might trigger a Record Request, but this is up to the Mail Merge Template itself!

Cancel  Delete                                    Created by EJS on 12/01/2016 at 08:46am
                                                  Updated by EJS on 12/01/2016 at 08:59am

FIG. 26B

| FIG. 27A | FIG. 27B |
|---|---|
| FIG. 27C | FIG. 27D |

FIG. 27B

| | | | | | | |
|---|---|---|---|---|---|---|
| 1165411 | DMD | L1 | 10/19/2016 | CDJ | | |
| 1165335 | WOO | L2 | 10/19/2016 | FOG | | |
| 1165356 | WOO | L2C | 10/19/2016 | EPH | | |
| 1165379 | PDI | L1 | 10/20/2016 | AFR | | |
| 1165390 | TRE | L1 | 10/20/2016 | FOG | | |
| 1165378 | CHK | L1 | 10/20/2016 | AFR | | |
| 1165400 | WOM | L2 | 10/20/2016 | MLS | | |
| 1165387 | WOO | L1 | 10/24/2016 | AFR | | |
| 1165406 | TRE | L1 | 10/24/2016 | MLS | | |
| 1165454 | TRE | L2 | 10/25/2016 | MLS | | |
| 1163904 | CHK | L2 | 06/01/2016 | AFR | | |
| 1164557 | SA | L2 | 08/02/2016 | AFR | | |
| 1164598 | CHK | L2C | 08/04/2016 | EPH | | |
| 1164693 | CLR | L2 | 08/12/2016 | AFR | | |
| 1164695 | WOO | L2 | 08/13/2016 | AFR | | |
| 1165012 | SET | L2 | 09/14/2016 | AFR | | |
| 1165093 | WOO | L2 | 09/21/2016 | AFR | | |
| 1165191 | SA | L2 | 09/30/2016 | AFR | | |
| 1165792 | WOO | L2 | 11/22/2016 | AFR | | |
| 1165793 | WOO | L2 | 11/22/2016 | AFR | | |

FIG. 27D

| FIG. 29A | FIG. 29B |
| FIG. 29C | FIG. 29D |

| name%5D=Example | | | Alert filter conditions | Columns | |
|---|---|---|---|---|---|
| | | | | case_status, case_type, case_open_date, attorney | |
| | | | | case_status, case_type, case_open_date, attorney | |

FIG. 29B

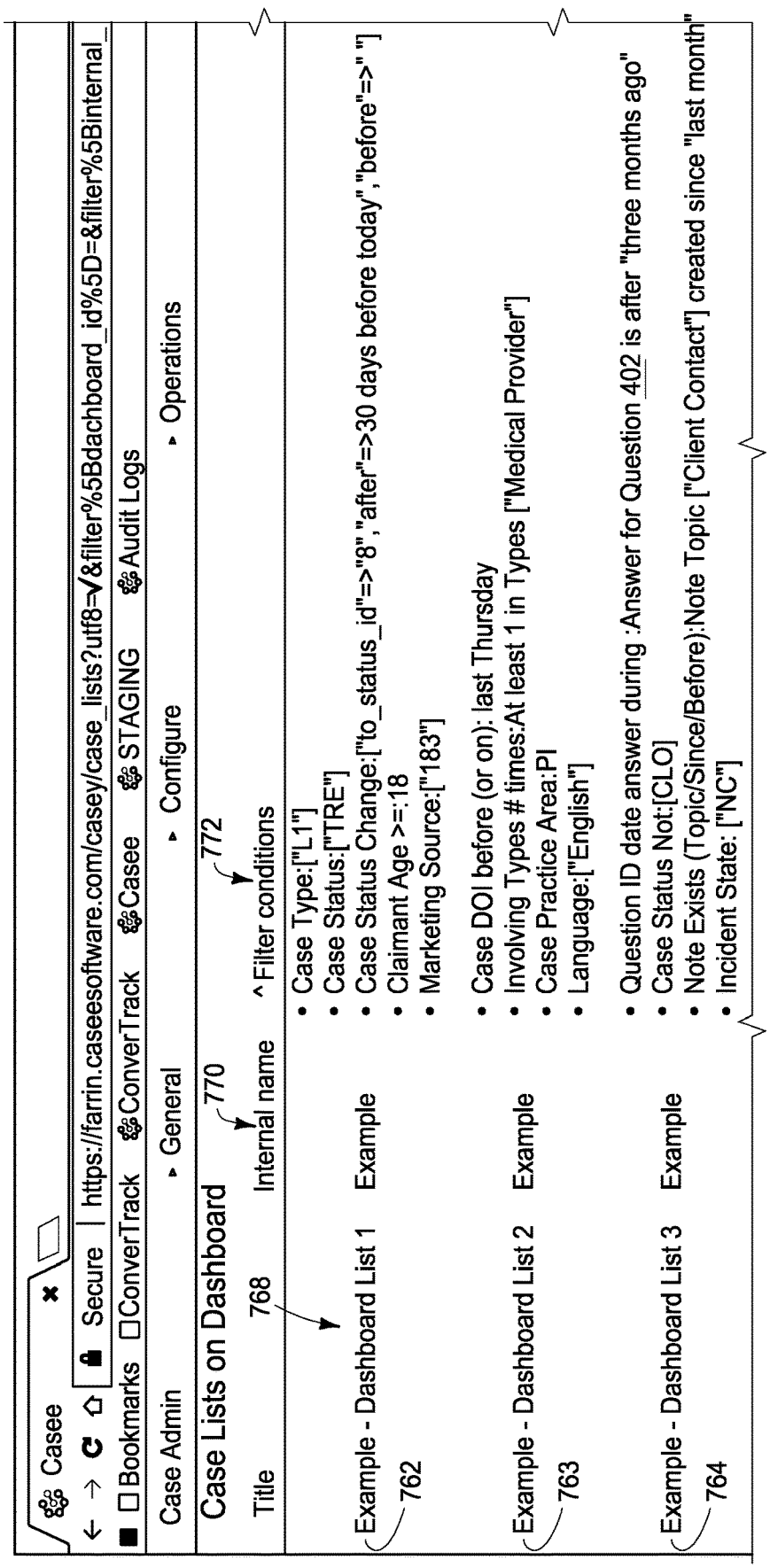
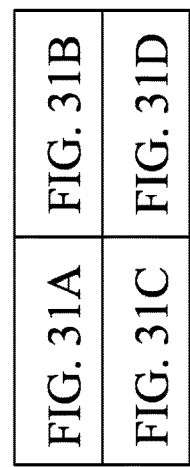
FIG. 31A

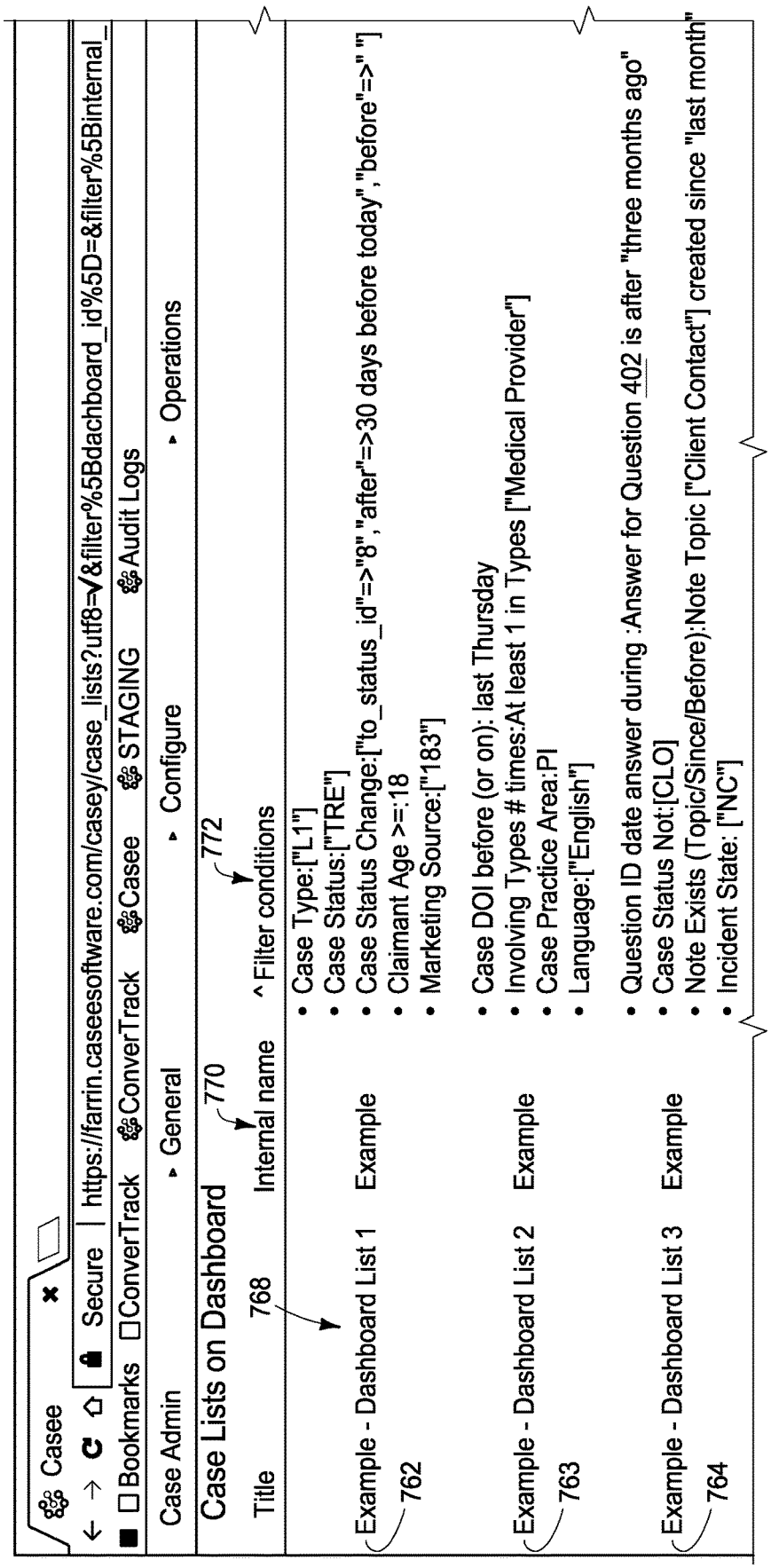
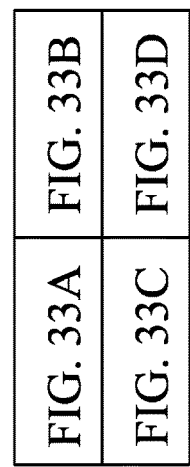
FIG. 33A

Example - Dashboard List 4   Example
765

- Marketing Source: ["172"]
- Language: ["Spanish"]
- Case Type:["L2","L2C"]

Title
Example - Dashboard

Internal name
Example

Columns
[x case_status] [x case_type] [x case_open_date] [x attorney]
                    908

Sort By
case_open_date  x

Filter condition
- Case Type  x

LS
  WCN
  WDN
  L1
  L2C
  L3C
  WP3
  SS

906

Add Rule

New Case List for Dashboard

FIG. 33C

Example - Dashboard List 4   Example
765
- Marketing Source: ["172"]
- Language: ["Spanish"]
- Case Type: ["L2","L2C"]

Title
Example - Dashboard

Internal name
Example

Columns
[× case_status] [× case_type] [× case_open_date] [× attorney]

Filter condition  908
- Case Type  [× ▽]   [× L1]    906  ⓘ
                     CLO
                     INV      910
                     WOM
                     ADR
                     LIT
                     BHD
                     FDC
                     DHG
- Case Status [× ▽]
  912

Add Rule

Sort By
case_open_date [× ▽]

New Case List for Dashboard

FIG. 34C

Example - Dashboard List 4  Example
— 765
- Marketing Source: ["172"]
- Language: ["Spanish"]
- Case Type:["L2","L2C"]

Title
[ Example - Dashboard ]

Internal name
[ Example ]

Columns
[ ×case_status ] [ ×case_type ] [ ×case_open_date ] [ ×attorney ]

Sort By
[ case_open_date          × ▽ ]

Filter condition
— 908

- Case Type          [ ×L1                    × ▽ ]
                                              — 906
- Case Status      [ ×TRE                   × ▽ ]   ⓘ
  — 912                                              Enter a relative date or an absolute date.
- Case Status Change  [ TRE              × ▽ ]      View Examples
  — 916                                              This would currently resolve to
                   — 914                              12/31/2016 08:00:00PM
                   [ 30 days before today ] ?   [ Before (leave blank for "Unlimited") ] ?
                                                                                            — 910

Add Rule

[ New Case List for Dashboard ]

FIG. 35C

| FIG. 36A | FIG. 36B |
| --- | --- |
| FIG. 36C | FIG. 36D |

DATABASE SEARCHING BASED ON USER-DEFINABLE PARAMETERS

CROSS REFERENCE TO RELATED APPLICATION

This is a continuation of copending U.S. patent application Ser. No. 15/697,809, filed Sep. 7, 2017, which in turn is a continuation of U.S. patent application Ser. No. 15/434,564, filed Feb. 16, 2017 (now U.S. Pat. No. 9,785,312), which in turn claims priority to U.S. Provisional Patent Application Ser. No. 62/296,595 filed Feb. 17, 2016, all of which name Sanchez et al as inventors, and all of which are incorporated herein by reference.

TECHNICAL FIELD

The technical field comprises telephonic communications. The technical field also comprises database and file management. The technical field also comprises operator interface processing.

BACKGROUND

Making sound business decisions in virtually every arena, operationally, strategically, and the like, involves the need to analyze data. Now, more than ever, the need is great. The amount of data captured increases and the ability to analyze the masses of data becomes more and more complex. The ability to effectively and correctly analyze data is further hindered by the various, and sometimes incompatible, sources which house the data. For example, data related to operations is not automatically tied to financial data (marketing and profit).

Typically, the ability to analyze data involves complex maneuvers, complex algorithms and multi-layered queries to access data in its various forms, to accumulate the data, and to present data in a user-friendly format.

SUMMARY

Various embodiments provide a logic tool that enables individual users to create a multitude of logic statements, each with multiple conditions to create a logic hierarchy. Further, each limiting condition comprises a multitude of factors. Collectively the logic conditions and factors drive action to obtain a particular result. In various embodiments, the logic tool enables an individual to create logic statements without any programming knowledge or ability. In some embodiments, it enables logic statements to be implemented within a program or database without hard coding. In some embodiments, it enables flexibility for creating on-demand queries based on business workflow needs in the form of a multitude of checklists with multitude of reminders, and a multitude of dashboards with a multitude of panels. Various different logic tool embodiments are described below in greater detail.

Some embodiments provide a screening customized tool for a database which enables users to assign mathematical values or scores to text, numeric fields or database events (e.g., time values), to evaluate a set of circumstances. In response to the evaluation, recommendations are made, actions determined, or actions are automatically performed. The tool allows users to adjust values and scoring based on personal preference, or externally-driven parameters. In some embodiments, a user is endowed with the ability to engage complex algorithms without possessing advanced skills or training in mathematics or computer science.

In some embodiments, a user can assign mathematical values to text or numeric fields within the context of a questionnaire used to evaluate whether to accept a potential customer. In a more particular embodiment, a user can assign mathematical values to text or numeric fields within the context of a questionnaire used to evaluate a potential legal customer or their claim (cause of action) in a particular legal setting. Each field score may be aggregated to form a larger score. The user can adjust values based on laws in a specific jurisdiction or on personal preference. Customized parameters can form the basis for action recommendations or can result in automated action set by the user. In various embodiments, the user may vary values or aggregate scoring or both to form complex algorithms without any advanced training in mathematics or computer science.

Various embodiments provide systems and methods for a user to develop and define their own scoring values to define complex systems to evaluating legal causes of action. This objective is accomplished, in some embodiments, by providing within the database a user-definable form with which a user can create questions and ascribe scores depending on the answers to the questions. Scores are aggregated as each question is answered on the form to define a unique score for each potential client. The unique score is stored within several tables inside of the database and is visible on each potential client's claim form. The score is automatically calculated based on the values ascribed by the user to each question created by the user.

Some embodiments provide a method of evaluating data in a database, the method including causing a workstation to display a graphical user interface which a user can use to create a screening rule by defining at least one screening condition and by entering a score, whether the score is applied to evaluate data in the database if the screening condition is met, whereby no knowledge of a programming language is required to create the screening rule.

Other embodiments provide a system including: a PBX configured to be coupled to at least one phone line; an OAI gateway coupled to the PBX server and configured to provide an interface between the PBX and a network; a main server coupled to the OAI gateway via the network, and configured to be accessed by client workstations, the server including: an OAI listener coupled to the OAI gateway; a notification server coupled to the OAI listener; a memory defining a database and coupled to the OAI listener; and an intake application server coupled to the database; the main server being configured to present to a workstation a user-fillable intake form having a plurality of questions, and the main server configured to receive answers to the questions from the workstation, and to present a score total to the workstation indicating whether to accept the potential customer, the score total varying depending on the received answers; the main server being configured to provide, to the workstation, an interface which an administrator can use to create a screening rule by defining a question for the intake form, by providing potential answers to the question, and by providing different scores for the respective different potential answers; the system being configured to perform an automated action in response to the score total being at least one of above and below a predetermined threshold value.

Other embodiments provide a system including: a PBX configured to be coupled to at least one phone line having multiple different channels to receive incoming phone calls from potential customers, the different channels coupling to the PBX different phone numbers to be called by potential customers; an OAI gateway coupled to the PBX server and configured to provide an interface between the PBX and a network; a server coupled to the OAI gateway via the network, and configured to be accessed by client workstations, the server including: an OAI listener coupled to the OAI gateway; and a memory defining a database and coupled to the OAI listener; the server being configured to present to a workstation a user-fillable intake form having a plurality of questions, the form varying depending on the phone number called by the potential customer, and the server configured to receive answers to the questions from the workstation, and to present a score total to the workstation indicating whether to accept the potential customer, the score total varying depending on the received answers; the server being configured to provide, to the workstation, an interface which an administrator can use to create a screening rule by defining a question for the intake form, by providing potential answers to the question, and by providing different scores for the respective different potential answers; the system being configured to perform an automated action in response to the score total being at least one of above and below a predetermined threshold value.

Still other embodiments provide a system including: a PBX configured to be coupled to at least one phone line; an OAI gateway coupled to the PBX server and configured to provide an interface between the PBX and a network; a server coupled to the OAI gateway via the network, and configured to be accessed by client workstations, the server including: an OAI listener coupled to the OAI gateway; and a memory defining a database and coupled to the OAI listener; the server being configured to present to a workstation a user-fillable intake form having a plurality of questions, and the server configured to receive answers, input by a clerk, to the questions from the workstation, and to present a score total to the workstation indicating the desirability of the potential customer, the score total varying depending on the received answers; the server being configured to provide, to the workstation, an interface which an administrator can use to create a screening rule by adding at least one condition and entering a rule score to be applied if all conditions of the screening rule are met, the rule score being used as a component to calculate the total score for indicating the desirability of the potential customer, the server being configured to authenticate the administrator and the clerk with user IDs and passwords and being configured to provide greater access to the database to the administrator than to the clerk, wherein adding a condition includes: selecting a question from a list of questions, the list including the intake form questions; selecting an operator from a list of operators; and selecting a response from a list of responses, and choosing a question type from a plurality of predetermined possible types.

BRIEF DESCRIPTION OF THE VIEWS OF THE DRAWINGS

Figure 7:
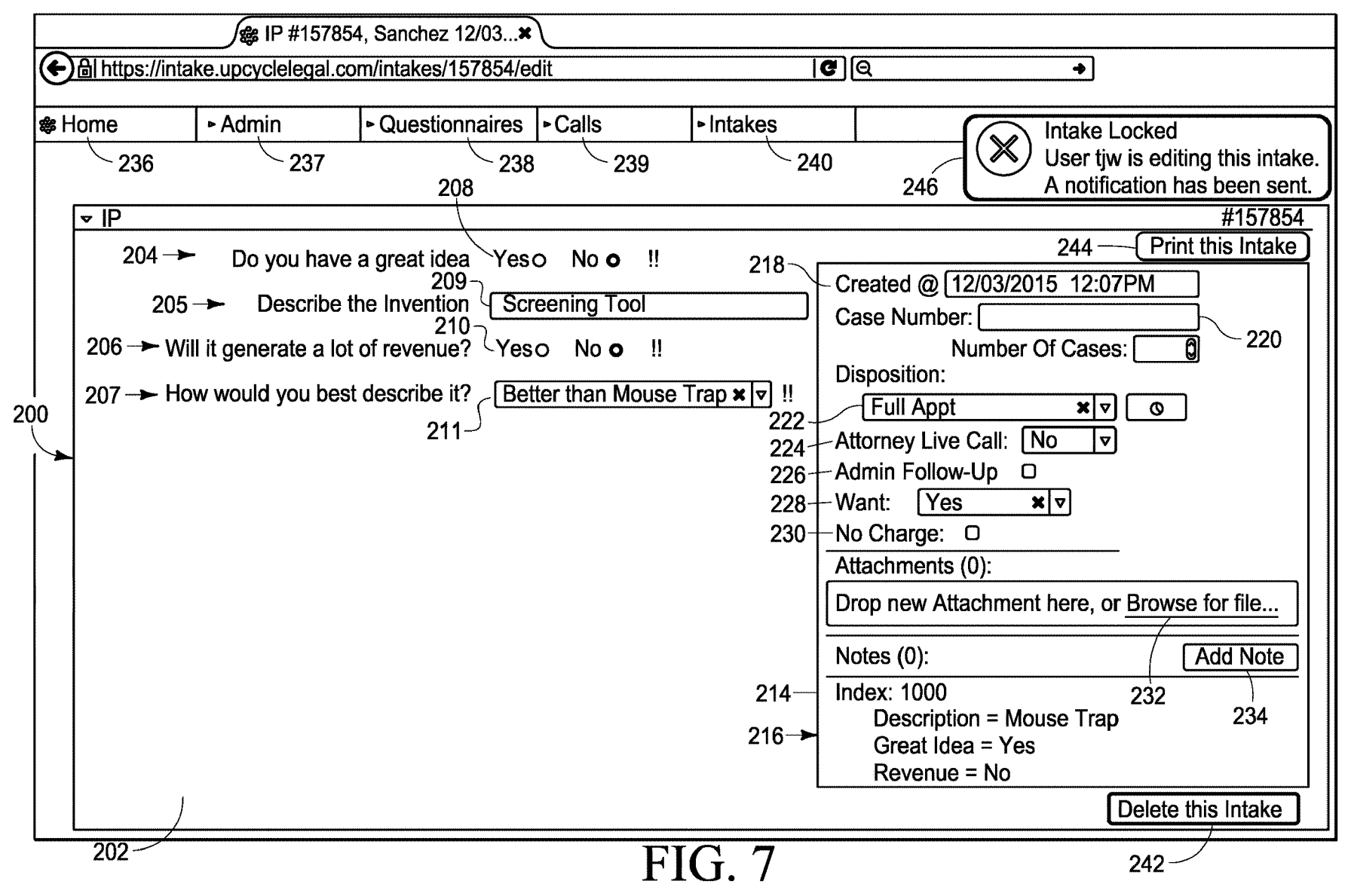

FIG. 7 is a screen shot illustrating a graphical user interface for inputting intake questionnaire screening information, using the system of FIG. 1, in accordance with various embodiments.

FIG. 10 is a screen shot illustrating the graphical user interface of FIG. 9 being filled out, in accordance with some embodiments.

FIG. 14 is a screen shot illustrating a graphical user interface for inputting intake questionnaire screening information, similar to FIG. 7, after a question has been added, in accordance with various embodiments.

FIG. 15 is a screen shot illustrating a graphical user interface for inputting client or customer information, associated with the questionnaire of FIG. 14.

FIG. 16A is a portion of a screen shot illustrating a graphical user interface for viewing, adding, or editing questions used in connection with the screening rules of FIGS. 11-13.

FIG. 16B is a second portion of the screen shot of FIG. 16B.

FIG. 17 is a screen shot illustrating a graphical user interface for viewing, adding, or editing the screening rules of FIGS. 11-13.

FIG. 18 is a map illustrating how FIGS. 18A and 18B are to be assembled.

FIG. 18A is a portion of a screen shot illustrating a graphical user interface for displaying calls received by the system of FIG. 1 and for starting intake questionnaires for calls.

FIG. 18B is a second portion of the screen shot of FIG. 18A.

FIG. 19 is a map illustrating how FIGS. 19A and 19B are to be assembled.

FIG. 19A is a portion of a screen shot illustrating a graphical user interface listing a plurality of checklists in a law firm case management system hosted by the server of FIG. 5 or a different server.

FIG. 19B is a second portion of the screen shot of FIG. 19A.

FIG. 20 is a map illustrating how FIGS. 20A and B are to be assembled.

FIG. 20A is a portion of a screen shot illustrating the graphical user interface of FIGS. 19A and 19B after a checklist type has been selected.

FIG. 20B is a second portion of the screen shot of FIG. A.

FIG. 21 is a map illustrating how FIGS. 21A and 21B are to be assembled.

FIG. 21A is a portion of a screen shot illustrating a graphical user interface listing a plurality of checklist items included in one of the checklists of FIGS. 19A and 19B.

FIG. 21B is a second portion of the screen shot of FIG. 21A.

FIG. 22 is a map illustrating how FIGS. 22A and 22B are to be assembled.

FIG. 22A is a portion of a screen shot illustrating a graphical user interface showing logic details of one of the checklist items of FIGS. 21A and 21B.

FIG. 22B is a second portion of the screen shot of FIG. 22A.

FIG. 23 is a map illustrating how FIGS. 23A and 23B are to be assembled.

FIG. 23A is a portion of a screen shot illustrating a graphical user interface showing a case type being added to the logic of the checklist item of FIGS. 22A and 22B.

FIG. 23B is a second portion of the screen shot of FIG. 23A.

FIG. 24 is a map illustrating how

FIG. 24A is a portion of a screen shot illustrating a graphical user interface showing a condition pull down menu being pulled down from the graphical user interface of FIGS. 23A and 23B.

FIG. 24B is a second portion of the screen shot of FIG. 24A.

FIG. 25 is a map illustrating how FIGS. A and B are to be assembled.

FIG. 25A is a portion of a screen shot illustrating a graphical user interface showing a task due timing pull down menu being pulled down from the graphical user interface of FIGS. 24A and 24B.

FIG. 25B is a second portion of the screen shot of FIG. 25A.

FIG. 26 is a map illustrating how FIGS. 26A and 26B are to be assembled.

FIG. 26A is a portion of a screen shot illustrating a graphical user interface showing a mail merge options pull down menu being pulled down from the graphical user interface of FIGS. 25A and 25B.

FIG. 26B is a second portion of the screen shot of FIG. 26A.

Figure 27B:
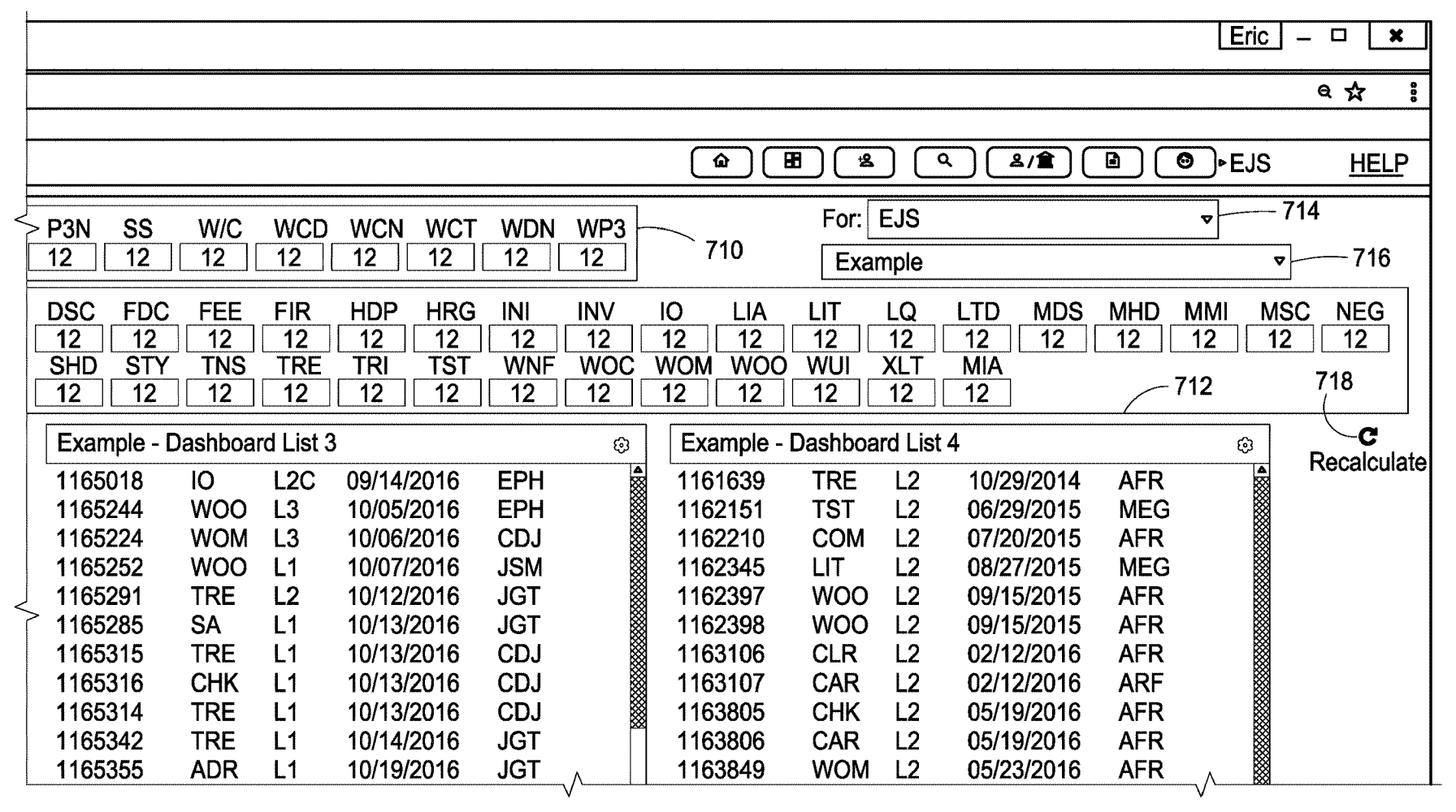

FIG. 27 is a map illustrating how FIGS. 27A, 27B, 27C, and 27D are to be assembled.

FIG. 27A is a portion of a screen shot illustrating a graphical user interface listing a plurality of dashboard lists in a law firm case management system.

FIG. 27B is a second portion of the screen shot of FIG. 27A.

FIG. 27C is a third portion of the screen shot of FIG. 27A.

FIG. 27D is a fourth portion of the screen shot of FIG. 27A.

FIG. 28 is a map illustrating how

FIG. 28A is a portion of a screen shot illustrating a graphical user interface showing dashboard items and showing filter conditions defining each dashboard list as well as columns included in each dashboard list.

FIG. 28B is a second portion of the screen shot of FIG. 28A.

FIG. 29 is a map illustrating how FIGS. 29A, 29B, 29C, and 29D are to be assembled.

FIG. 29A is a portion of a screen shot illustrating a graphical user interface showing how rules can be added or deleted to define one of the dashboard lists.

FIG. 29B is a second portion of the screen shot of FIG. 29A.

FIG. 29C is a third portion of the screen shot of FIG. 29A.

FIG. 29D is a fourth portion of the screen shot of FIG. 29A.

FIG. 30 is a map illustrating how

FIG. 30A is a portion of a screen shot illustrating a graphical user interface showing how a new dashboard list definition is added.

FIG. 30B is a second portion of the screen shot of FIG. 30A.

FIG. 30C is a third portion of the screen shot of FIG. 30A.

FIG. 30D is a fourth portion of the screen shot of FIG. 30A.

FIG. 31 is a map illustrating how FIGS. 31A, 31B, 31C, and 31D are to be assembled.

FIG. 31A is a portion of a screen shot illustrating a graphical user interface showing a first case rule pull down menu being pulled down from the graphical user interface of FIGS. 30A and 30B.

FIG. 31B is a second portion of the screen shot of FIG. 31A.

FIG. 31C is a third portion of the screen shot of FIG. 31A.

FIG. 31D is a fourth portion of the screen shot of FIG. 31A.

FIG. 32 is a map illustrating how

FIG. 32A is a portion of a screen shot illustrating a graphical user interface showing a second case pull down menu being pulled down from the graphical user interface of FIGS. 30A and 30B.

FIG. 32B is a second portion of the screen shot of FIG. 32A.

FIG. 32C is a third portion of the screen shot of FIG. 32A.

FIG. 32D is a fourth portion of the screen shot of FIG. 32A.

FIG. 33 is a map illustrating how FIGS. 33A, 33B, 33C, and 33D are to be assembled.

FIG. 33A is a portion of a screen shot illustrating a graphical user interface showing how a rule is added to the screens of FIG. 30A and FIG. 30B using pull down menus.

FIG. 33B is a second portion of the screen shot of FIG. 33A.

FIG. 33C is a third portion of the screen shot of FIG. 33A.

FIG. 33D is a fourth portion of the screen shot of FIG. 33A.

FIGS. 34A, 34B, 34C, and 34D are to be assembled.

FIG. 34A is a portion of a screen shot illustrating a graphical user interface showing a second rule being added.

FIG. 34B is a second portion of the screen shot of FIG. 34A.

FIG. 34C is a third portion of the screen shot of FIG. 34A.

FIG. 34D is a fourth portion of the screen shot of FIG. 34A

FIG. 35 is a map illustrating how FIGS. 35A, 35B, 35C, and 35D are to be assembled.

FIG. 35A is a portion of a screen shot illustrating a graphical user interface showing a third rule being added.

FIG. 35B is a second portion of the screen shot of FIG. 35A.

FIG. 35C is a third portion of the screen shot of FIG. 35A.

FIG. 35D is a fourth portion of the screen shot of FIG. 35A.

FIG. 36A is a portion of a screen shot illustrating a graphical user interface showing a fourth rule being added.

FIG. 36B is a second portion of the screen shot of FIG. 36A.

FIG. 36C is a third portion of the screen shot of FIG. 36A.

FIG. 36D is a fourth portion of the screen shot of FIG. 36A.

DETAILED DESCRIPTION OF THE ILLUSTRATED EMBODIMENTS

Facts giving rise to a legal cause of action in one legal jurisdiction may not have the same value in another. The legal cause of action may have a significantly different value or a particular jurisdiction may treat a particular fact more or less favorably. Historically, the only avenue for evaluating a claim in the legal setting has been for an attorney to review the facts of each matter individually, and direct action based on the attorney's professional judgment. While paraprofessionals may help alleviate some of the burden on the attorney, the paraprofessional is not a substitute for an attorney's professional judgment and is not without economic burden.

As with all professional services, one attorney's opinion may differ from another attorney's opinion, such that attorney "A" may regard fact 1 as having greater importance than attorney "B" based on their personal preference or experience. An attorney may consider, for example, where and when the claim occurred, the potential liability of the person who is making the claim, the liability of the person believed to have caused any damages related to the claim, as well as a host of other facts that may impact the viability of the claim. One fact does not exist in a vacuum and the attorney must evaluate all of the facts in concert with each other prior to making a determination regarding the viability of a particular matter. Attorneys may evaluate similar facts, but the weight ascribed to each fact may vary both by attorney and jurisdiction.

An attorney's time is his or her greatest resource. When an attorney has a relatively small number of potential clients or their claims to evaluate, the commitment of time is commensurately small; however, if an attorney has to review a large number of potential clients or their claims, the commitment of time increases significantly and reduces the amount of time an attorney may have with which to generate revenue. The lack of a customizable, systemic approach to evaluating a large number of injury claims results in a high barrier to assisting a large number of injured people without sacrificing an unduly burdensome amount of time. This burden may also adversely impact attorneys' ability to grow their practice, as they face the paradox of increasing new cases causing an increase in the need for screening. More screening may unduly restrict their ability to expand their existing legal services or offer new legal services. A similar problem exists for other types of businesses that may desire to screen their potential customers.

Figure 1:
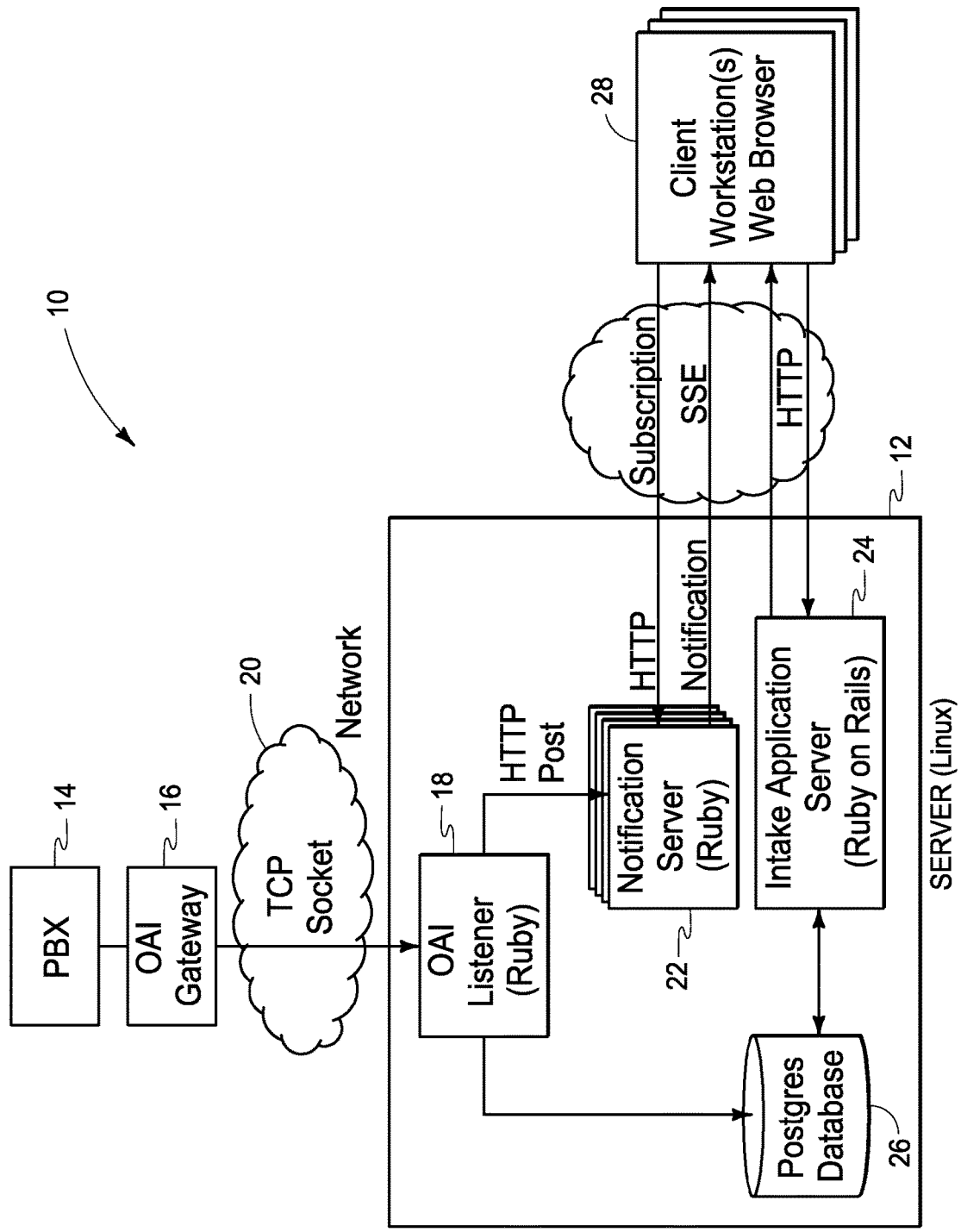
FIG. 1 is a functional block diagram of a system in accordance with various embodiments.

FIG. 1 shows a system 10 in accordance with various embodiments. The system 10 includes one or more servers 12. In the illustrated embodiment, a server 12 is depicted which runs Linux. Other operating systems can be used. The system 10 further includes a private branch exchange (PBX) 14 in communication with the server 12. More particularly, the system 10 further includes an open architecture interface (OAI) gateway 16 between the PBX 14 and the server 12, in the illustrated embodiment. The gateway 16 provides the interface between the PBX 14 and a network, such as a local area network that uses Ethernet cable.

The PBX 14 receives several incoming phone lines from the public switched telephone network (PSTN).

The server 12 includes an open architecture interface (OAI) listener 18 coupled to the gateway 16 via a network 20, such as a local area network, using a transmission control protocol (TCP) socket, in the illustrated embodiment. In the illustrated embodiment, the OAI listener 18 runs the Ruby programming language. Other languages could be used.

The server 12 further includes a notification server 22. In the illustrated embodiment, the listener 18 transfers inbound connections from the PBX 14 to the notification server 22 via HTTP post.

The server 12 further includes an intake application server 24. The intake application server 24 is used to generate client intake forms described below, to change fields in intake screens, and to capture data filled in the fields. In the illustrated embodiment, the intake application server 24 runs the Ruby on Rails programming language. Other languages could be used.

The server 12 further includes a database 26 in communication with the intake application server 24 and the OAI listener 18. The database 26 stores data from the intake application server such as forms, formulas, data entered into the forms, form fields, as will be described in more detail below. The database 26 also stores data about incoming calls from the OAI listener 18, such as which direct inward dial phone numbers received phone calls, when calls were made, how long they lasted, etc. In the illustrated embodiment, the database 26 is a Postgres database. Other types of databases could be used.

The system 10 further includes one or more workstations 28 in communication with the server 12 via a network, such as via the network 20 or via the Internet. The workstations 28 comprise, in some embodiments, personal computers having typical components including input/output devices such as screens and keyboards or touch screens, memory such as RAM, ROM, and hard drives or solid state memory, processors, and modems or network adapters for connecting to the network. The workstations comprise, in some embodiments, smart phones, tablets, PDAs, or other devices capable of running a web browser. In some embodiments, a workstation is defined, in some embodiments, by input and output devices coupled directly to the server 12 instead of via the network. In the illustrated embodiment, the workstations 28 send subscriptions to the notification server 22 via HTTP and receive notifications from the notification server 22 via SSE (server side event). A subscription defines the criteria for a notification, such as when a phone call is received. A subscription also defines the subscribers or users who are to receive the notification. An HTML5 server side event allows real-time data updates to be pushed from the server 12 to the browser of the workstation or workstations 28.

Figure 2:
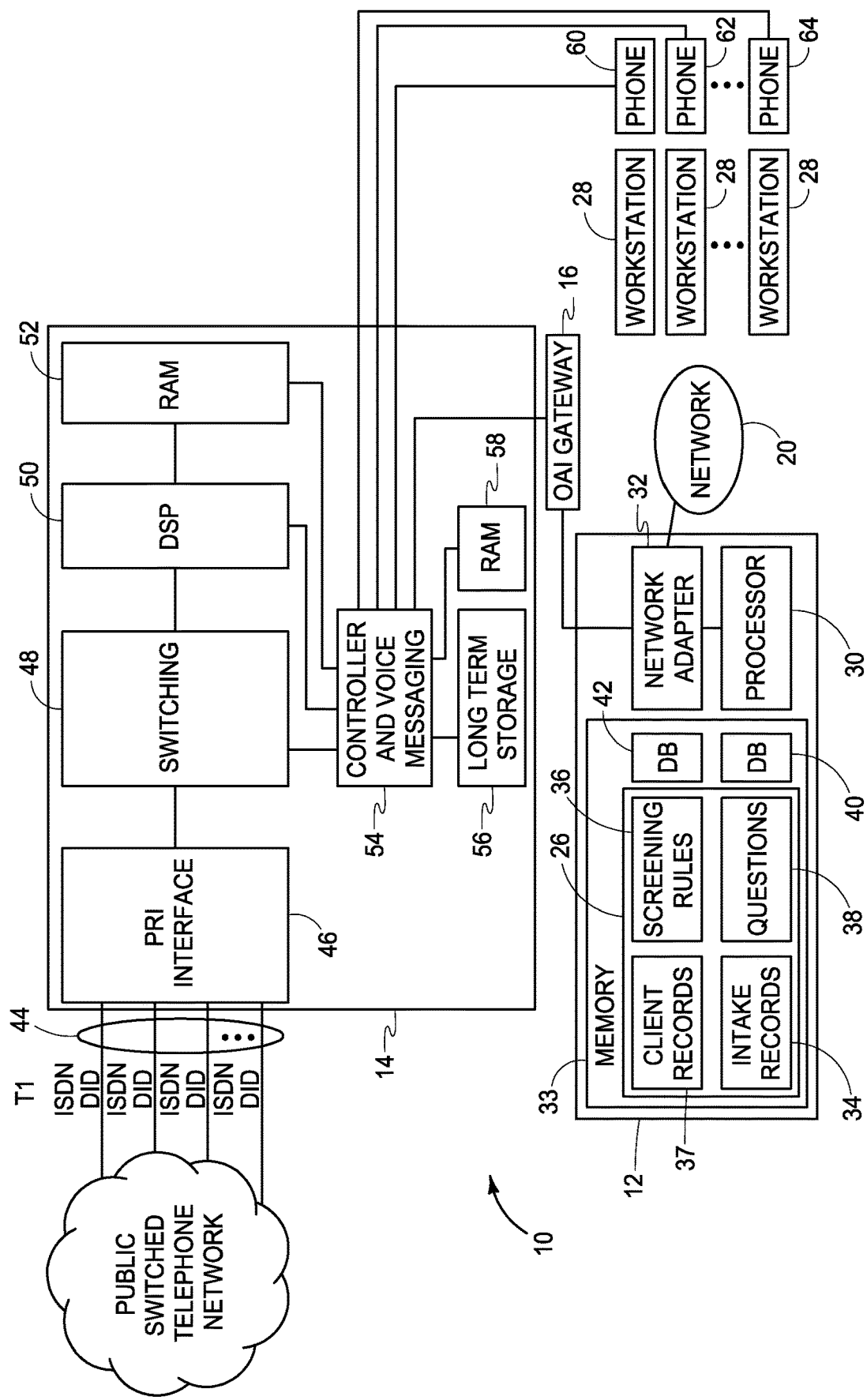
FIG. 2 is a hardware block diagram of the system of FIG. 1 showing greater details of the PBX included in the system of FIG. 1, in accordance with various embodiments.

FIG. 2 shows hardware construction details of the system 10, in accordance with various embodiments. As shown in FIG. 2, the server 12 includes typical components of Internet hosting servers including, for example, one or more processors (single or multi-core) 30, one or more network adapters 32 for communications with the workstations 28 over the network 20, and memory 33, which includes RAM, ROM, and hard drives or solid state memory, in communication with the processor 30. The memory 33 defines databases including the database 26 of FIG. 1. In the illustrated embodiment, the database 26 includes client records 37 (e.g., information about various communications with a law firm client), intake records 34 (see FIGS. 14 and 15), screening rules 36 (see FIG. 17), and questions 38 (see FIGS. 16A and B). Alternatively, these items can be stored in separate databases. Additional databases, e.g., 40 and 42, can be included for storing other data, such as legal case management or docketing data, accounts payable, time and billing data, etc. Other hardware arrangements are possible.

As shown in FIG. 2, the PBX 14 receives phone calls from a public switched telephone network. In the illustrated embodiment, the PBX 14 receives at least one primary rate interface (PRI) line 44 that defines a plurality of direct inward dial (DID) numbers. A DID is an actual phone number that a potential client or customer dials. PRI is a level of service assigned by the integrated services digital network (ISDN), providing digital access to the public switched telephone network for the PBX 14. ISDN is an international communications standard for transmission of digital voice, video, and data over the public switched telephone network. While PRI is usually associated with voice transmission, it can also transmit faxes, data, or video. The PRI of the illustrated embodiment is a single cable that consists of 24 channels. The PBX 14 includes a PRI interface 46 that uses 23 of the channels for voice calls and one line for signaling. In the illustrated embodiment, the PBX 14 further includes switching circuitry 48 for connecting different phones to different DID lines, digital signal processing (DSP) circuitry 50 for converting to analog lines or for supporting VOIP protocols for VOIP phones, RAM 52 associated with the digital signal processing circuitry 50, a controller and voice messaging circuitry 54, and long term storage 56 (e.g., one or more hard drives or solid state drives) and RAM 58 associated with the controller 54. In some embodiments, voice messages are stored in the long term storage 56. In some embodiments, a separate server is used for voice message. The controller 54 provides outputs to phones 60, 62, 64, etc. that may be provided proximate different computer workstations 28 so intake clerks can enter data into the workstations while being on the phone with potential clients or customers. In some embodiments, intake clerks log in to specific phones of the PBX 14. This allows the server 12 to route specific incoming calls to specific intake clerks even if they switch locations. Other PBX designs can be employed in other embodiments.

Figure 3:
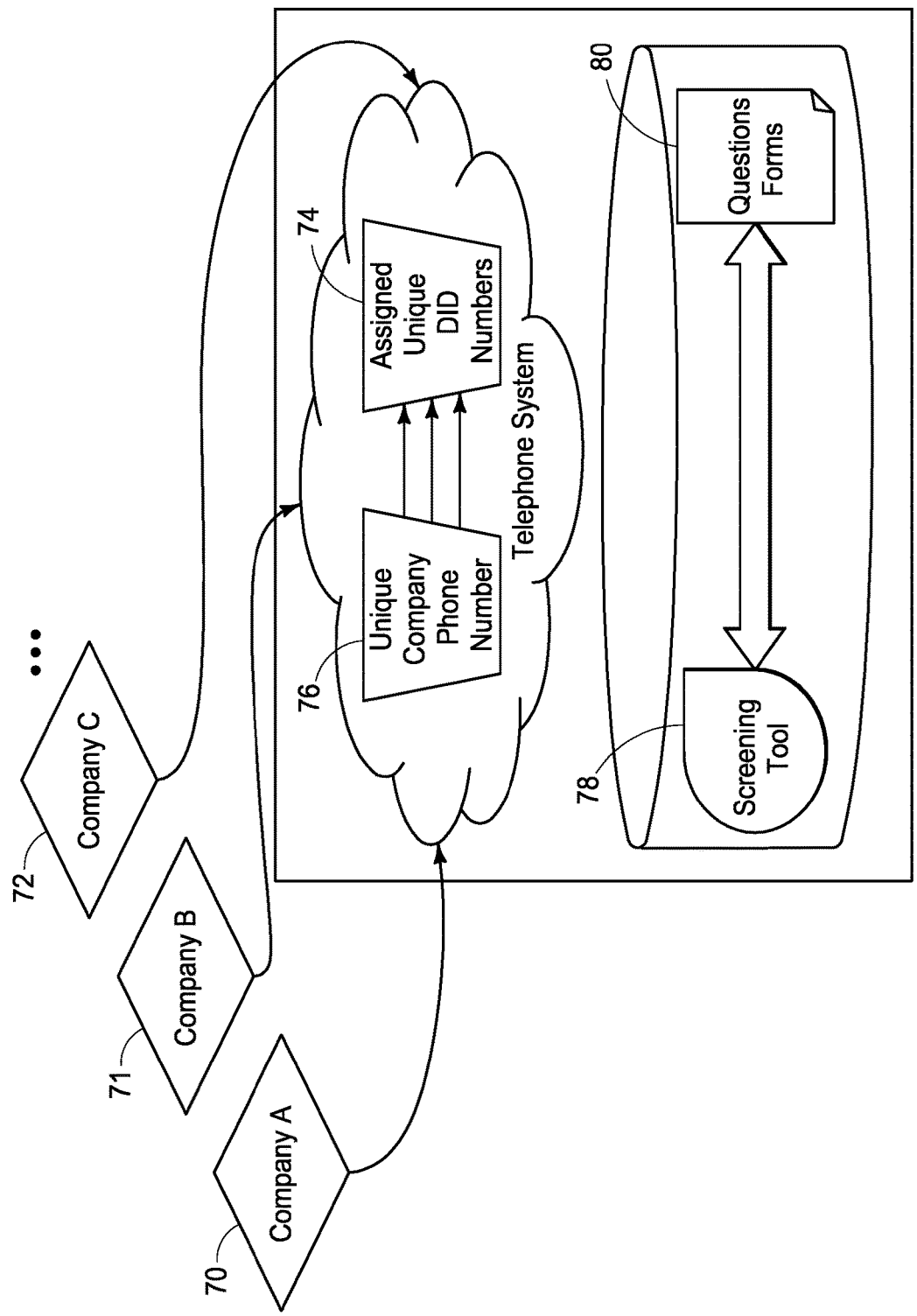
FIG. 3 is a block diagram illustrating attaching of company numbers to unique direct inward dial numbers, in accordance with various embodiments.

FIG. 3 illustrates attaching companies to unique direct inward dial phone numbers. In some embodiments, potential clients for multiple different law firms can be screened by the system 10 (FIG. 1). Multiple law firms or attorneys 70, 71, and 72 direct potential claimants into the system 10. To facilitate this, different companies (e.g., different law firms) 70, 71, 72, etc. are each assigned one or more different unique inward dial numbers 74 by the PBX 14. A law firm 70 may advertise, for example, a certain phone number to accident victims and a different phone number to medical malpractice victims. Based on the phone number 76 called by the potential client, the PBX 14 knows which law firm was called and screening tool 78 of the system 10 knows which questionnaire 80 to present to an intake clerk. Different law firms may develop their own question forms, using workstations 28 (see FIG. 1) based on whatever claim it is they wish to have evaluated. In some embodiments, meta data defined by an administrator triggers actions unique to defined phone numbers as selected by the administrator. For example, law firm "A" has the DID phone number (919) 123-4567 assigned to them and law firm "B" has the phone number (919) 890-1112 assigned to them. When a call comes into the system 10 to (919) 123-4567, customized questionnaires assigned to law firm "A" display on an intake clerk's screen. If a call comes in to (919) 890-1112, customized questionnaires assigned to law firm "B" display on an intake clerk's screen.

Various embodiments provide a screening tool 78 (see FIG. 3), defined by the system 10 of FIG. 1 that expresses rules and conditions in a set of database tables in the database 26. In various embodiments, each rule optionally has a name (for visual reference), and one or more associated conditions. The screening tool 78 queries the database table for all rules that are associated with the type of intake (or case), and through a loop control structure, the screening tool 78 tests each condition for a match. With each match, a value (positive or negative) is added to a resulting intake score, in some embodiments.

Figure 4:
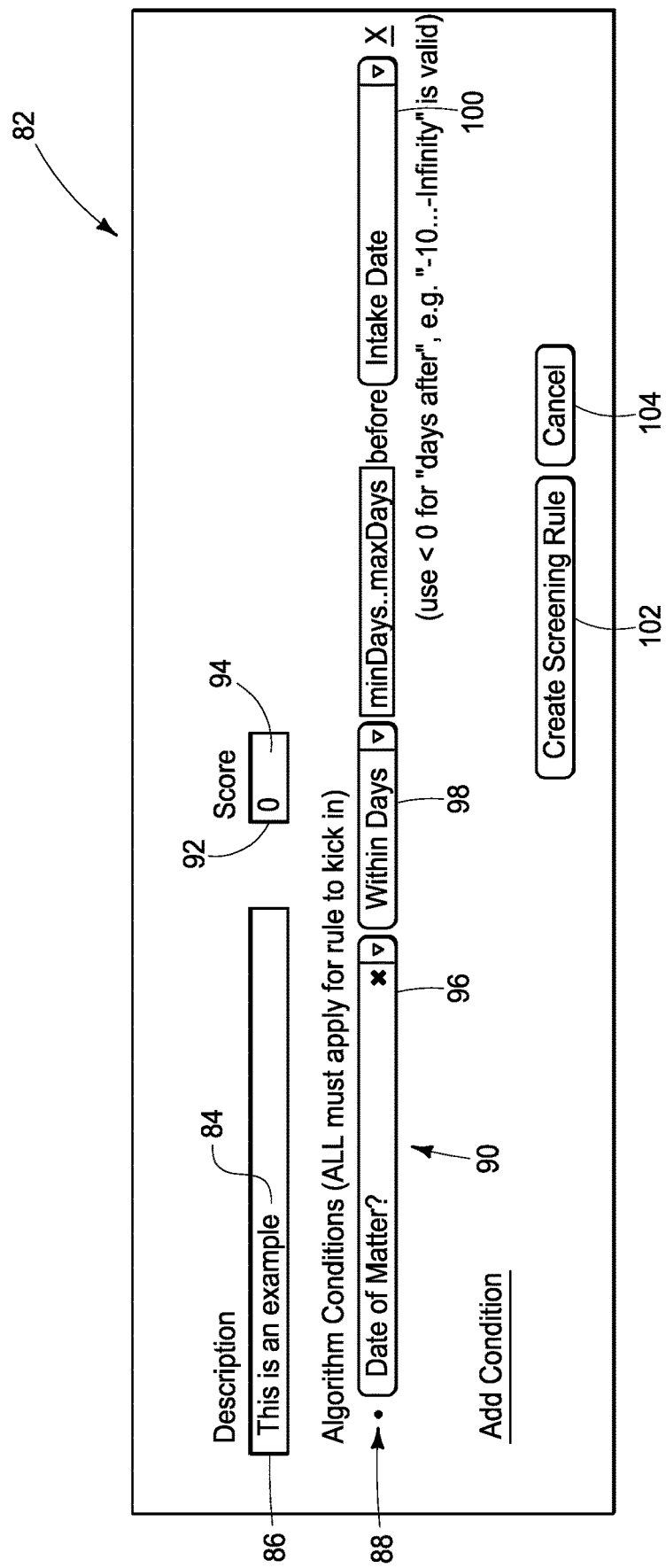
FIG. 4 is a screen shot illustrating a graphical user interface for setting a value for a condition, to perform a screening using the system of FIG. 1, in accordance with various embodiments.

FIG. 4 illustrates an example user interface 82, created by the system 10 of FIG. 1, which an administrator can use to assign a name 84 to a screening rule in a description field 86. Using the screening tool 78 (see FIG. 3), an administrator at a law firm (or other organization) creates rules and adds one or more conditions. A condition 88 references a question on an intake questionnaire. The screening tool 78, in various embodiments, provides for matching tests including but not limited to equality, inequality, inclusion in a set, exclusion from a set, and a date within a range of days relative to other dates provided in answers to the intake questionnaire. In the example shown in FIG. 4, the matching test employed is a date range test 90. The administrator, in various embodiments, assigns in field 92 a score or value 94 to be added if the condition 88 on the intake questionnaire is met and all other conditions for the screening rule are met. This assignment of a score is typically done while the administrator creates a screening rule. In various embodiments, a score can be changed after a screening rule has been created. In the example shown in FIG. 4, if the date of the matter is within a certain number of days before the intake date, the score in field 92 is added to a cumulative total score for the intake questionnaire. The condition "date of matter" is chosen using pull down menu 96, the condition "within days" is chosen using pull down menu 98, and the condition "intake date" is chose using pull down menu 100. After conditions and scores are set, the rule is created by actuating a button 102 or is cancelled by actuating a button 104.

The forms generated by the system (FIG. 4 and FIGS. 7-15) by the system 10 are web HTML forms that consist of standard web HTML form input elements and layout elements, as well as hand-written javascript, in various embodiments. The system 10 uses libraries that are, in some embodiments, Ruby libraries (referred to as Ruby Gems), and some open-source web form styling packages. For example, one such styling component is called select2 (https://select2.github.io/) that extends the functionality and visual appearance of the HTML <select> input element.

Figure 5:
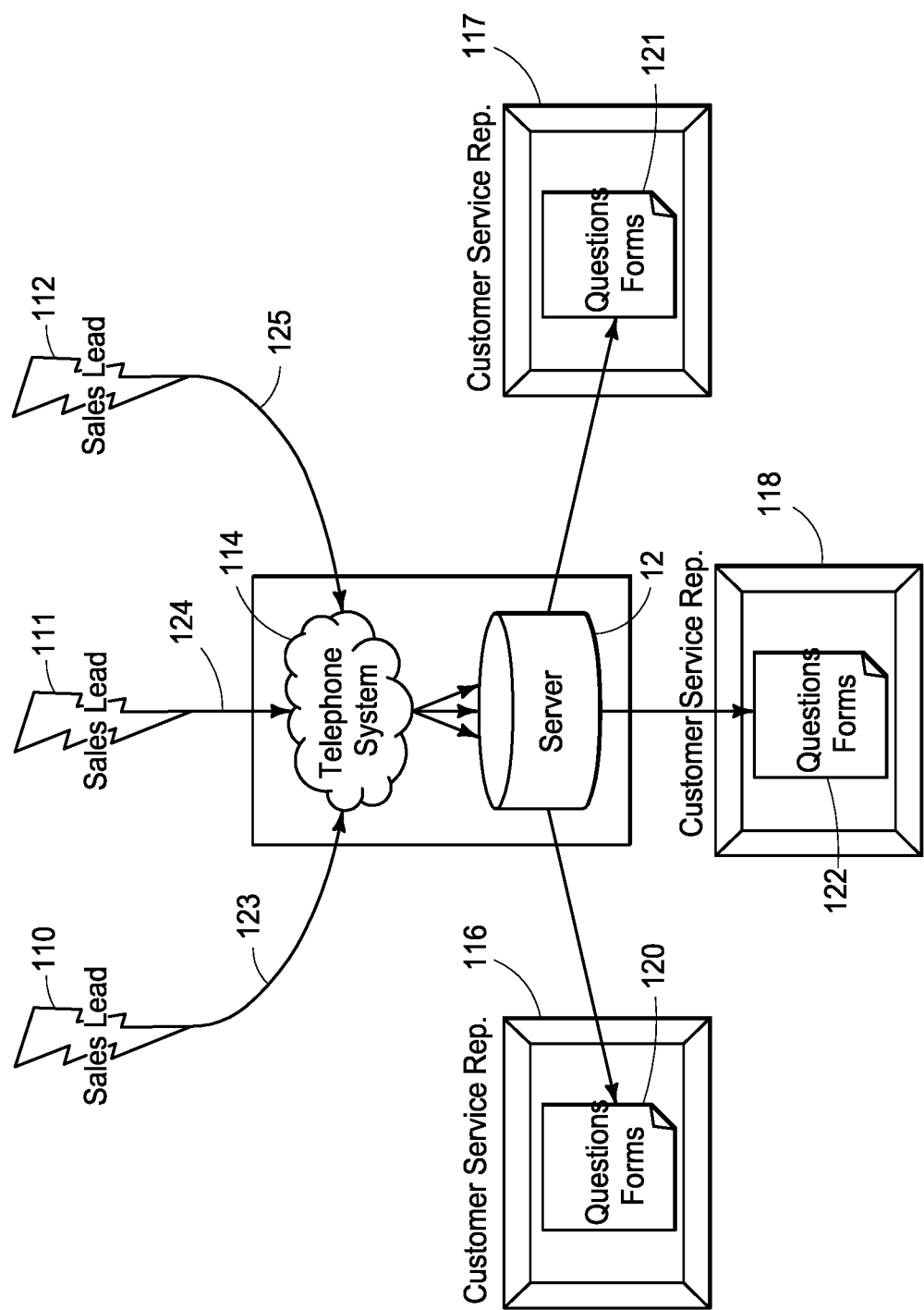
FIG. 5 is a functional block diagram illustrating automatic routing based on the system of FIG. 1 reading a direct inward dial number, in accordance with various embodiments.

FIG. 5 shows automatic routing in response to the PBX 14 (FIG. 1) reading a direct inward dial number, in accordance with various embodiments. Different potential clients, customers, or sales leads 110, 111, and 112 call different phone numbers that were advertised in connection with different products, services, or solutions using the telephone system 114. The system 10 routes the calls to different customer service representatives, screeners, or intake clerks 116, 117, or 118 that have different question forms or intake questionnaires 120, 121, and 122, respectively. In some embodiments, this is arranged using phone extension routing and by specifically limiting certain intake clerk's access to specific intake questionnaires. Alternatively, a single intake clerk will have different question forms or intake questionnaires 120, 121, and 122 (similar to the questionnaire 80 of FIG. 3 but different from each other) come up on a monitor screen of a workstation 28 depending on the phone number dialed by the potential client or customer 110, 111, and 112. In some embodiments, if no intake clerk is available, the call is logged so that an intake clerk may perform an intake at a later time.

In the law firm example, different law firms develop different intake questionnaires used to determine whether or not a potential client should be accepted. Alternatively, the same questions may be used by different firms but scoring may be different depending on the types of clients the different firms want. For example, while some law firms may only want large clients, other firms may only want small clients, due to staffing and capacity. Or a potential client may have a strong case in one state, serviced by one firm, but a weak case in a different state, serviced by a different firm, due to differences in laws in the different states. A single law firm may have multiple intake questionnaires, such as for different types of potential causes of action. Respective direct inward dial phone numbers 123, 124, and 125, dialed by potential clients or customers 110, 111, and 112, are associated with the different intake questionnaires 120, 121, and 122, in the illustrated embodiment.

Figure 6:
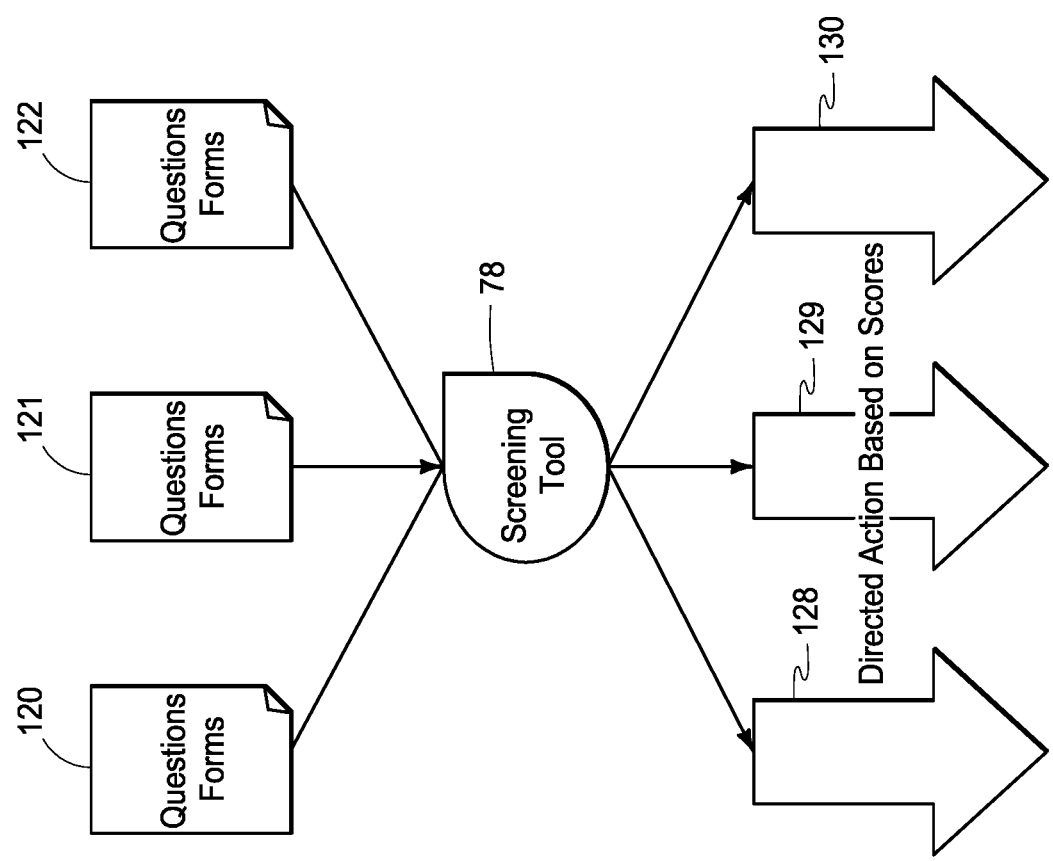
FIG. 6 is a functional block diagram illustrating that responses to question forms trigger directed action, using the system of FIG. 1, in accordance with various embodiments.

FIG. 6 illustrates that the responses from the attorney's questions 120, 121, or 122 (similar to questions of questionnaire 80 of FIG. 3), after being entered by an intake clerk, using the screening tool 78, generate scores for the potential cause of action, in some embodiments.

In various embodiments, conditions and values can be used in concert with each other. Aggregate scores (after adding scores to all responses on an intake questionnaire 120, 121, and 122) result in directed actions 128, 129, and 130 if a score is achieved, or if a score is not achieved, in various embodiments. These actions are human actions in some embodiments (e.g., phone call by a secretary to the potential client, phone call by an attorney to the potential client, arrange an appointment, send a letter accepting or declining a potential client, etc.), and automated actions in other embodiments. The automated actions can be, for example, sending an email or fax to the potential client accepting or declining the potential client. Sending an email or fax every 30 days or some other amount to time (e.g. for marketing or to remain in contact), creating a document or video, causing a message to appear or a window to pop up on an intake clerk's monitor, changing data in a field in the database, calling a potential client and sending an automated message, sending an engagement agreement or non-engagement letter by email or fax, or printing a document for mailing. Alternatively, the automated action could be emailing a calendar invitation for a personal meeting or phone conference. Other automated actions are possible using the system 10.

FIG. 7 illustrates a screen 200 including a questionnaire 202 in accordance with various embodiments. The term "screen," as used in the context of FIGS. 7-18B, is meant to encompass portions of screens, windows, pop-up windows, or other forms of graphical user interfaces, and is not intended to necessarily mean the entire display area of a monitor. The questionnaire 202 includes one or more questions 204, 205, 206, and 207. The questionnaire 202 further includes fields 208, 209, 210, and 211 in which an intake clerk can enter responses while talking to a potential client on the phone. Based on the responses entered by the intake clerk, a score or index 214 is calculated by the server 12 (FIG. 1) that corresponds to the desirability of the potential client. The score 214 is displayed on the screen 200.

In the illustrated embodiment, the screen 200 also displays, in an area 216, summaries of questions and answers. In the illustrated embodiment, the screen 200 also displays the time and date 218 when the intake record was created, and includes fields or elements using which the intake clerk can enter or select a case number, a disposition or recommended action 222, whether an attorney live call has taken place 224, whether an admin follow up has taken place 226, whether the firm wants this client 228, whether there is no charge for a consultation 230, etc. Other information or fields can be provided for other types of businesses. In the illustrated embodiment, the intake clerk may also add attachments (e.g., scanned copies of notes) by actuating an area 232 of the screen 200, or may add notes after actuating an area 234 of the screen 200. In some embodiments, the screen 200 can be revisited after an intake has taken place and elements 220, 222, 224, 226, 228, 230, 232, and 234 can be changed. The screen 200 also includes menu or navigation elements 236, 237, 238, 239, and 240, using which the screener may bring up different screens. In the illustrated embodiment, the elements 236, 237, 238, 239, and 240 include pull-down menus. The screen 200 also includes an element 242 for deleting the intake questionnaire and an element 244 for printing the intake questionnaire. Printing could be useful after the questionnaire has been filled or partially filled. In some embodiments, the screen 200 also displays an "Intake Locked" popup warning 246. This is a message sent to the workstation 28 in FIG. 1 as a server side event (SSE) notification. Other screen elements are possible.

Figure 8:
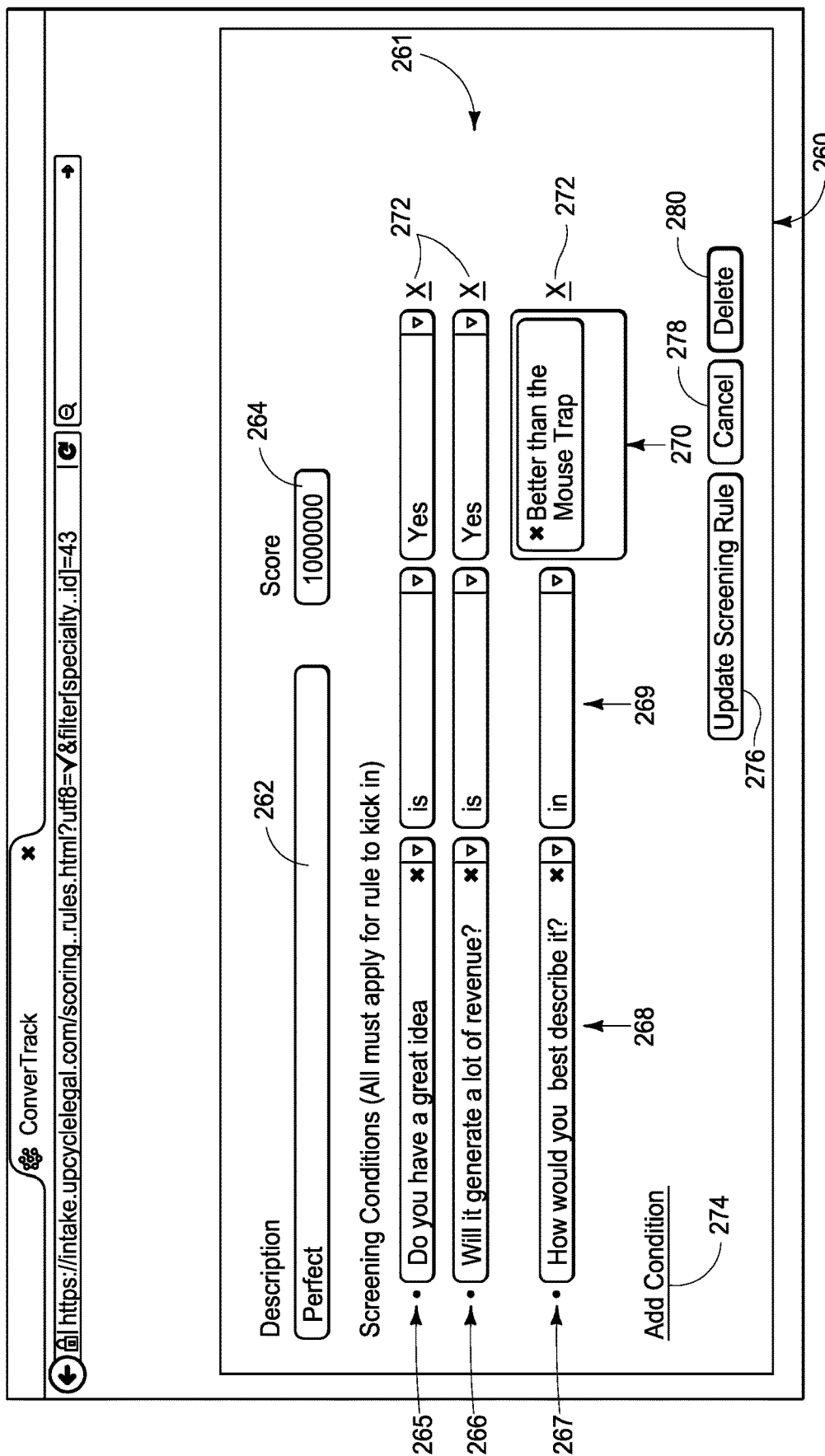
FIG. 8 is a screen shot illustrating a graphical user interface for viewing or editing a screening rule for the intake questionnaire of FIG. 7, in accordance with various embodiments.

FIG. 8 illustrates a screen 260 for viewing or editing a screening rule 261 of the intake questionnaire of FIG. 7. In the illustrated embodiment, the screen 260 includes a field or element 262 in which an administrator can enter or change the name of the rule, a field or element 264 in which the administrator can enter or change a score if all the conditions of the rule are met, and screening conditions 265, 266, and 267 which must all be met for the score of 264 to be applied. The conditions 265, 266, and 267 are each made up of questions 268, matching operators 269, and matching answer value(s) 270. In the illustrated embodiment, the conditions can be changed using pull down menus. The screen 260 further includes elements 272 for deleting conditions, an element 274 for adding a condition, an element 276 for updating the screening rule 261 (after edits have been made), an element 278 for cancelling edits, and an element 280 for deleting the rule 261. In various embodiments, a rule 261 may have only one condition or may have multiple conditions.

Figure 9:
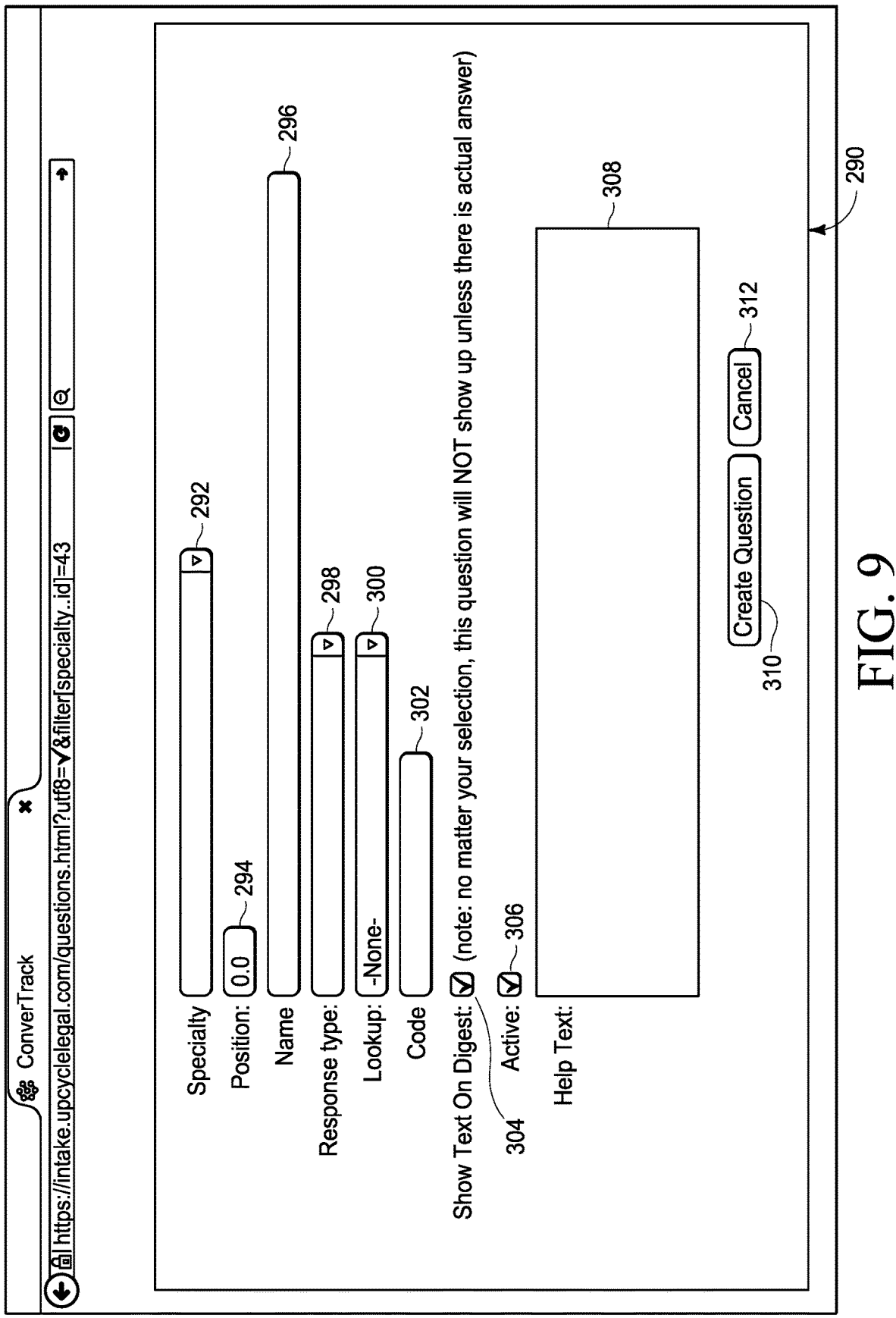
FIG. 9 is a screen shot illustrating a graphical user interface for adding a question to the rule of FIG. 8, in accordance with various embodiments.
Figures 16, 16A:
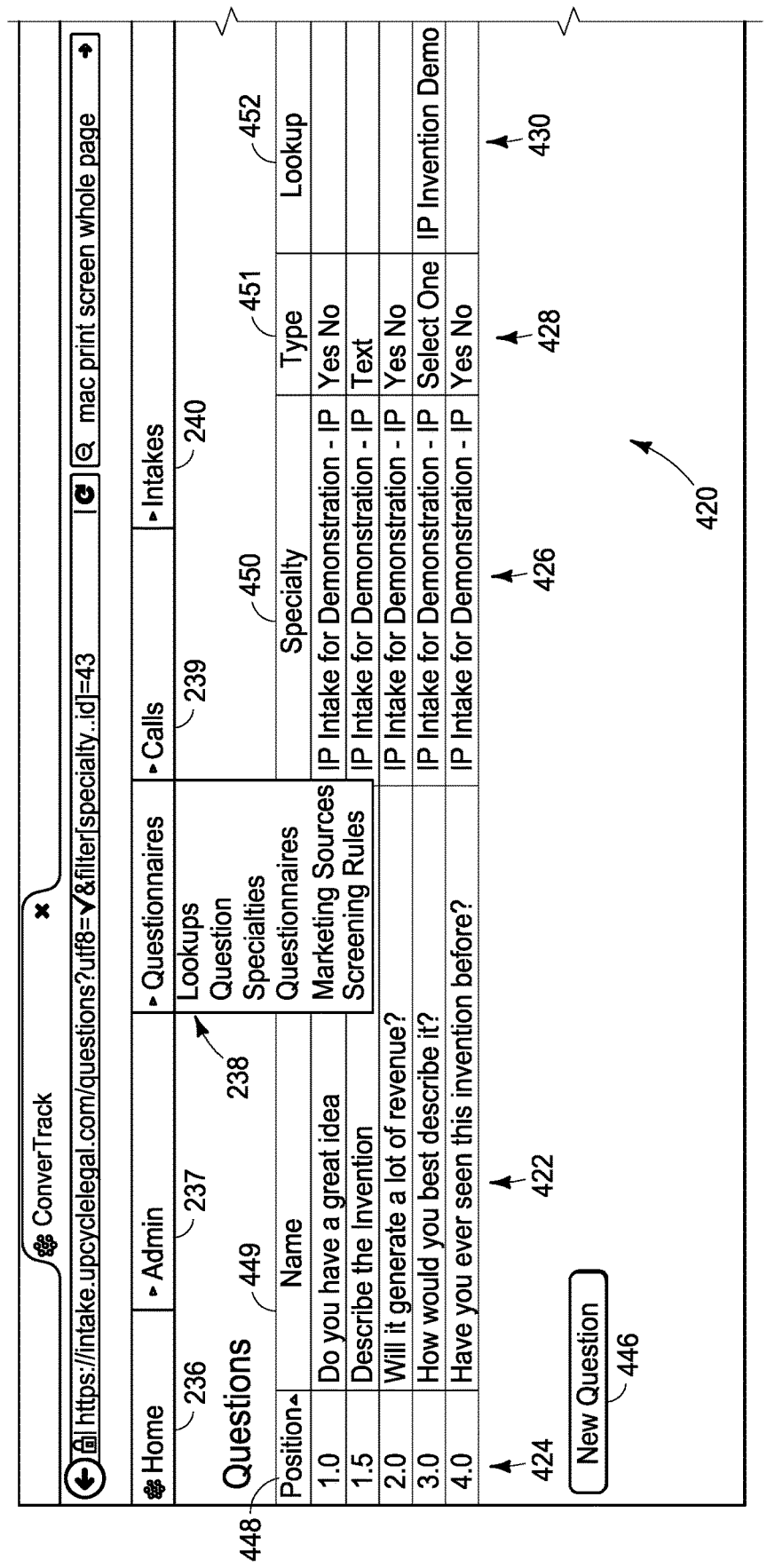
FIG. 16 is a map illustrating how
FIGS. 16A and 16B are to be assembled.
Figure 16B:
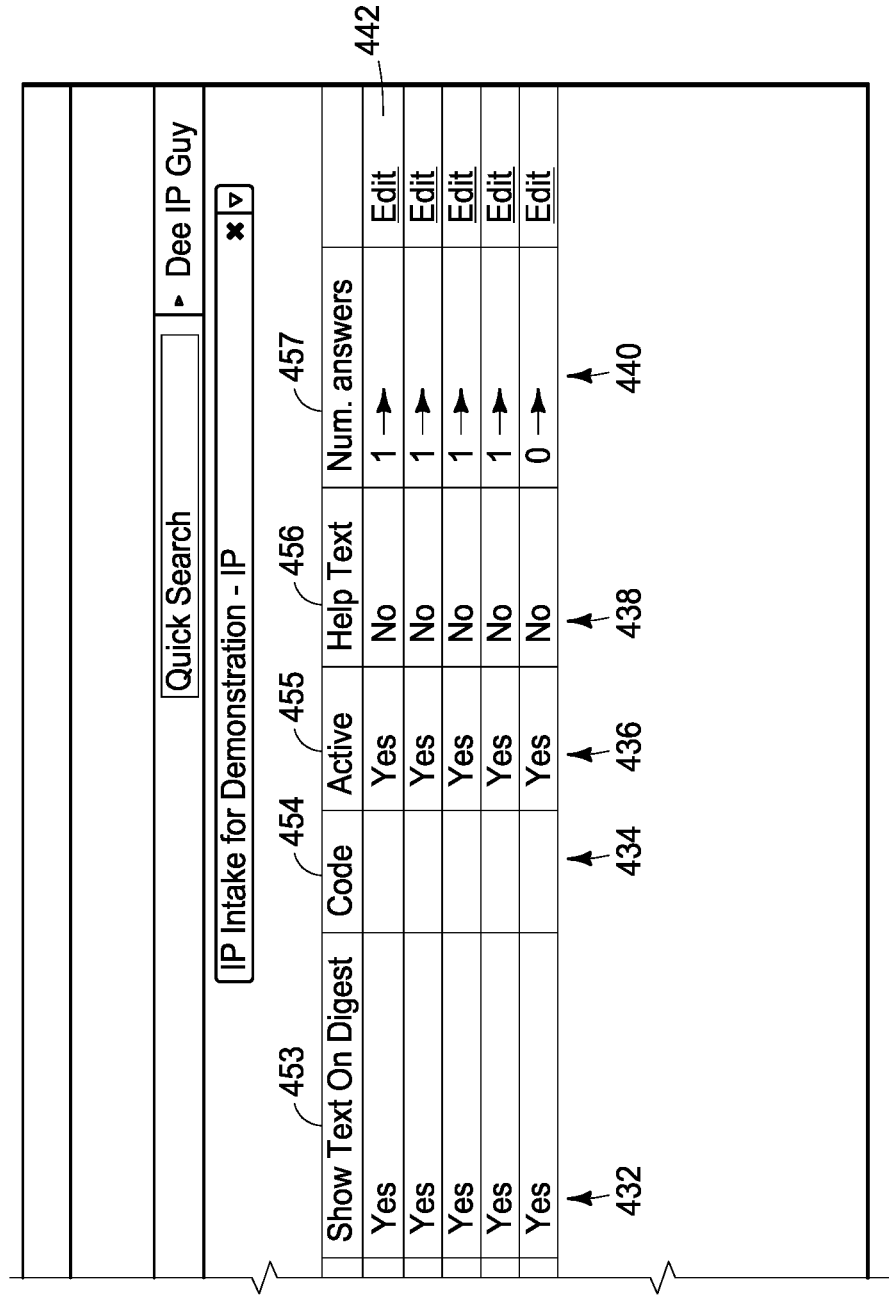

FIGS. 9 and 10 illustrate a screen 290 for adding a question to the list 420 of FIG. 16A, such as after actuating screen element 446 of FIG. 16A. The screen 290 includes an element 292 for indicating a specialty area. The element 292 is a pull down menu in various embodiments. Different legal specialties are likely to require different questions for screening potential clients or customers. Different legal specialties may have different bar dates, for example. A client that may be time barred for one specialty may not be for another. In some embodiments, multiple different law firms can access questions for a particular legal specialty. In other embodiments, law firms can only access their own questions but may have their own different specialty areas, each with different questions. The screen 290 further includes a field or element 294 in which the administrator can indicate the position for the question within a list of questions. It may be more logical to place the new question in between existing questions than at the end of the list. For example, if it is desired to place a new question between the first question and the second question of FIG. 16A, the administrator may enter 1.5 or 1.1 in the field 294.

The screen 290 further includes a field or element 296 in which an administrator enters a name for the question. The text entered in this field will correspond to a question 268 of FIG. 8. The screen 290 further includes an element 298 with which an administrator indicates a response type. The element 298 is a pull down menu in the illustrated embodiment. The response type could be, for example, text, number, date, date and time, yes/no, select one, or other types (see FIG. 10). The screen 290 may further include other items such as a lookup element 300, an element 302 for entering a code name or number for the condition, an element 304 for indicating whether the text should be shown in a digest, an element 306 for indicating whether or not the question is active, and a field or element 308 in which an administrator can provide help text to explain the question when displayed on the intake questionnaire. The screen 290 further includes an element 310 which, when actuated, creates the new question. The screen 290 further includes an element 312 which, when actuated, cancels the creation of the new question.

Figure 11:
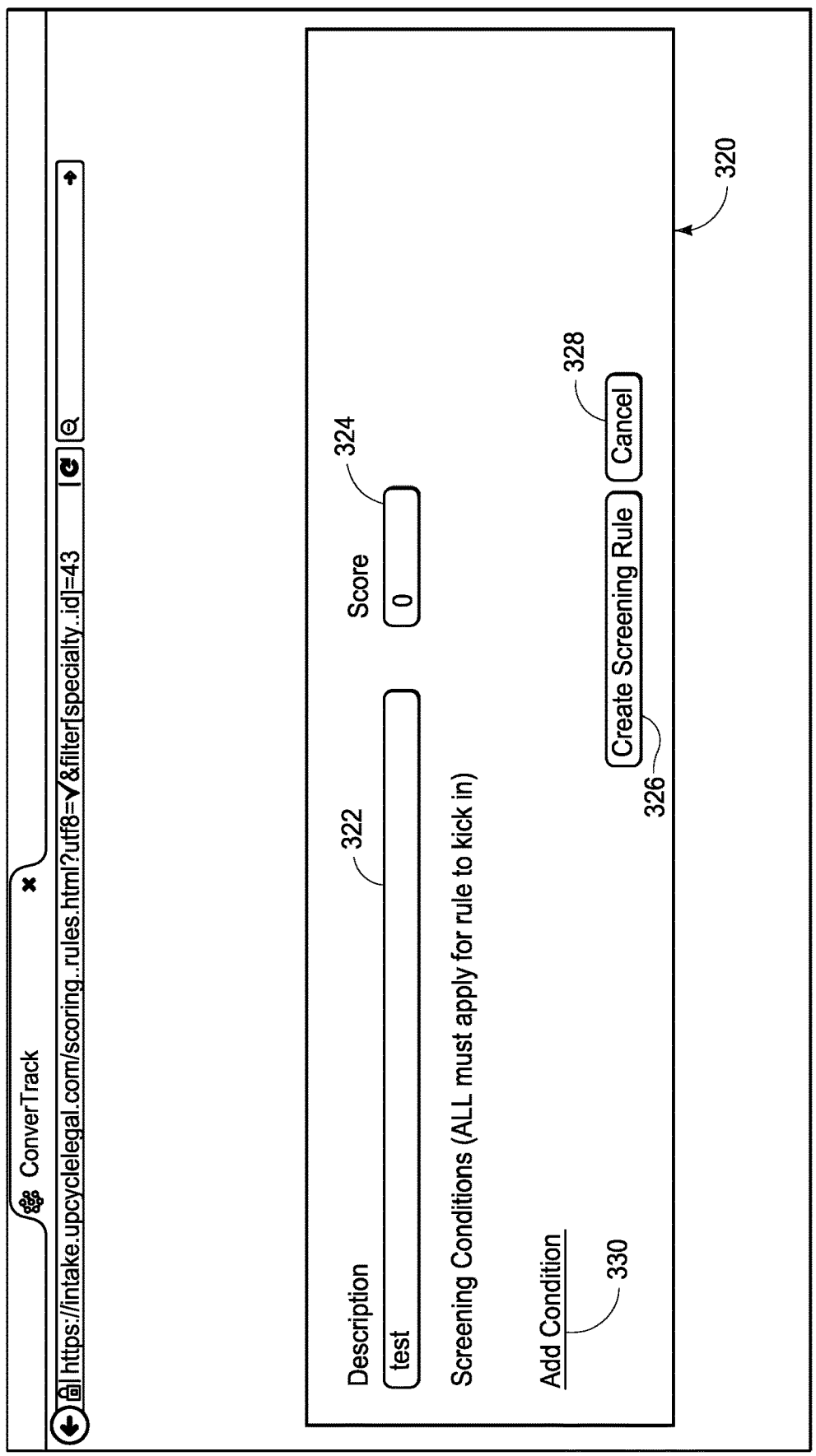
FIG. 11 is a screen shot illustrating a graphical user interface for creating a new screening rule, using the system of FIG. 1, in accordance with various embodiments.
Figure 12:
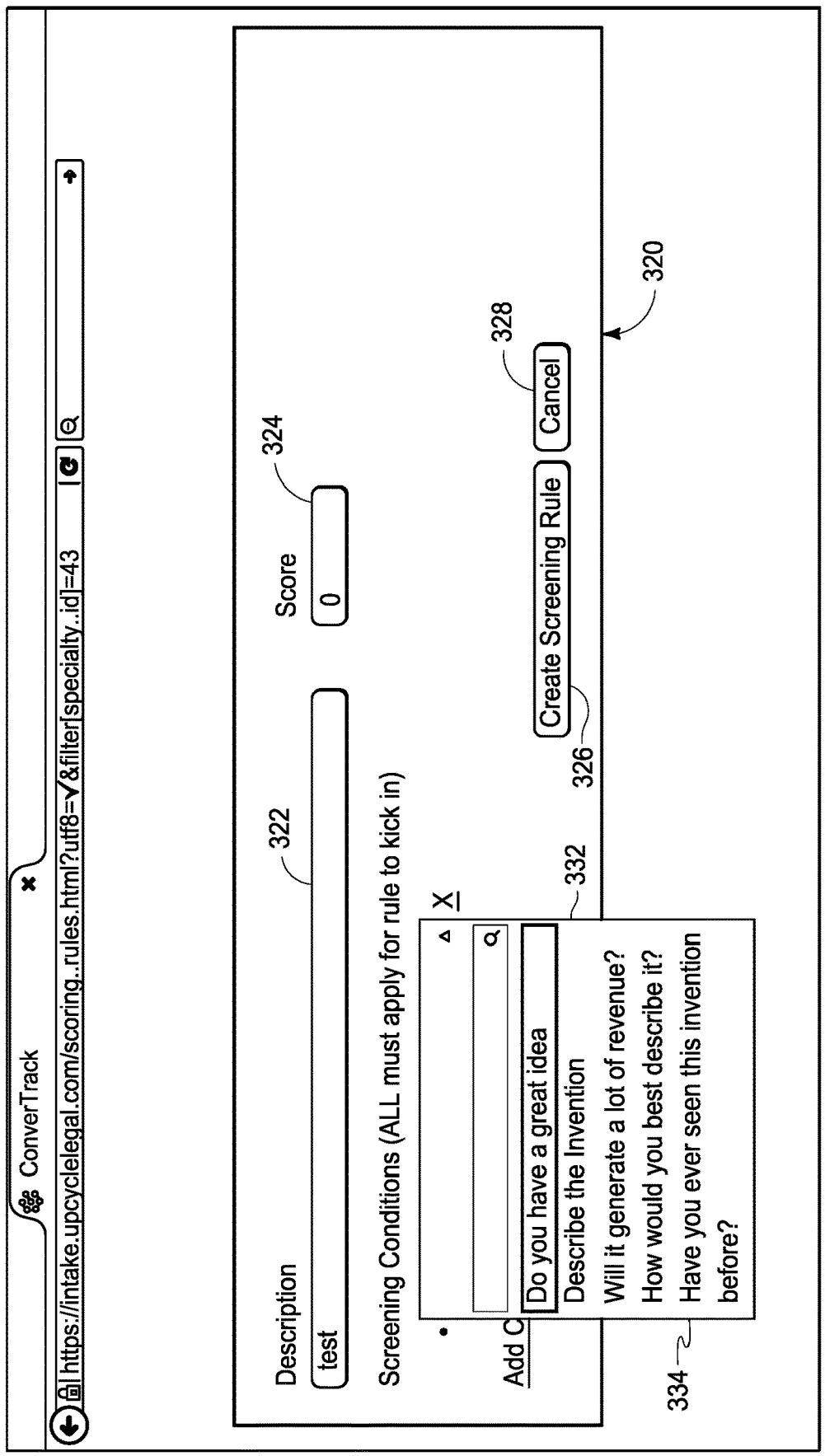
FIG. 12 is a screen shot illustrating the graphical user interface of FIG. 11 after an "add condition" element of FIG. 11 has been actuated, in accordance with various embodiments.
Figure 13:
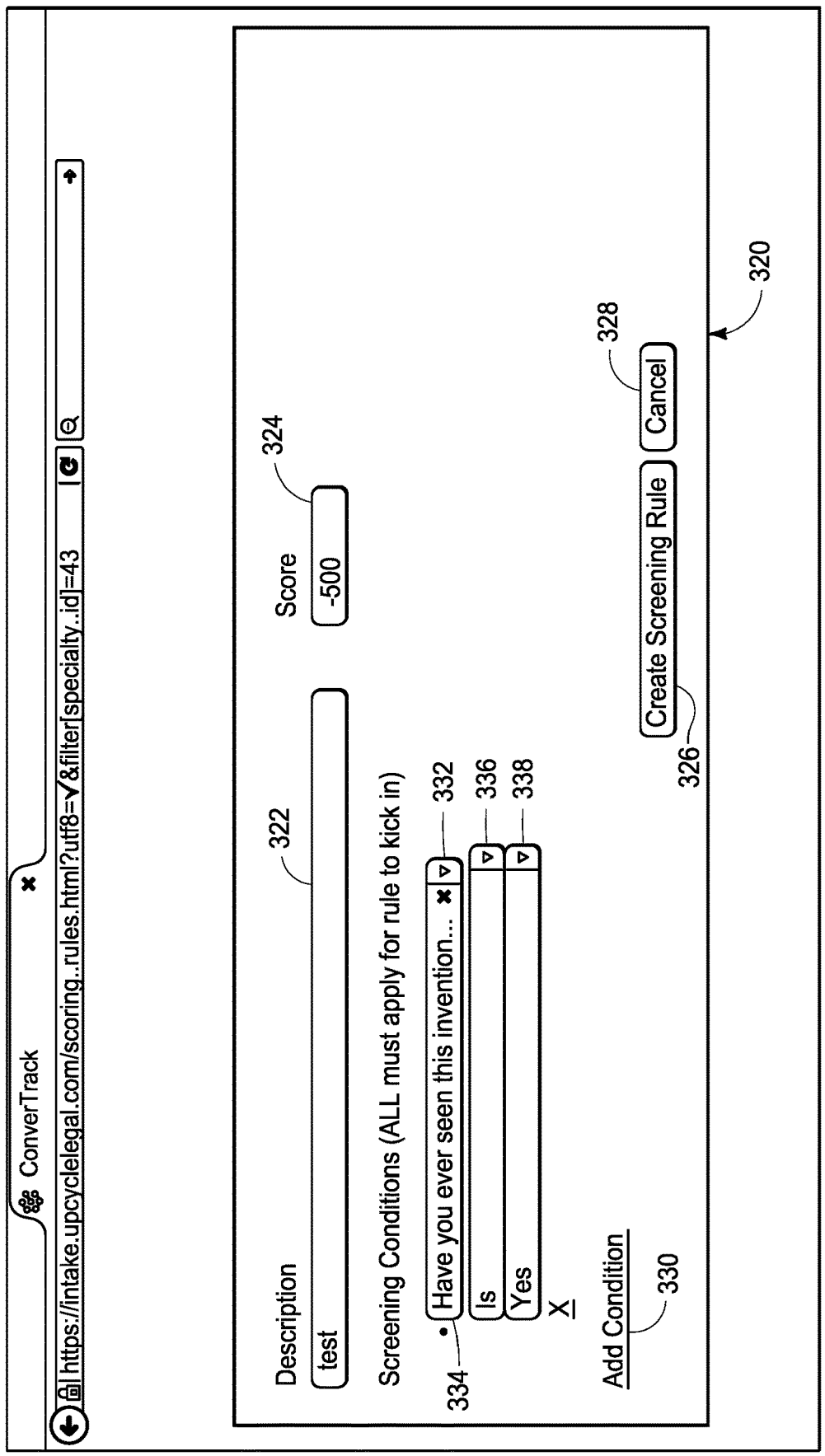
FIG. 13 is a screen shot illustrating the graphical user interface of FIG. 12 after a question of FIG. 12 has been selected, in accordance with various embodiments.

FIGS. 11-13 show a screen 320 for creating a new rule similar to the rule 261 of FIG. 8. The rules each contain conditions such as those shown in FIG. 8. In the illustrated embodiment, the screen 320 includes a field or element 322, which is the same as the field 262 of FIG. 8, in which an administrator can enter the name of the new rule. The screen 320 further includes a field or element 324, similar to field 264 of FIG. 8 in which the administrator can enter or change a score if all the conditions of the rule are met. The screen 320 further includes an element 326 for creating the screening rule, an element 328 for cancelling edits, and an element 330 for adding a condition to the screening rule.

When the element 330 is actuated by an administrator, an element 332 (see FIG. 12) appears from which the administrator can select a question from a list of questions. In the illustrated embodiment, the element 332 is a pull down list.

After a question (e.g., question 334) is selected from the element 330, elements 336 and 338 appear (see FIG. 13), in the illustrated embodiment. Using the element 336, the administrator can set an operator and using the element 338, the administrator can set an answer. Elements 332, 336, and 338 define a condition. The administrator may add an additional condition to the rule by actuating element 330, then may add further conditions. Note that the score entered into the field 324 may be negative. For example, if a potential legal client or customer answers certain questions in a certain way, their legal matter may not be a good matter to accept. After all conditions have been defined, the administrator may create the rule by actuating element 326.

Figure 14:
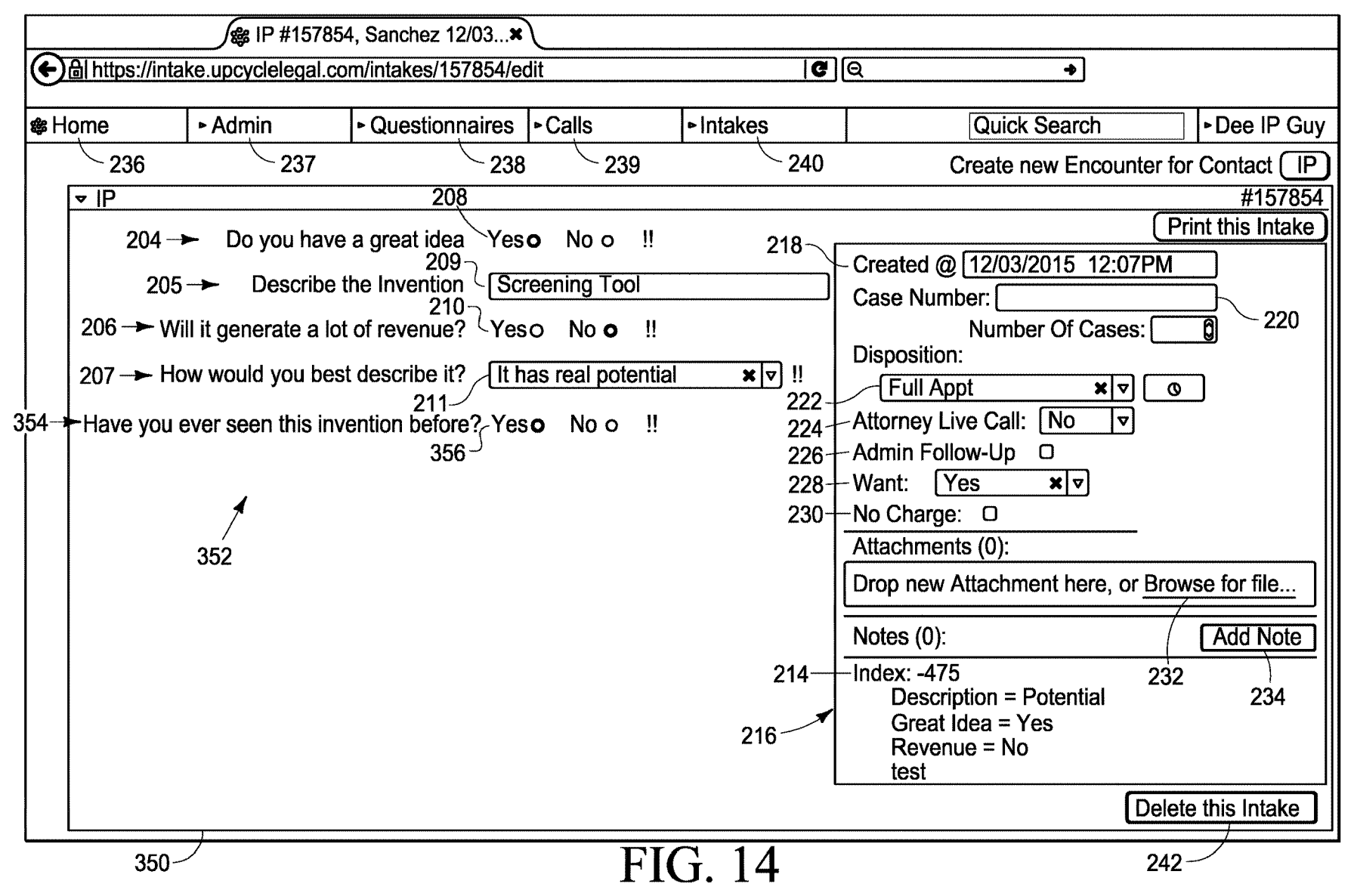

FIG. 14 illustrates a screen 350, similar to the screen of FIG. 7. The screen 350 includes a questionnaire 352 in accordance with various embodiments. The questionnaire 352 includes questions 204, 205, 206, and 207, as well as a new question 354 resulting from addition of a question as shown in FIGS. 9-10, and element 356 using which a screener can enter an answer to the question 354.

Figure 15:
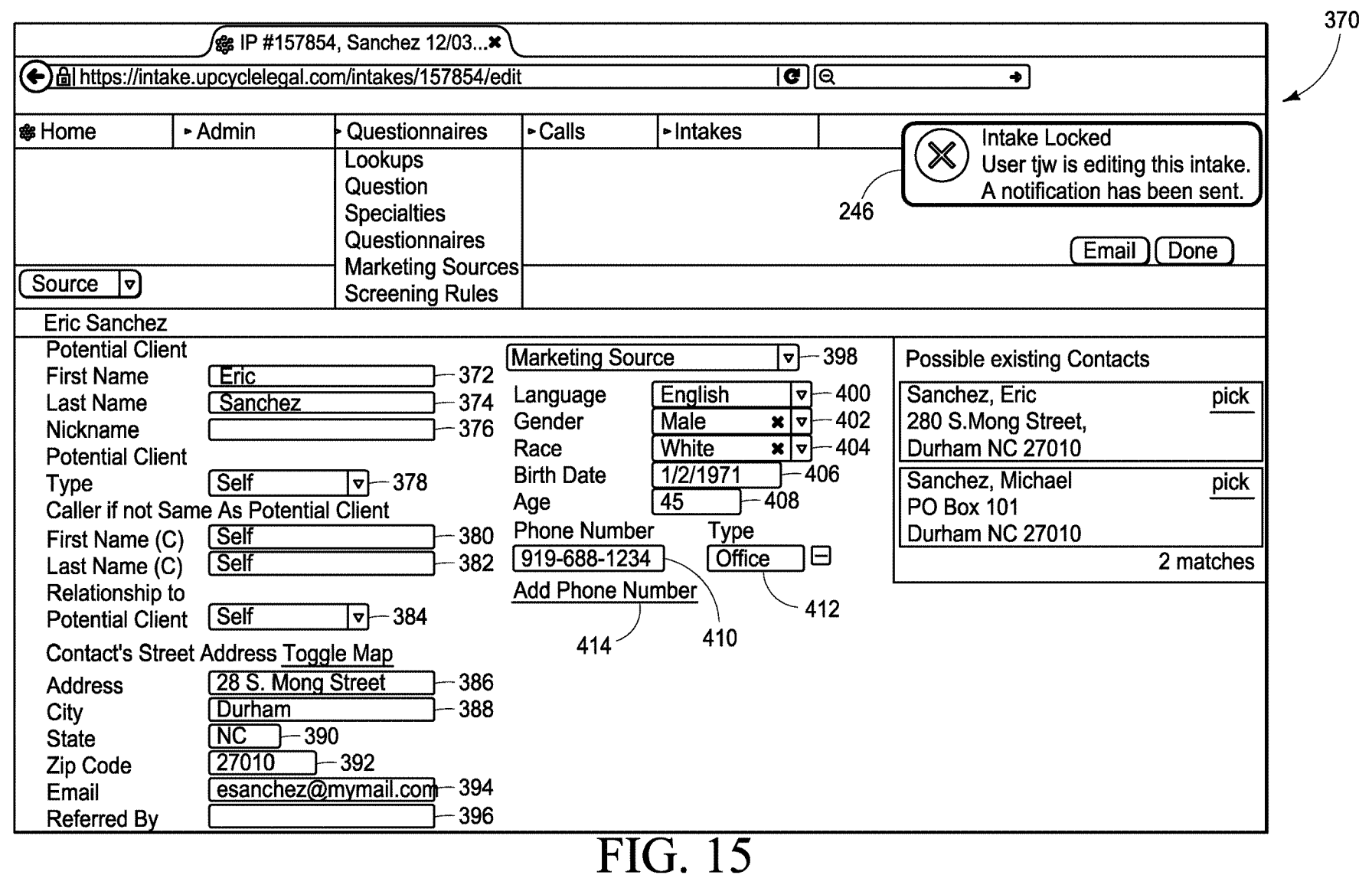

FIG. 15 illustrates a screen 370 which a screening clerk uses to capture personal details about a potential client. The questionnaire 352 of FIG. 14 is associated with a particular potential client. In some embodiments, screen 350 of FIG. 14 is reached by scrolling below the screen 370 (e.g., they are portions of a common page). In the illustrated embodiment, the screen 370 has a field or element 372 which a screening clerk uses to enter a potential client's first name, 374 to enter the potential client's last name, and 376 (optional) to enter the potential client's nickname. The screen 370 further includes an element 378 for recording the client type (e.g., individual or referral source or relative), elements 380, 382, and 384 for recording the first name, last name, and relationship of the person calling to the potential client (if not the client himself or herself). The screen 370 further includes fields or elements 386, 388, 390, 392, and 394 for recording contact information for the potential client, such as street address, city, state, and zip code, and email address. The screen 370 further includes a field or element 396 for recording a referral source, if there is one, and 398 for recording a marketing source (e.g., the caller called a phone number advertised on TV, radio, Internet, direct mail, etc.). The screen 370 further includes an element 400 for recording the potential client's language, 402 for the potential client's gender, 404 for the potential client's race, and 406 for the potential client's birth date. The screen 370 can include a field 408 for recording the potential client's age, or age can be calculated based on the potential client's birth date. The screen 370 further includes a field 410 for recording the potential client's phone number. The phone number is entered by a screening clerk in some embodiments. In some embodiments, the phone number from caller ID information is displayed at the top of the form for informational purposes and is captured and stored for the call associated with the intake. The screen 402 further includes an element 414 which, when actuated, brings up a field for adding another phone number. The screen 402 further includes an element 412 for indicating a phone type (e.g., office phone, home phone, mobile phone). Different or additional contact information could be included in the screen 402.

FIGS. 16A and B, when placed side by side, illustrate a screen 420 for viewing, adding, or editing questions or conditions such as the one created in FIGS. 9 and 10, and used in connection with the screening rules of FIGS. 11-13. In the illustrated embodiment, before being able to select a question with element 332 (see FIG. 12), the question must already have been created, such as by using the screen 420. The screen 420 includes a list 422 of questions. In the screen 420, for each question there is associated information such as position 424, specialty 426, type 428, lookup information 430, code 434, a flag 436 indicating whether the question is active, a flag 438 indicating whether or not there is help text associated with the question, and number 440 of answers, in various embodiments. Other than the questions, some or all of the associated information is optional, in some embodiments. In the illustrated embodiment, it is possible to sort or reverse sort the questions 422 (e.g., alphabetically) or on any of the associated information items 424, 426, 428, 430, 432, 434, 436, 438, and 440, such as by actuating a column header 448-457 or by actuating the column header a second time to reverse the sort order. In the illustrated embodiment, the screen 420 further includes an element 442 for each question using which the administrator can edit the question, as well as an element 446 using which a new question can be added. FIG. 16 and B also illustrates one of the navigation elements 238 expanded as a pull down menu.

FIG. 17 illustrates a screen 470 for viewing, adding, or editing the screening rules of FIGS. 11-13. The screen 470 includes a list 476 of descriptions or names of screening rules. In the screen 470, for each question there is associated information such as specialty 474, screening condition 472, and score 478, in various embodiments. Other than the descriptions or conditions, some or all of the associated information is optional, in some embodiments. In the illustrated embodiment, it is possible to sort or reverse sort on the descriptions 476 (e.g., alphabetically) or on any of the associated information items 474, 472, 478, and 480 such as by actuating a column header 488, 490, 491, and 492 or by actuating a column header a second time to reverse the sort order. In the illustrated embodiment, the screen 470 further includes an element 482 for each screening rule for which the administrator can edit the rule, as well as an element 486 using which a new screening rule can be added. For example, in the illustrated embodiment, if the element 486 is actuated, the screen of FIG. 11 is brought up. In the illustrated embodiments, the screen 470 further includes an element 496 which, if actuated, causes a download of screening rules to begin, such as in comma separated value format. In the illustrated embodiments, the screen 470 further includes an element 498 which, if actuated, causes a download of condition details to begin, such as in comma separated value format FIGS. 18A and B, when placed side by side, show a screen 502 for displaying or searching through calls received by the system of FIG. 1, and for starting intake questionnaires for specific calls. In some embodiments, the PBX 14 assembles information about calls and passes the information to the OAI Listener 18 in server 12. In some embodiments, OAI or call meta data is collected which allows the intake form 370 (FIG. 15) to read the meta data.

In the illustrated embodiment, the screen 502 includes information about a list of calls including the time and date when the call started 504, the phone number 506 that the caller dialed, the time and date 508 when the call was picked up, the station 510 that answered the call, the duration 512 of the call, the phone number 514 of the caller, the caller ID information 516 of the caller, and the OAI call ID 518. More or less information could be provided. In the illustrated embodiment, the screen 502 further includes, for each call, an element 519 which, when actuated, brings up an intake form (e.g., FIG. 15 plus FIG. 14). The intake form may already be filled or partially filled. In various embodiments, information about outgoing calls is also collected and can be displayed on a screen. Various elements are included for sorting through incoming phone calls, in the illustrated embodiment. For example, using an element 520, calls can be selected for a particular incoming phone line (which may be associated with a particular client); using an element 522, calls can be selected having a particular status; and using element 524, calls can be selected that were not answered or that were answered or both. Using elements 526 and 528, time ranges for when calls started can be specified. Using element 526, calls can be selected that started on or after a certain time, and using element 528, calls can be selected that started on or before a certain time. A range can be specified by using both elements 526 and 528. In various embodiments, the server 12 (FIG. 1) is linked to the PBX 14 such that if a user actuates on an internal or external person's name from one of the screens described above, their phone or workstation will call that person.

In some embodiments, the server 12 (FIG. 1) is able to differentiate between administrators and intake clerks (customer service representatives), such as based on login credentials. A user, designated as the administrator ("Admin") has elevated permission levels to manage the screening tool 78 (FIG. 3). For example, in some embodiments, the intake clerk is able to fill intake questionnaires, add notes to intakes, change intakes, but is not able to create or edit a screening rule. In these embodiments, only an administrator is able to create or edit a screening rule. Thus, the administrator has elevated permission to manage the system 10 (FIG. 1). In some embodiments, the administrator has the ability to create and define roles for various users such as intake clerks or other users, in a manner defined by the administrator. In some embodiments, data patterns identified by the administrator are presented to users of defined roles upon login, in a manner defined by the administrator. The presentation of data can be in list form or other means of visualization such as charts or graphs.

In some embodiments, data as well as direct user input is collected in real time by the server 12, with an active audit trail. The server 12 stores data entered or changed by intake clerks, administrators, and maintains old versions. If data is changed incorrectly, it is possible to determine which user made the change and when it happened. In some embodiments, an automated snapshot of collected data is taken every so often (e.g., every 24 hours), so that there is a historic record.

Thus, systems and methods have been provided that allow a quicker decision on whether or not to accept a client. When a quicker decision is made, there is a higher conversion rate. If a decision is not made quickly, the potential client (or customer) may go to another law firm (or service provider), lose interest, or take some other action.

While presented above in the context of being a tool for selecting a client or customer, the screening tool 78 has other applications. For example, in some embodiments, the screening tool is used to evaluate the value of a product. In some embodiments, a certain demographic may be more likely to buy a certain product. If a customer has a certain score, they are shown a certain product in advertising. For example, customers with average incomes living in snowy locations may receive a score indicating that they should be shown advertising for snowblowers while customers with scores indicating that they live in warm clients would be shown advertisements for lawnmowers.

The screening tool 78, by allowing programming by users, reduces the total number of lines of code required. A much larger amount of code would be required to program for every possible scoring alternative or even for a large number of scoring schemes. In addition, by increasing paralegal efficiency, the screening tool 78 reduces the number of paralegals required along with a corresponding number of workstations.

In various embodiments, the screening tool 78 is one component of a larger case management system. In some embodiments the larger case management system is one that tracks contacts with clients and prompts professionals to keep in contact with the clients and others to more quickly reach a disposition of a matter. The case management system receives and stores intake details about a legal matter, and perform case management functions such as storing contacts, managing workflow, tracking timelines, generating documents, automatically calculating dates when tasks should be performed, and allowing and storing communication between attorneys in a firm. In some embodiments, the case management system provides functions such as those possible using Abacus Law, Amicus Attorney, Needles, Time Matters or similar case management systems. In addition, the case management system provides functions as will now be described.

The logic tool of the invention evidenced in screening tool 78 is the foundation for other case management tools in the case management system such as a multitude of checklists and a multitude of dashboards. The case management system provides checklists in some embodiments. In the context of a checklist, the logic statements are reflected in a checklist. The checklist comprises a set of reminders designed to drive work flow for a particular type matter. One reminder comprises a single task. Each reminder is its own logic statement, in various embodiments. A matter may comprise any number of checklists and each checklist may contain any number of reminders. Logic statements in the checklist contain a multitude of parameters. For example, a logic statement can be associated with a particular case type, or a particular entity involved in the case, (e.g., Case, Record Request, Insurance Policy, Involvement, or Note). In addition to associations, top-level logic statements are configured to further refine when a reminder shows within an individual case. The logic statements which create the reminder are configured with multiple levels of logic. The logic statements are created by a user or administrator by utilizing the logic tool to select filters and triggers without the need of programming knowledge or need for hard coding. For example, the logic statement can dictate that a reminder appears to the user when the prescribed logic is fulfilled. Further logic factors on the reminder are configured to repeat the reminder over X number of days, when additional logic conditions are met, and be associated with a merge document which can be presented to the user automatically after the logic conditions are met.

FIGS. 19A and B, when placed side by side, illustrate a screen 550 listing a plurality of checklists 552-566. There could be more or fewer checklists defined by a user. For each checklist 552-566, the screen 550 shows a client name 570, a user-definable checklist name 572, a check type 574 selectable from a plurality of predetermined alternatives, filter conditions 576 summarizing what logic is used to find items to be included in the checklist, a counter 578 (see FIG. 20B) showing the number of checklist items, and an element 580 (see FIG. 20B), a hyperlink in the illustrated embodiments, which, when actuated, allows the checklist to be edited. More, fewer, or different items could be included in the screen 550.

The screen 550 further includes an element 582, a pull down menu in the illustrated embodiments, using which the type of checklists shown can be changed. The different types of checklists, in the illustrated embodiments, include Case checklists, Record Request checklists, Insurance Policy checklists, Involvement checklists, and Note checklists. FIGS. 20A and 20B illustrate the graphical user interface of FIGS. 19A and 19B after a checklist type has been selected.

FIGS. 21A and 21B illustrate a graphical user interface screen 583 listing a plurality of checklist items 584-595 included in one of the checklists of FIGS. 19A and 19B. In the illustrated embodiments, the screen 583 displays, for each checklist item 584-595, a checklist id number 600, a checklist template name 602, a checklist position number 604, a checklist name 606, checklist filter conditions 608, checklist trigger method 610, an indication 612 of days due, a repeating indication 614, an indication 616 of whether there are limitations, an indication 618 of whether to keep the checklist after the trigger method is triggered, an indication 620 of to whom the checklist is assigned, a mail merge template 622 (if any), a name 624 of a parent (if any), a number 626 of children, a comment 628 (if any), and an element 630 (a hyperlink in the illustrated embodiments) which, if actuated, allows the checklist to be edited. The screen 583 also includes a pull down menu 632 using which a user can select a checklist type. Checklists of the selected type are displayed on the screen 583. The screen 583 also includes a box 634 for a checklist name, and a pull down menu 636 using which a user can select a parent checklist item. The screen 583 also includes a checkbox 638 for selectings roots only. More, fewer, or different items could be included in the screen 583.

Figure 22A:
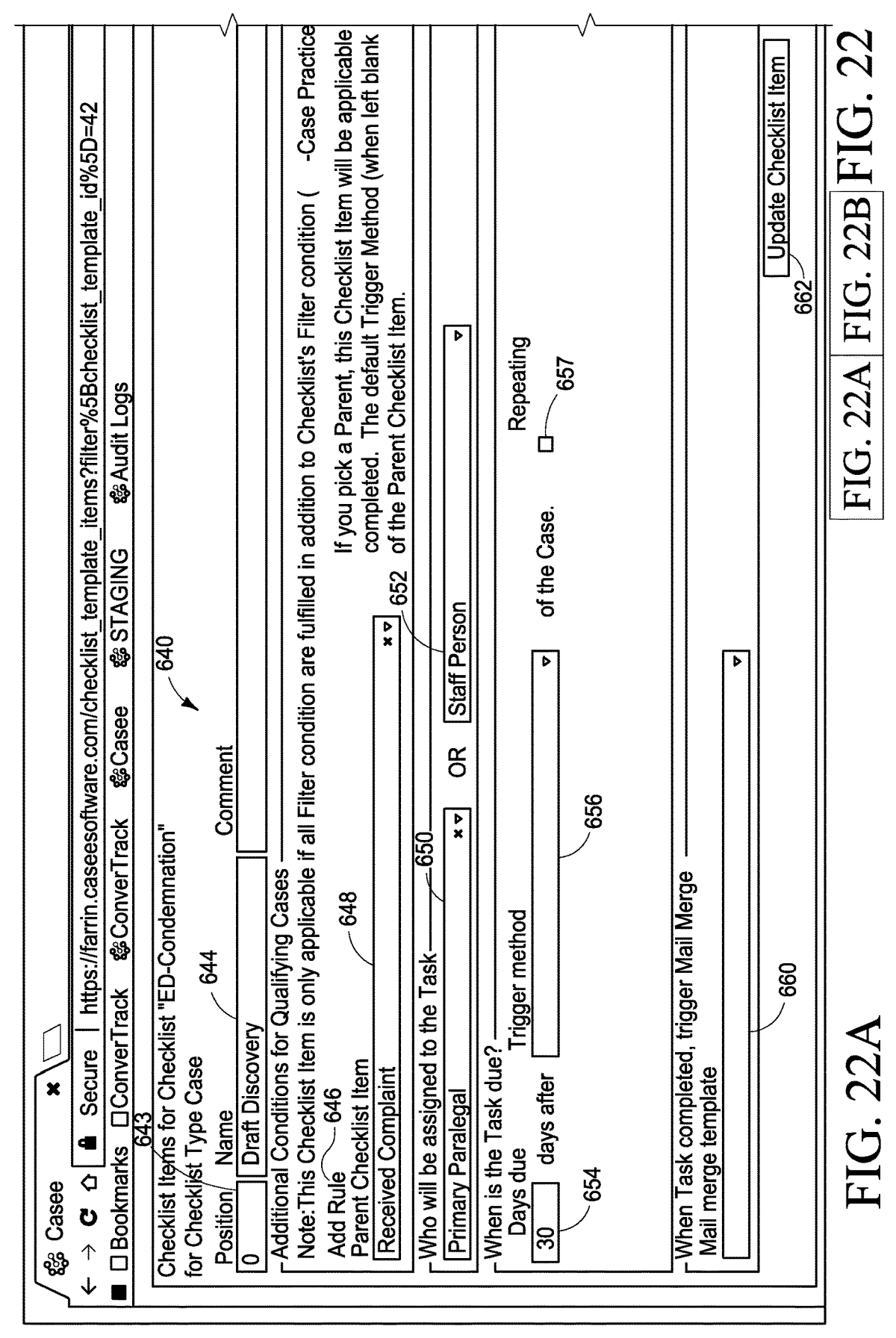
Figure 22B:
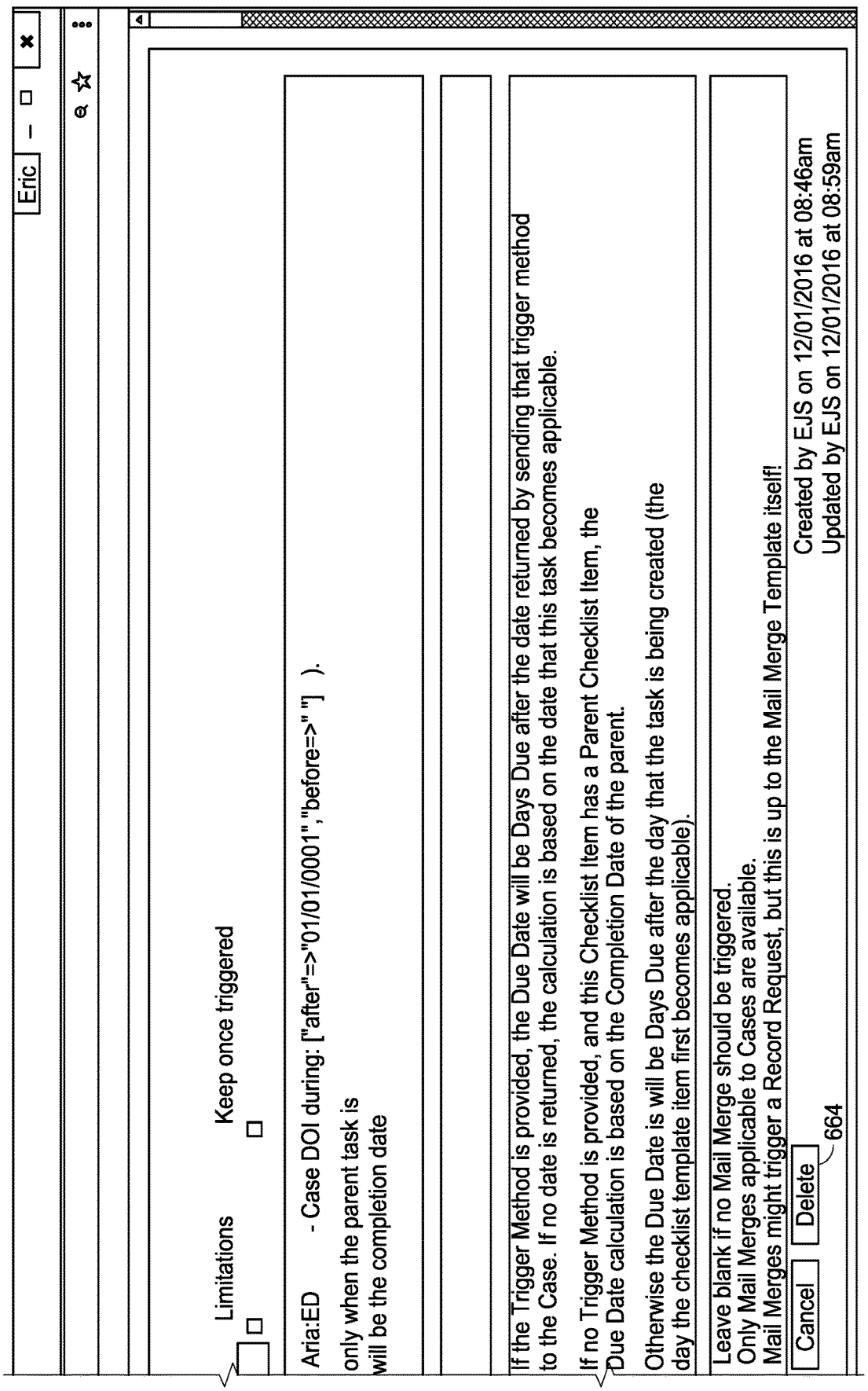

FIGS. 22A and 22B illustrate a graphical user interface screen 640 showing logic details of one of the checklist items 589 of FIGS. 21A and 21B. The screen 640 includes a box 643 into which a user can enter a number to adjust the position of the checklist item, and an element 644 showing the name of the checklist item. The screen 640 further includes an element 646, a hyperlink in the illustrated embodiments, which, if actuated, allows a user to add another rule for the checklist of the screen 640. The screen 640 further includes a pull down menu 648 using which a rule condition type can be selected by a user. The screen 640 further includes pull down menus 650 and 652 using which a person can be assigned to the task. In the illustrated embodiments, the menu 650 displays task assignees by role name. Alternatively, the user can use menu 652 to select a task assignee by an individual's name. The screen 640 further includes a text box 654 in which a user can enter a number of days. The screen 640 further includes a pull down menu 656 using which a trigger method type can be selected by a user, and a checkbox 657 with which a user can indicate whether the date is repeating. The screen 640 further includes a pull down menu 660 using which a mail merge template can be selected by a user. A letter, email, or text is automatically generated, in some embodiments, using the mail merge template, when the task of the checklist item is completed. The screen 640 further includes an element 662 for saving or updating the checklist item, and an element 664 for deleting the checklist item.

Figure 23A:
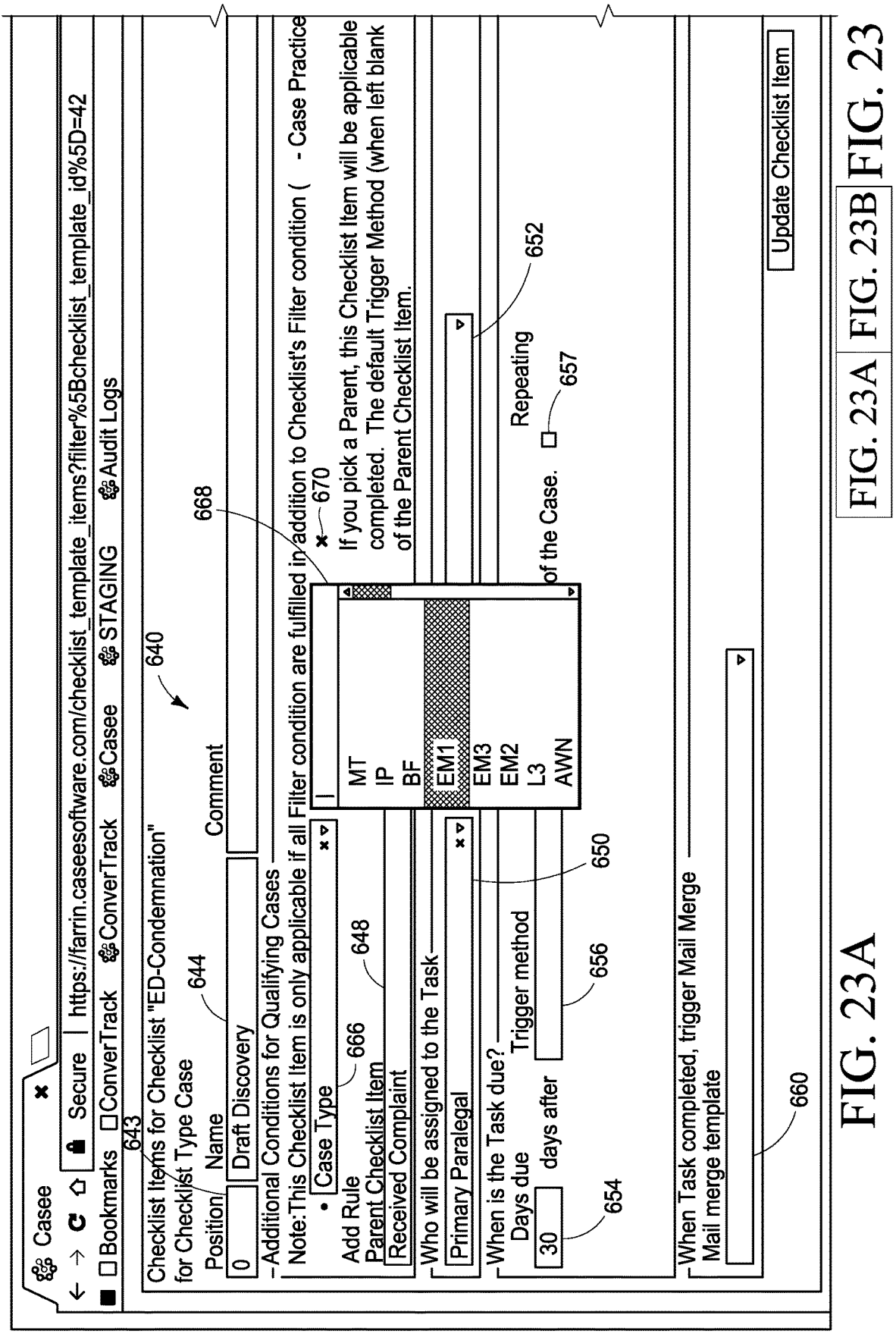

FIGS. 23A and 23B illustrate a graphical user interface showing a rule being added to the logic of the checklist item of FIGS. 22A and 22B. More particularly, in the illustrated embodiments, a rule is being added using pull down menus 666 and 668 requiring that the case type be EM1 to show up in this checklist. The case types may be abbreviated in different ways for different firms. If the user decides, after all, that they do not want to add this rule, they can actuate a cancel element 670 of the screen 640.

Figure 24A:
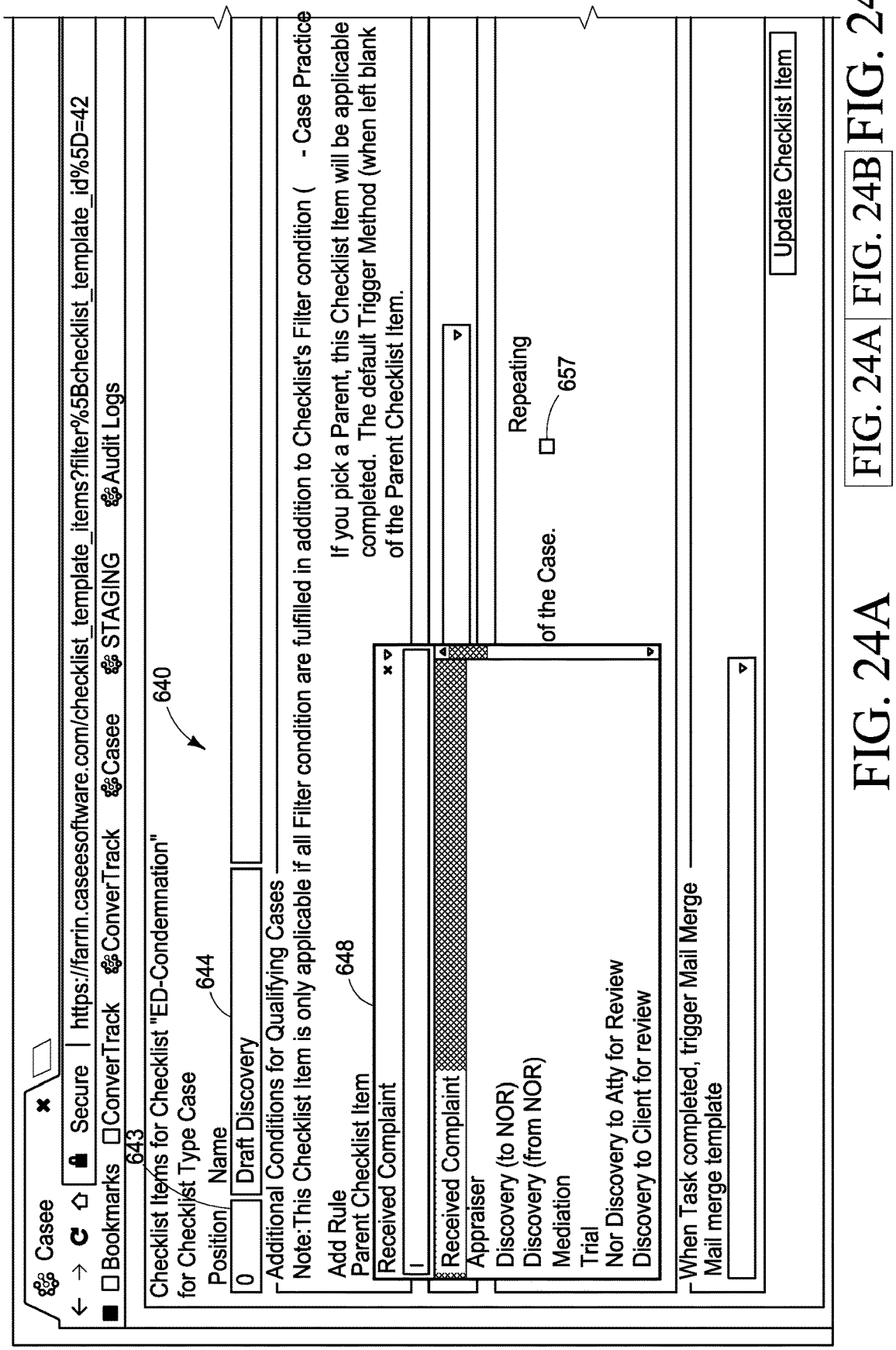
FIGS. 24A and 24B are to be assembled.
Figure 24B:
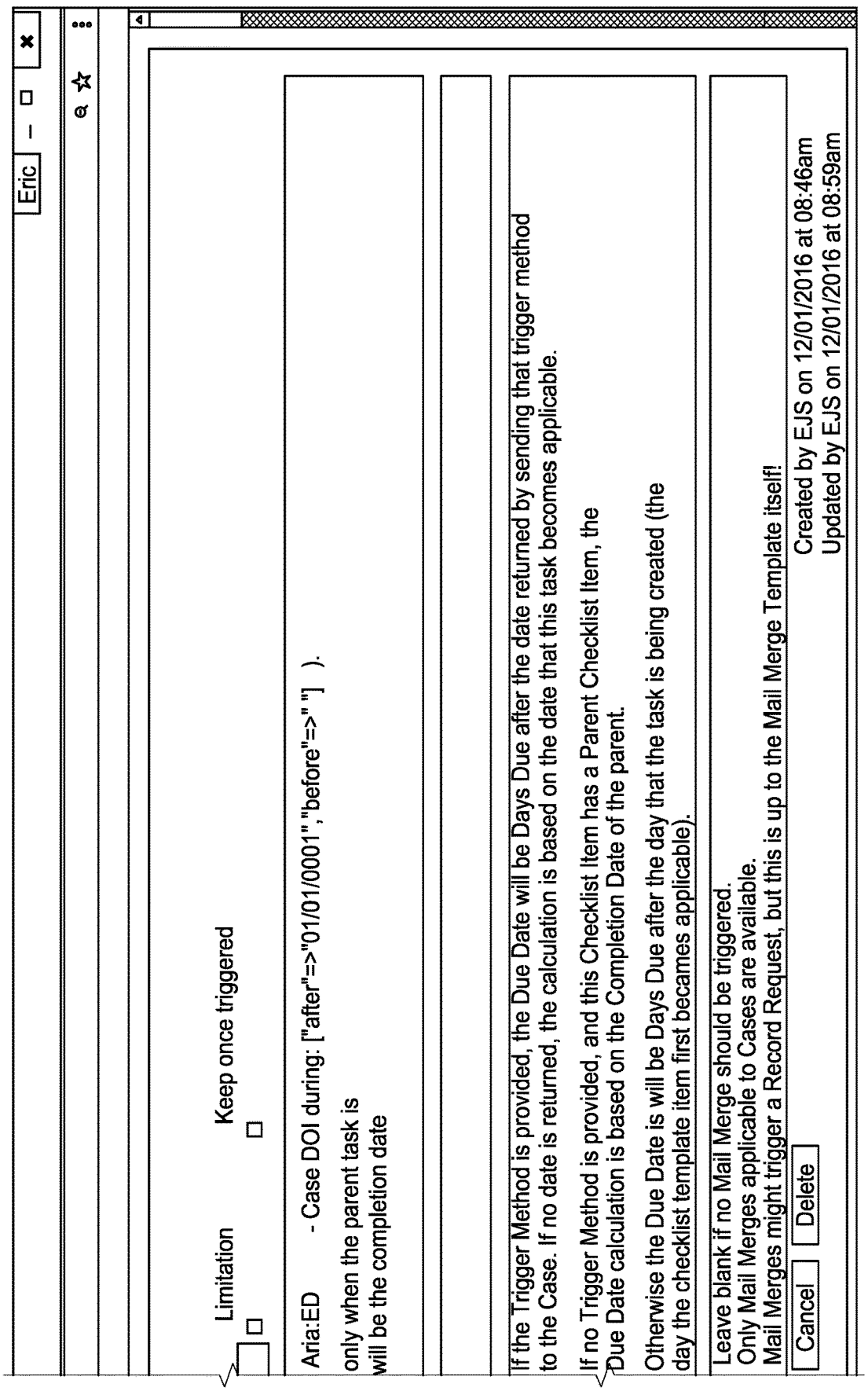
Figures 27, 27A:
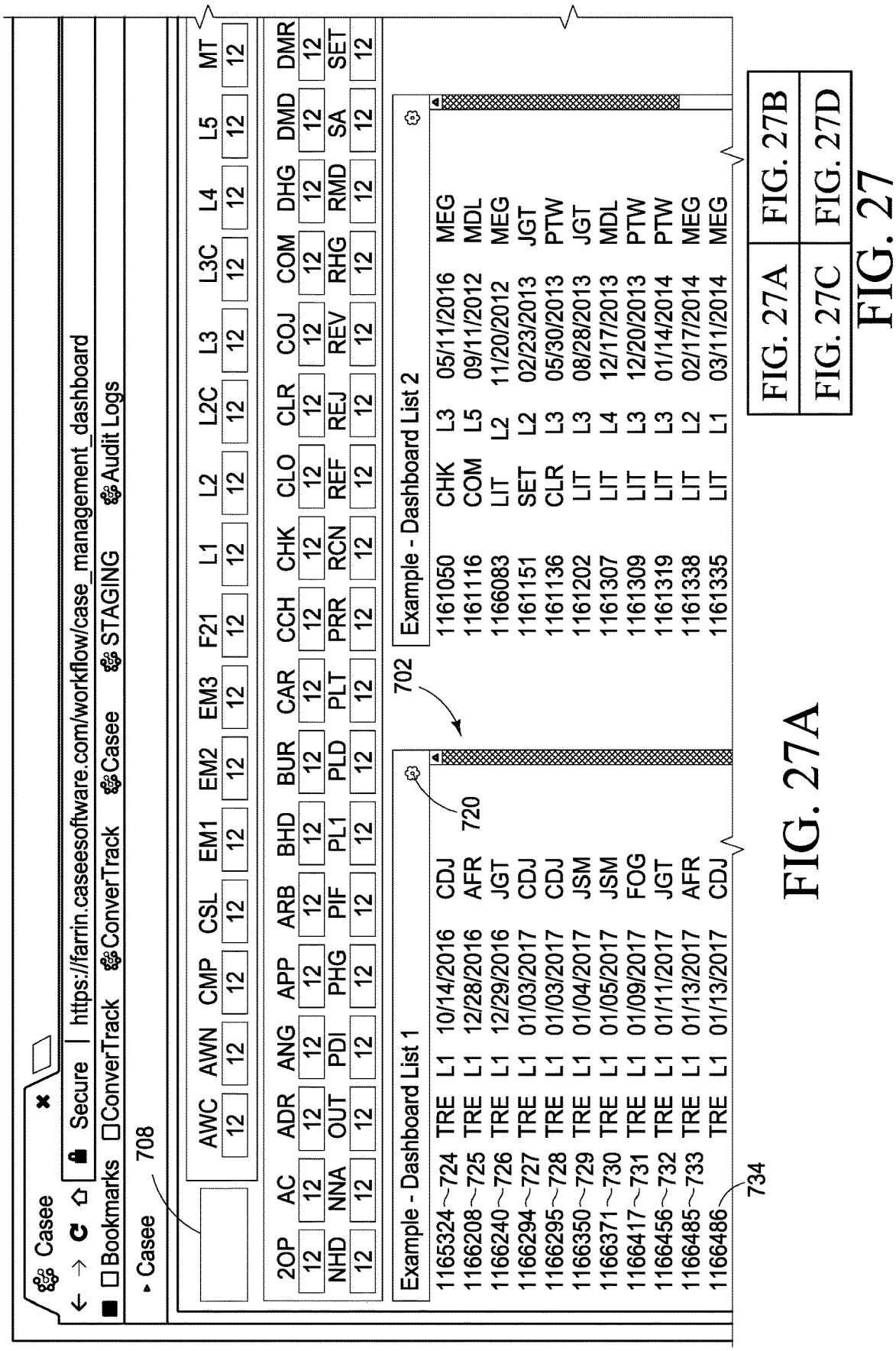
Figure 27C:
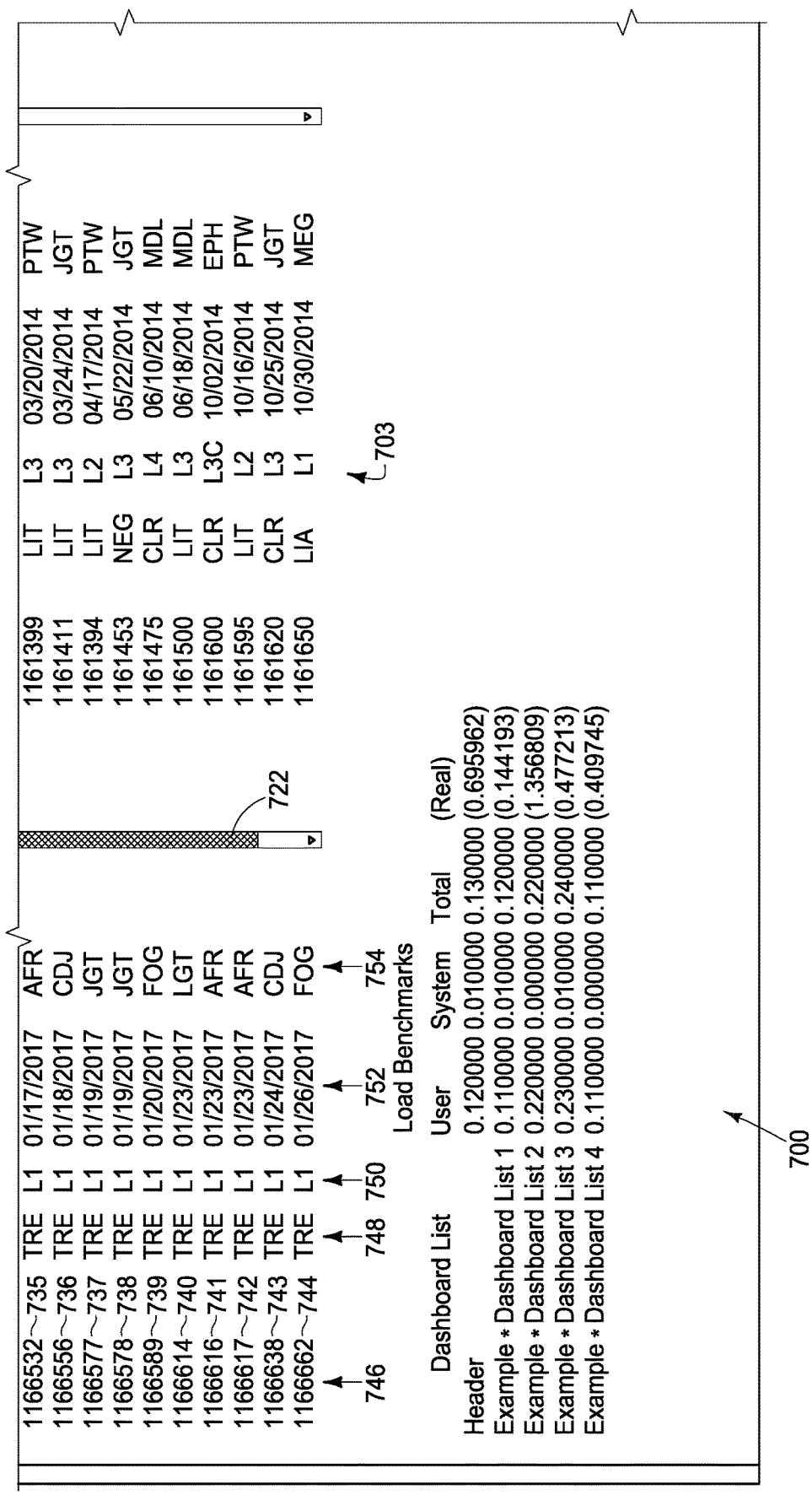

FIGS. 24A and 24B illustrate a graphical user interface showing a condition pull down menu 648 being pulled down from the graphical user interface of FIGS. 23A and 23B. In the illustrated embodiments, the alternatives included in the condition pull down menu 648 relate to events that may occur in a legal case such as receipt of a complaint, discovery, mediation, trial, etc. The events do not need to be sequential.

FIGS. 25A and 25B illustrate a graphical user interface showing a task due timing pull down menu 656 being pulled down from the graphical user interface of FIGS. 24A and 24B. In the illustrated embodiments, the alternatives included in the task due timing pull down menu 656 include dates of events that may occur in a legal case such as the date a case is closed, the date of an incident giving rise to a legal claim, the date of a statute of limitations, etc. The numerical values corresponding to these dates of events are stored in or calculated by the system so that the user can create a task based on a type of event date without knowing the actual date when the events occurred.

Figure 26A:
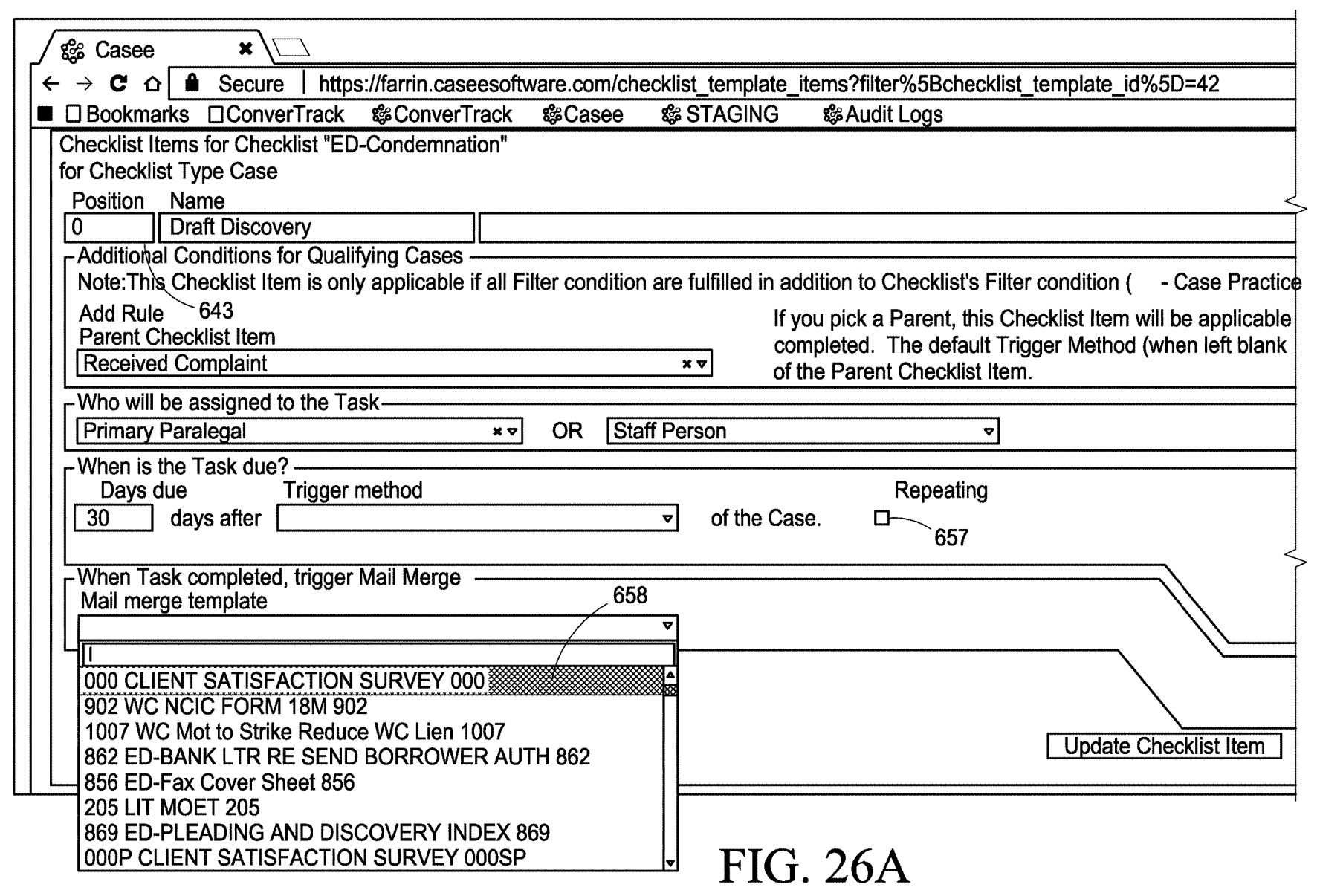

FIGS. 26A and 26B illustrate a graphical user interface showing a mail merge options pull down menu 658 being pulled down from the graphical user interface of FIGS. 25A and 25B. Using the menu 658, a user can select a mail merge form to be used for automatic generation of a letter (or email, text message, or fax in some embodiments) after the task has been completed.

In addition to use of the logic tool for checklists, the case management system provides use of the logic tool to create dashboards for users, in some embodiments. See, for example, the screen 700 shown in FIGS. 27A, 27B, 27C and 27D. A dashboard includes a set of panels 702-705, in the illustrated embodiments. Each panel comprises a list of items (e.g., cases or entities) that all have the same characteristics, in the illustrated embodiments. For example, a panel 702-705 may contain all new legal cases obtained by a law firm within the last 7 days. The dashboard creates for a user a broad view of the user's workload in a manner that highlights the most pertinent matters, for example, stages of the workload. In the context of a dashboard, logic statements drive the list in each panel, in which all items within the list comport to the conditions within the logic statement. The logic tool enables the user or administrator to create the logic behind the dashboard panels without programming knowledge and without the need for hard coding. Dashboards can be associated with an individual user, an individual's role, a workgroup (collection of users), a practice area, or firm wide. Dashboards comprise an unlimited number of lists, but, in some embodiments, contain the lists most pertinent to the user based on the user's role (e.g., defines the users workload, presents the user with the entire case load, etc.) Within a dashboard, lists can be configured with multiple levels of logic such that only cases meeting all of the logic arguments appears to the user on the dashboard panel. If a case no longer meets the logic requirement, the list is updated and the updated panel is shown to the user in the dashboard.

In addition to the panels 702-705, the screen 700 further includes, in the illustrated embodiments, a display area 708 that shows the total number of cases being handled by the user or the firm, as well as display areas 710 that show the number of cases the firm has for different types of matter. Different firms may use different types of abbreviations for matter types. For example, in the illustrated embodiments, L1 stands for a level one or standard automobile accident case. The screen 700 further includes display areas 712 showing numbers of cases for other categories, such as for each case type. The screen 700 further includes, in the illustrated embodiments, a pull down menu 714 using which a user can select dashboards for a particular attorney or staff member. The screen 700 further includes, in the illustrated embodiments, a pull down menu 716 using which a user can select dashboard lists of a certain type. The screen 700 further includes an element 718 which, if actuated, causes a refresh of the numbers and dashboard lists based on current information.

In the illustrated embodiments, each dashboard panel 702-705 includes a settings element 720 which, when actuated by a user, brings up settings options for the panel. Each panel 702-705 also includes entries such as entries 724-744 and a scroll bar 722 for scrolling through entries if there are more entries than fit in a display area allocated to a panel. Each entry 724-744 includes a unique identification number 746, a case status indicator 748, a case type indicator 750, a date 752, and the initials 754 of the responsible attorney or staff member. In various embodiments, the items included in each entry 724-744 are user-configurable. For example, entity name, settlement amount, or other case information can be shown in the panel 702-705.

In various embodiments, different users have different dashboards having multiple lists generated based on user-selected parameters. For example, one list could be for cases for which there has been no client contact in the last two weeks. Another list could be for cases for which a client is waiting for medical treatment. The lists can act as task lists or to-do lists. When user actions are completed, the item disappears from the list as the condition (e.g., no contact in the last two weeks) is no longer true. The dashboard concept is very useful for efficiency. The dashboards can be configured by workgroups so that multiple user dashboards may be aggregated. For example, a supervisor can view tasks that he or she needs to complete as well as tasks that the supervisor has assigned to subordinates.

Figure 28A:
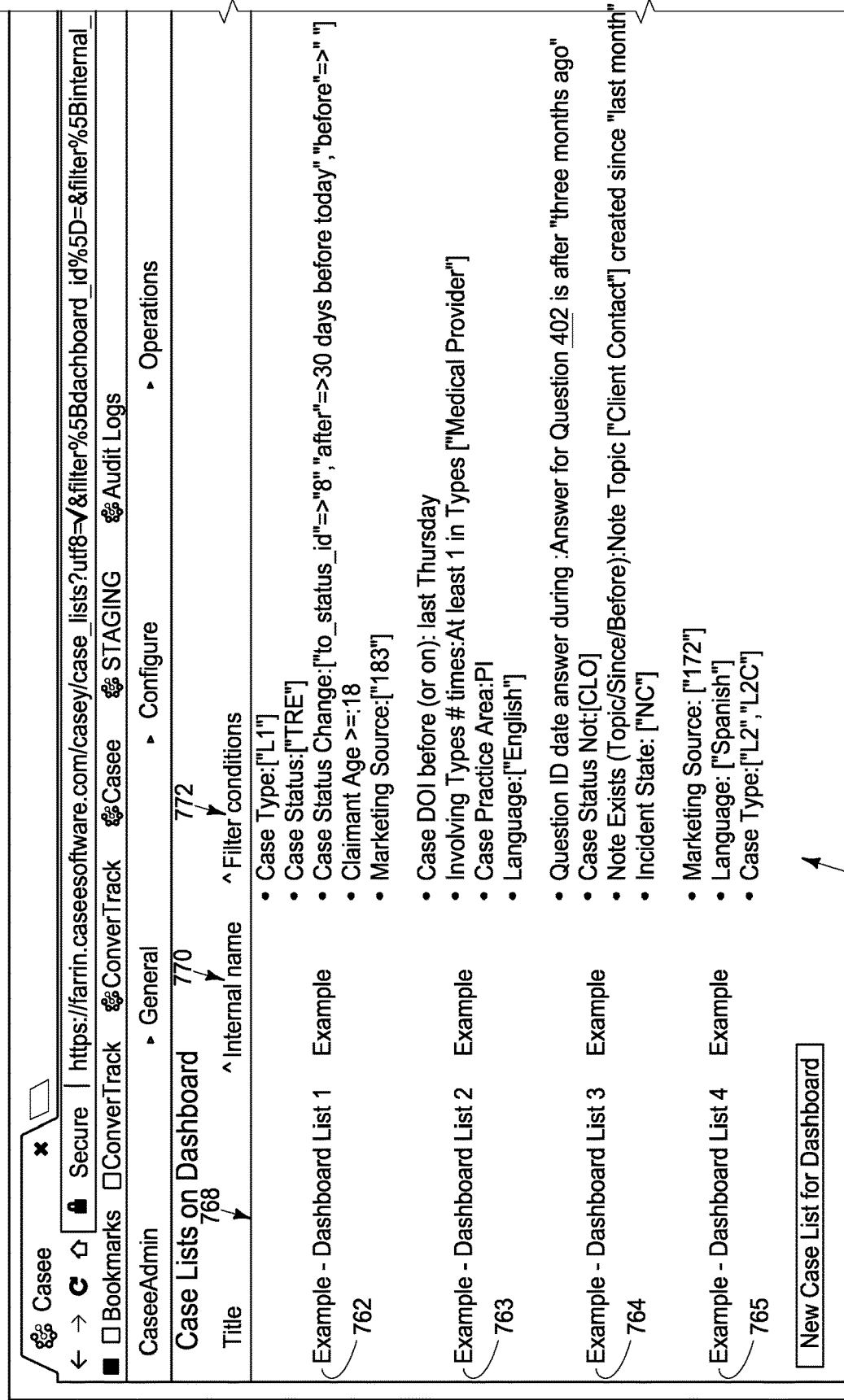
FIGS. 28A and 28B are to be assembled.
Figure 28B:
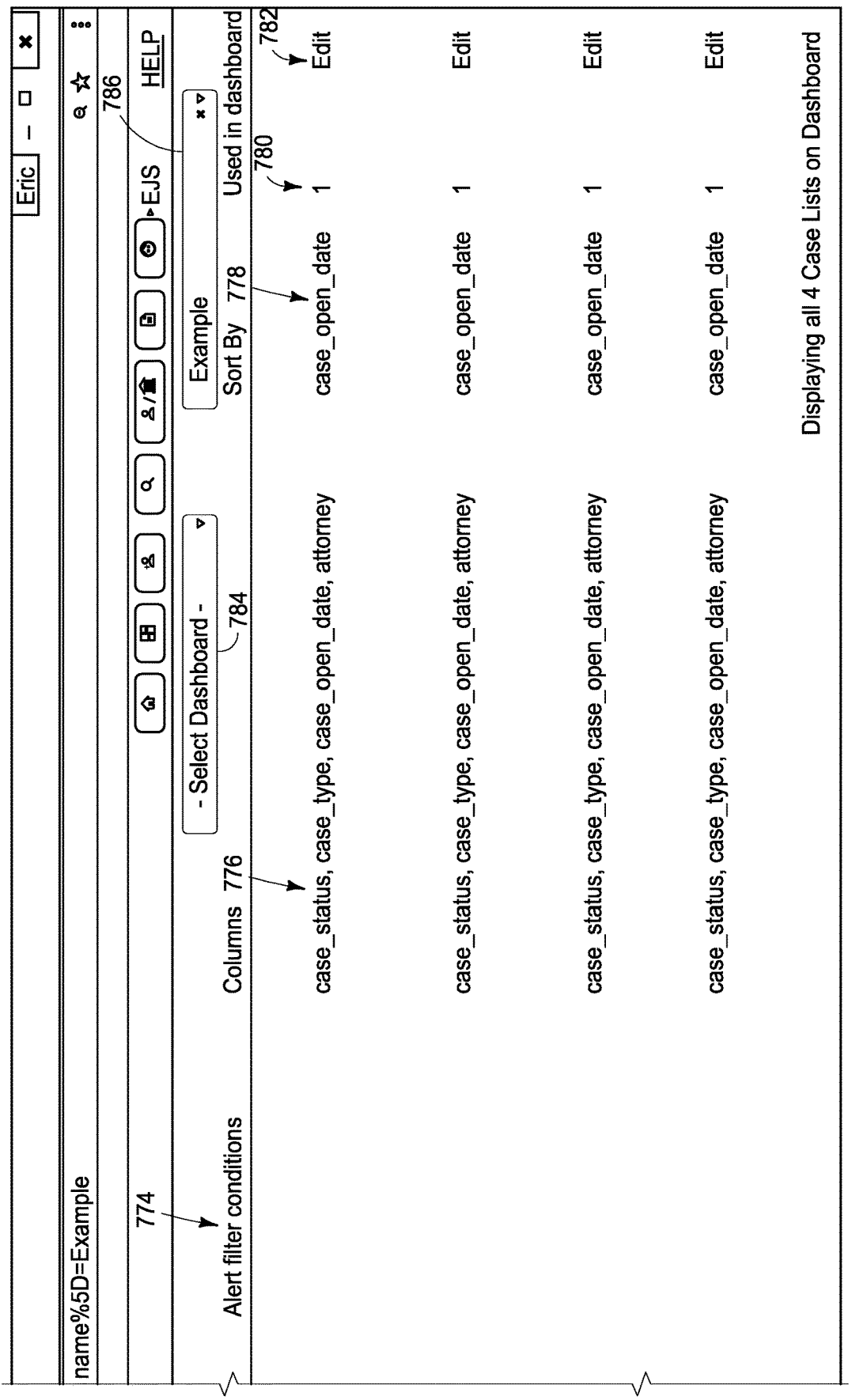

FIGS. 28A and 28B illustrate a graphical user interface screen 760 showing definitions 762-765 for dashboard items 702-705. Each definition 762-765 includes a title 768, an internal name 770, user-definable filter conditions 772, alert filter conditions 774, user-definable columns 776 included in each dashboard list, a sort order 778, a flag 780 indicating whether the definition is used in the dashboard, and an element 782 which, if actuated, allows a user to edit the definition 762-765. The screen 760 further includes a pull down menu 784 using which a user can select a dashboard and a pull down menu 786 using which a user can select a dashboard type.

FIGS. 29A, 29B, 29C and 29D illustrate a graphical user interface screen 790, similar to the screen 760, except showing how definition rules can be edited, added, or deleted to define one of the dashboard lists. More particularly, in the illustrated embodiments, definition 764 has been selected for potential editing. The screen 790 includes a text box 792 in which the title 768 can be edited, a text box 794 in which the internal name 770 can be edited, and a list of parameters 796-799, any of which can be removed by clicking on an "x" element adjacent the parameter name. The screen 790 further includes a pull down menu 802 using which a user can add a parameter. The screen 790 further includes rules 804-807, any of which can be removed by clicking on an "x" element adjacent the rule name, and an element 810 which, when actuated by a user, allows a new rule to be added. The screen 790 further includes a pull down menu 812 using which a user can copy from another case list, an update item 814, a cancel button 816, and a delete button 818.

Figures 29, 29A:
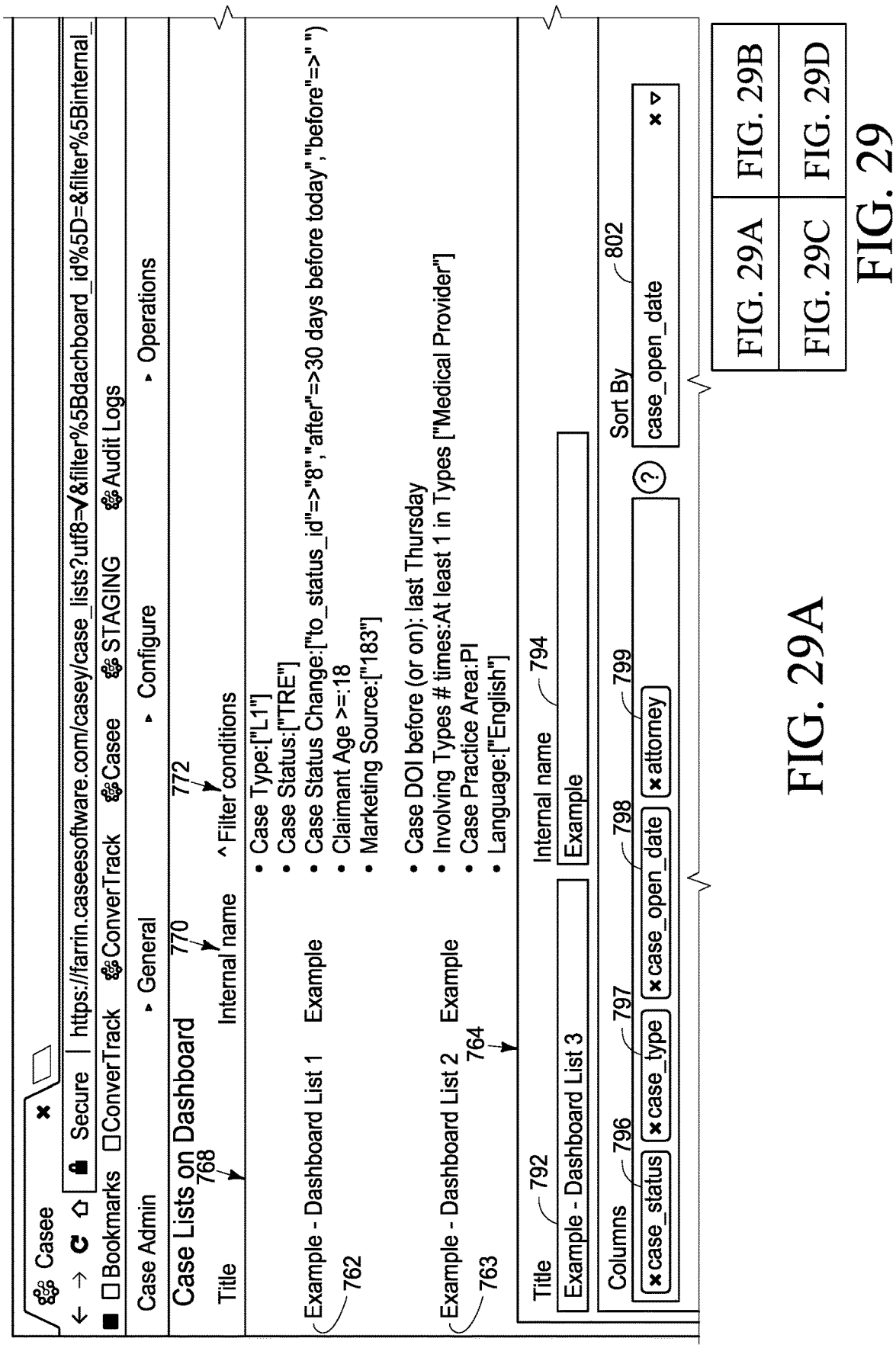
Figure 29C:
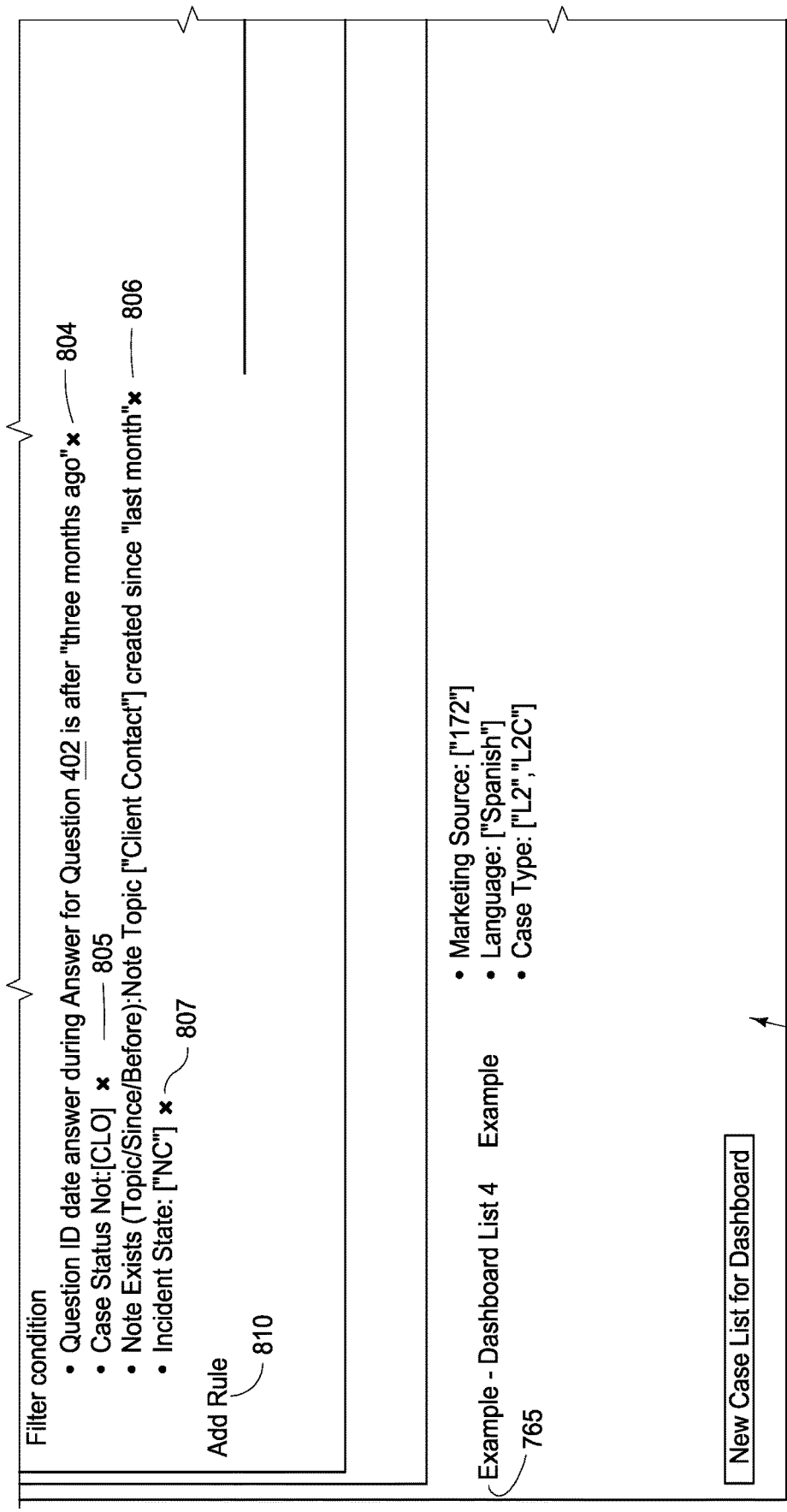
Figure 29D:
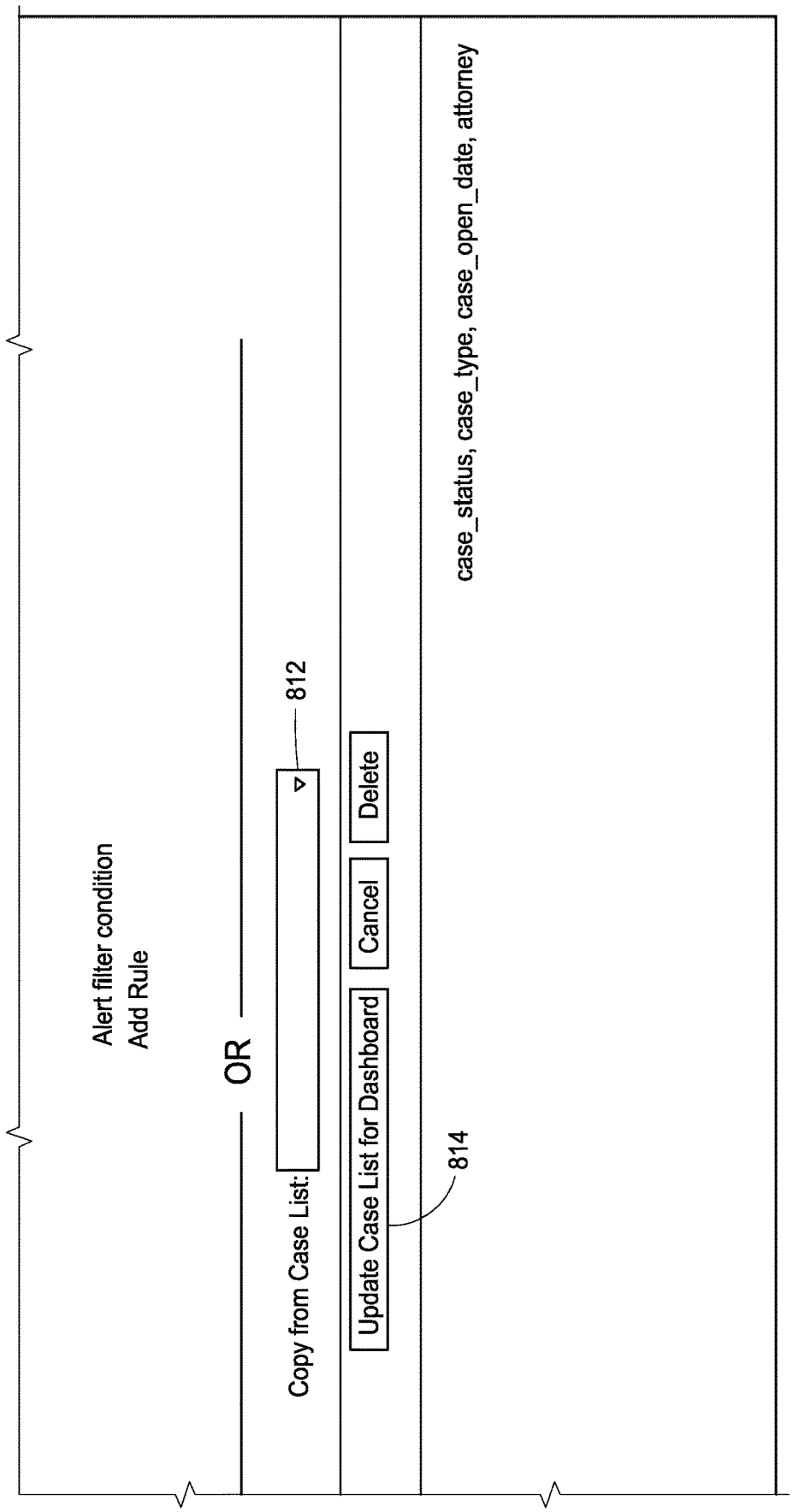
Figure 30A:
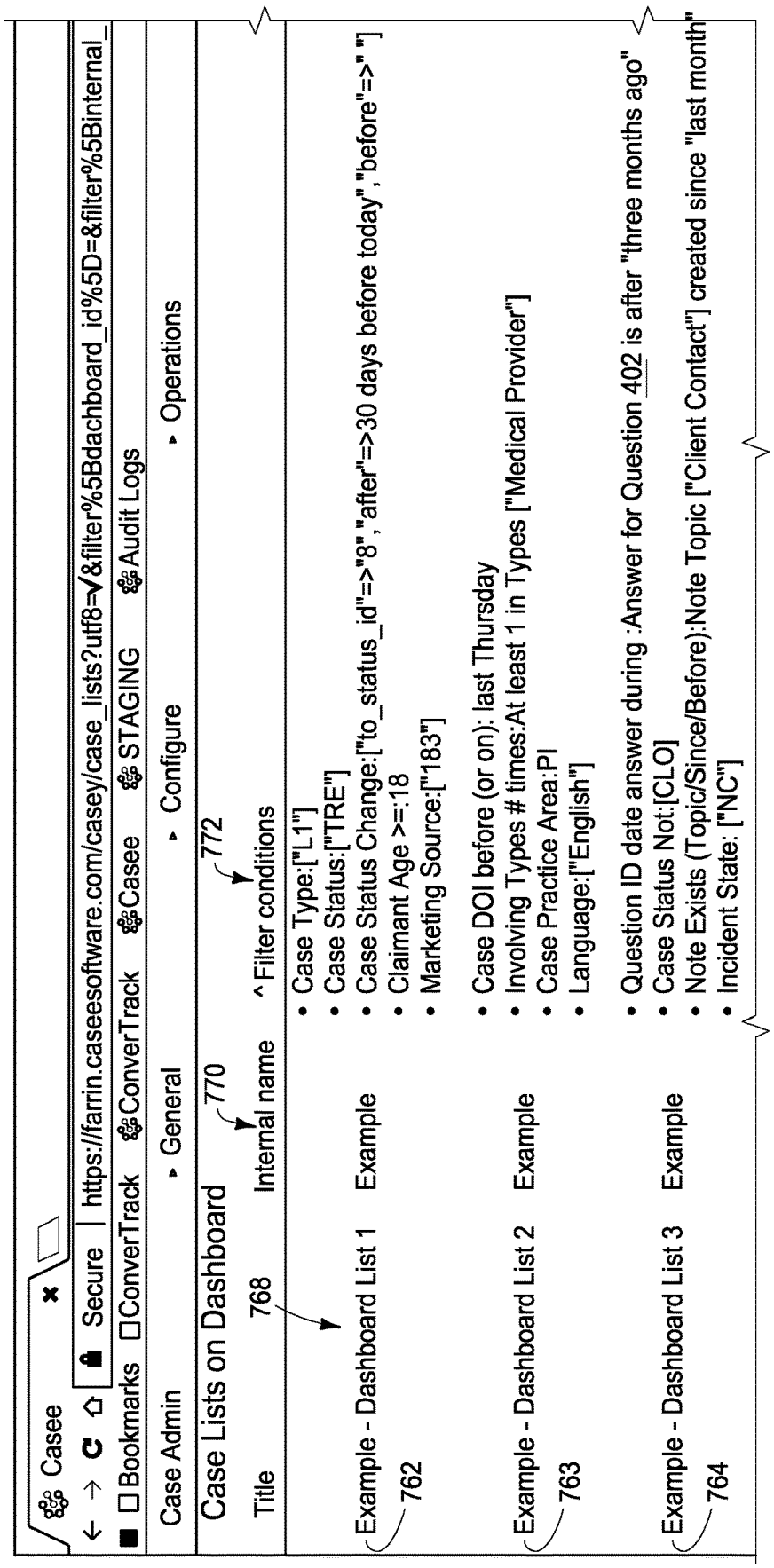
FIGS. 30A, 30B, 30C, and 30D are to be assembled.
Figure 30B:
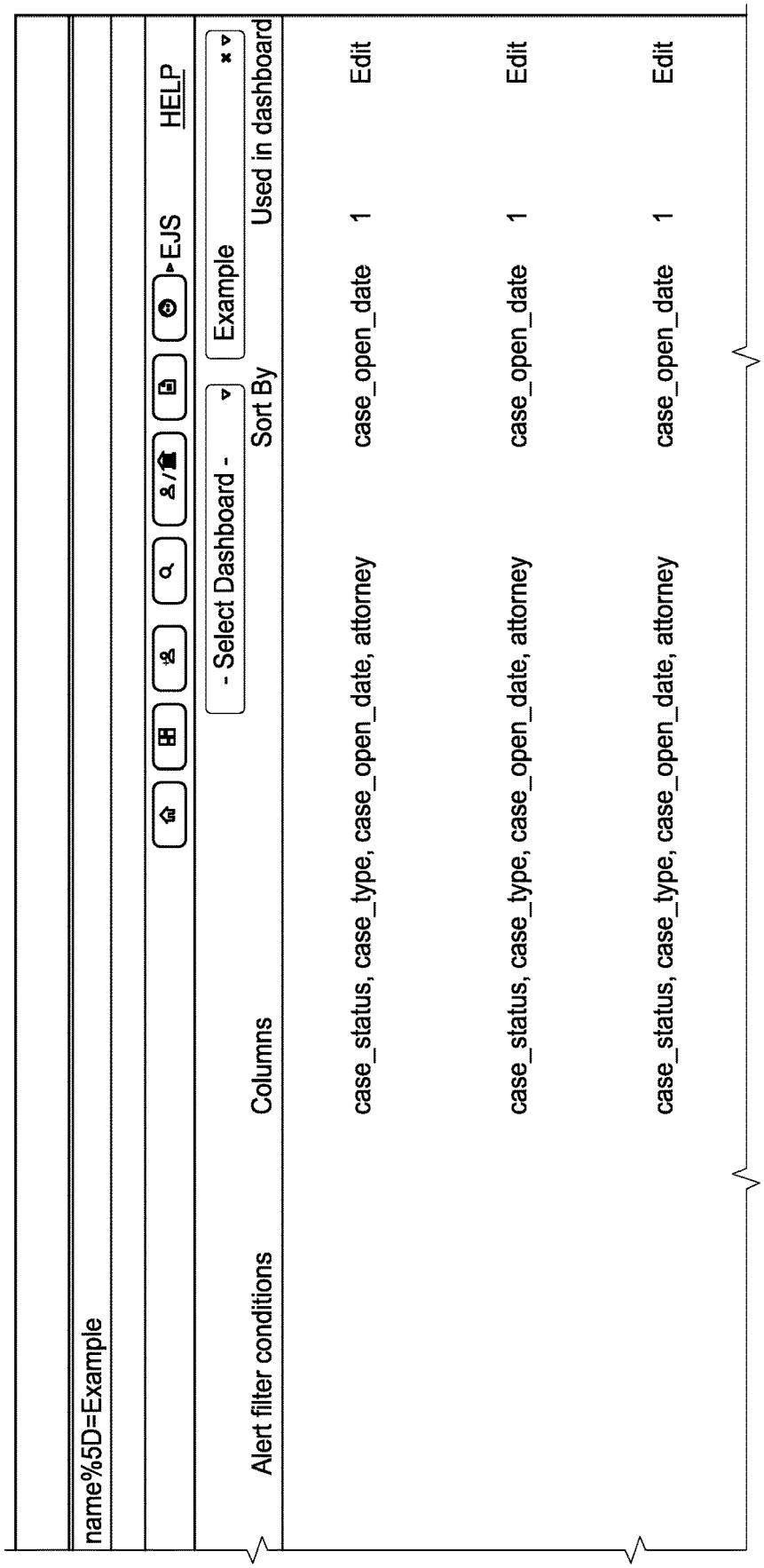
Figure 30C:
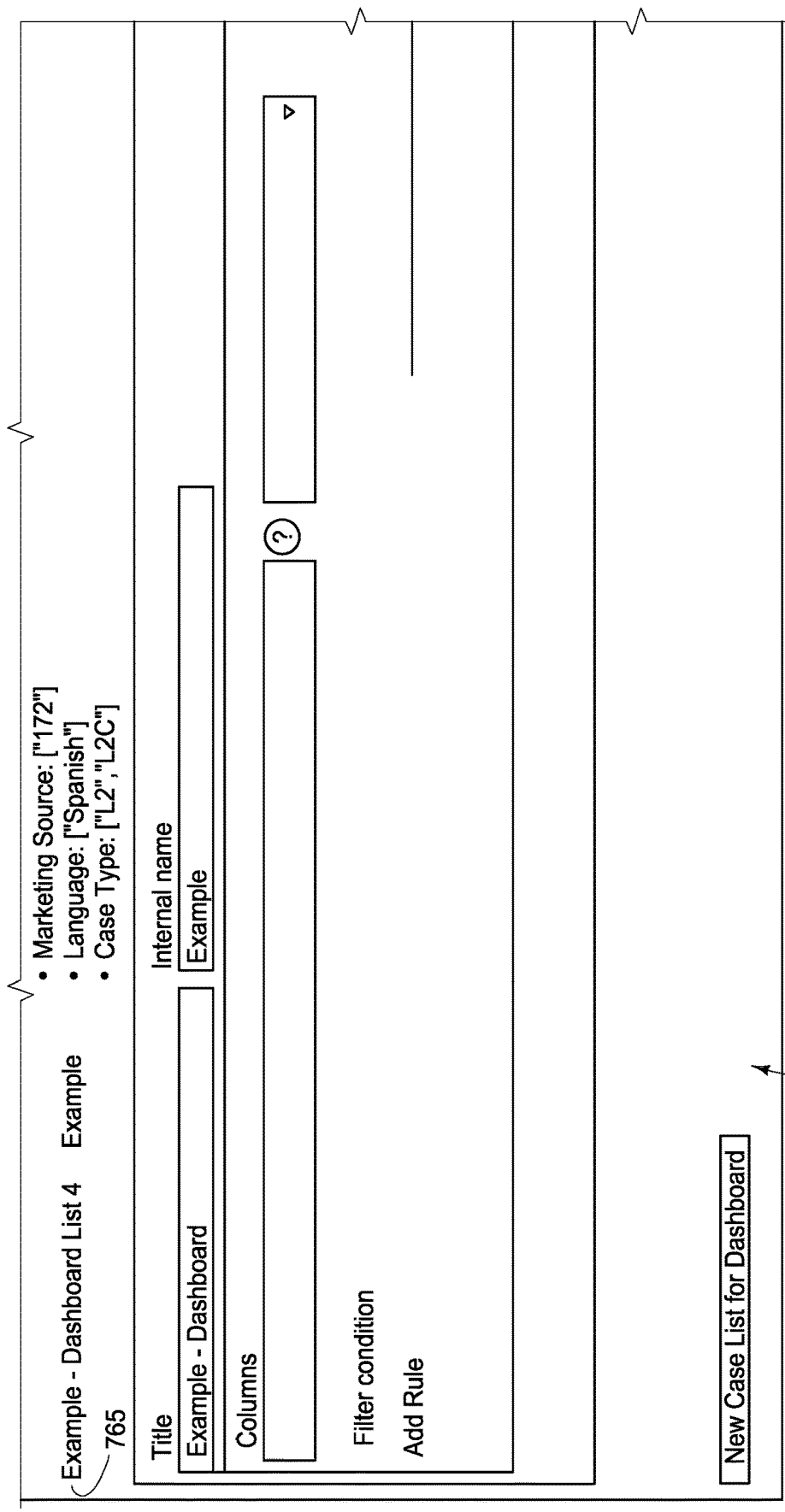
Figure 30D:
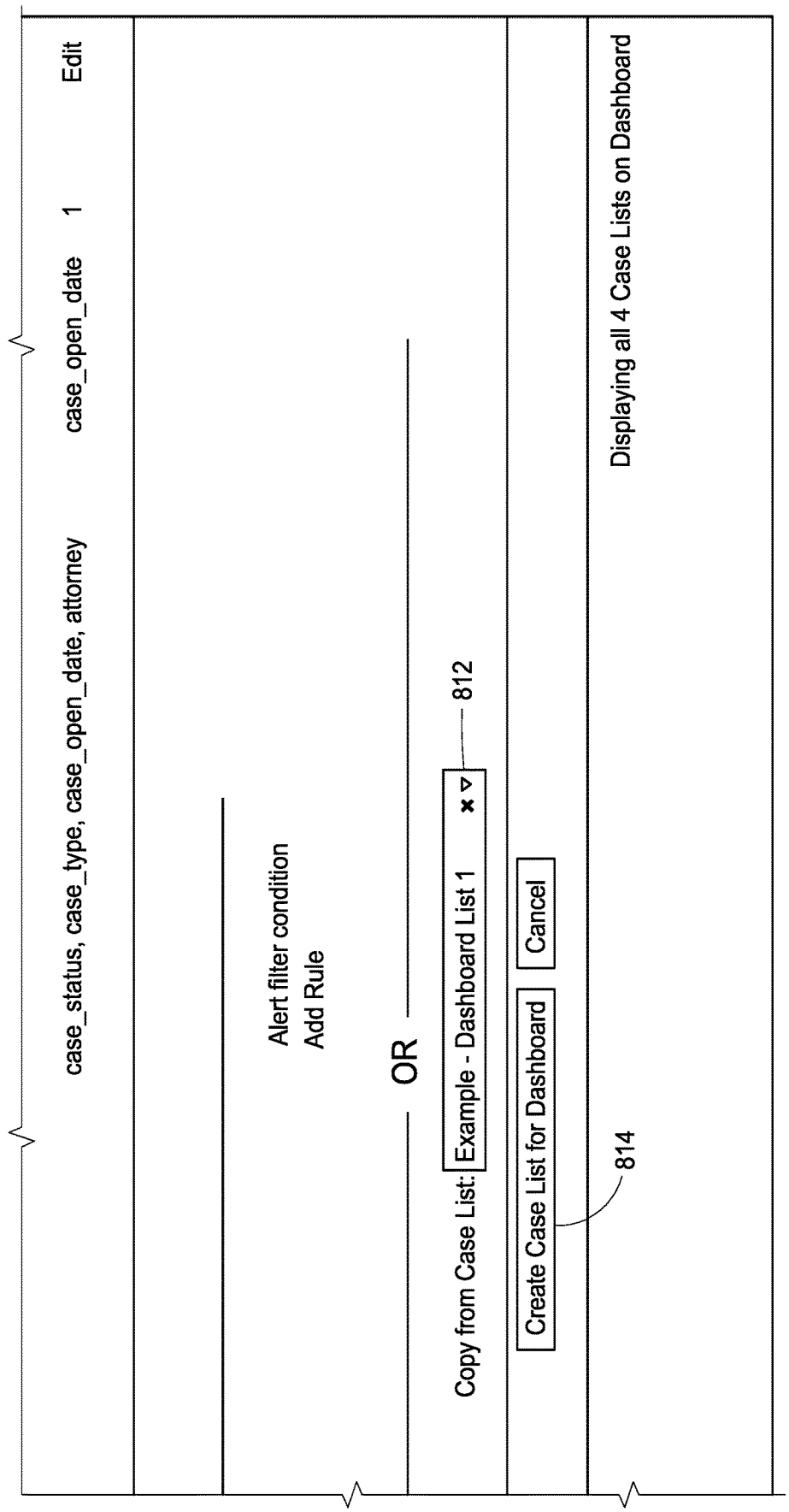
Figure 31B:
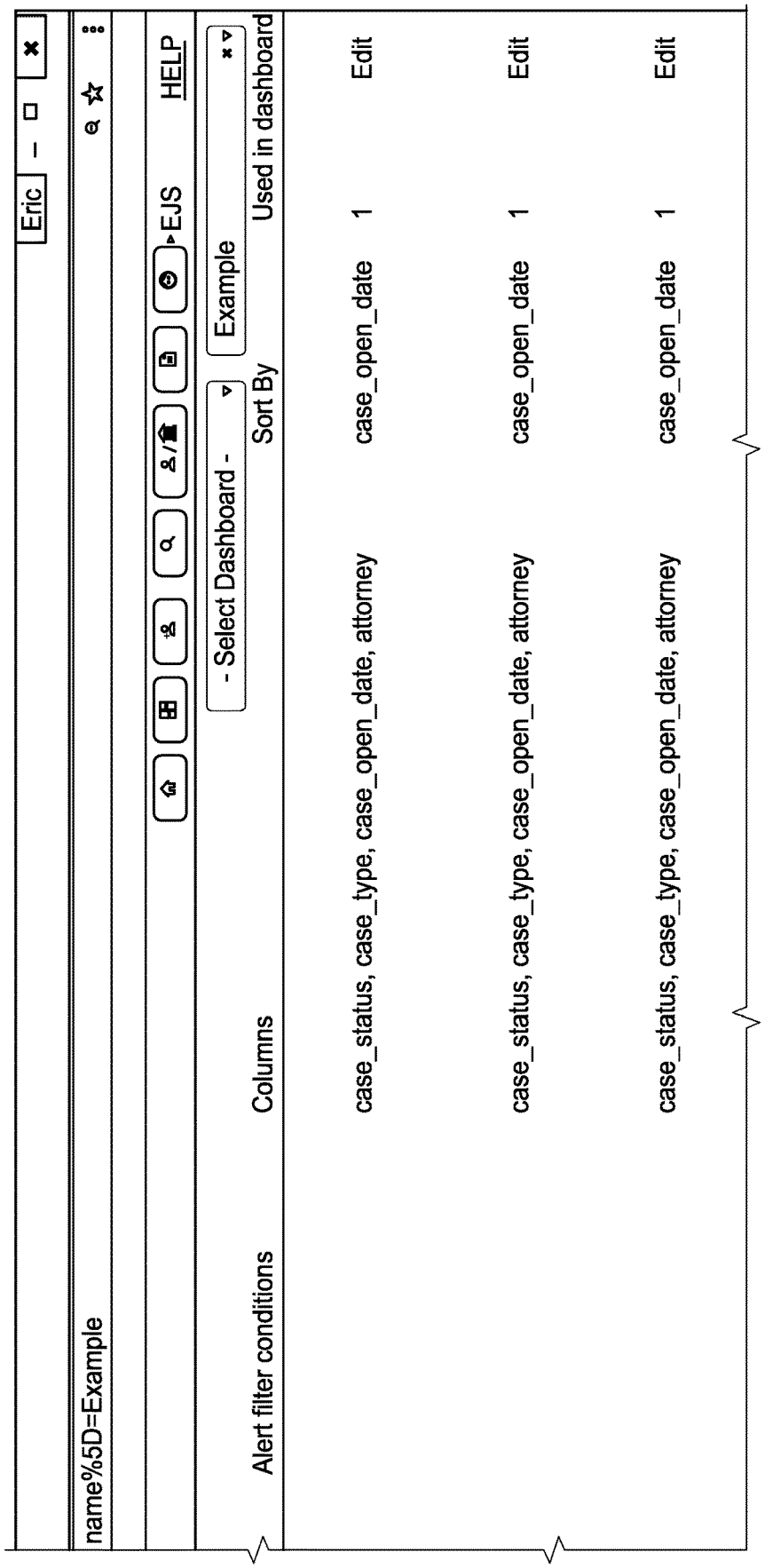
Figure 31C:
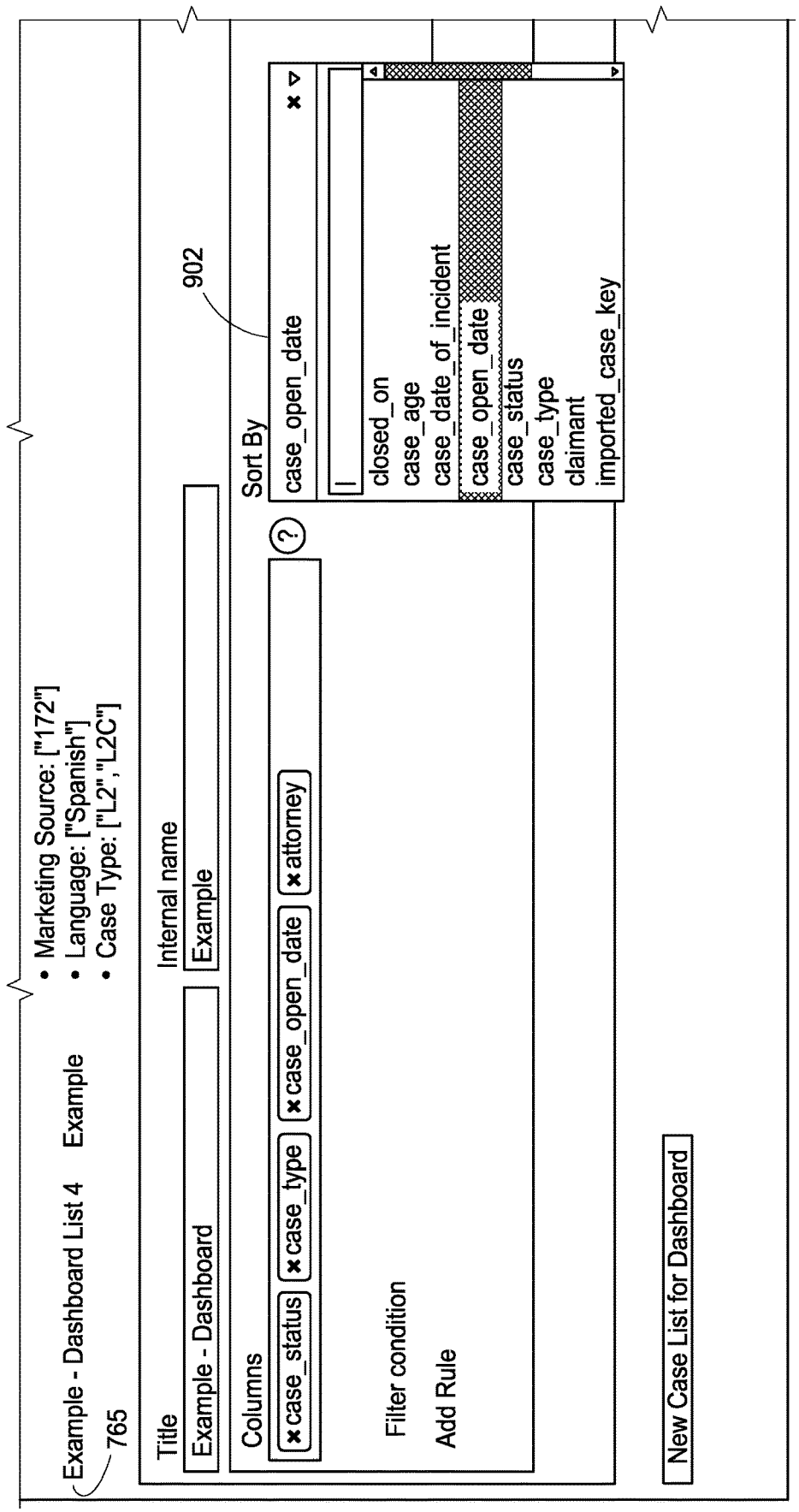
Figure 31D:
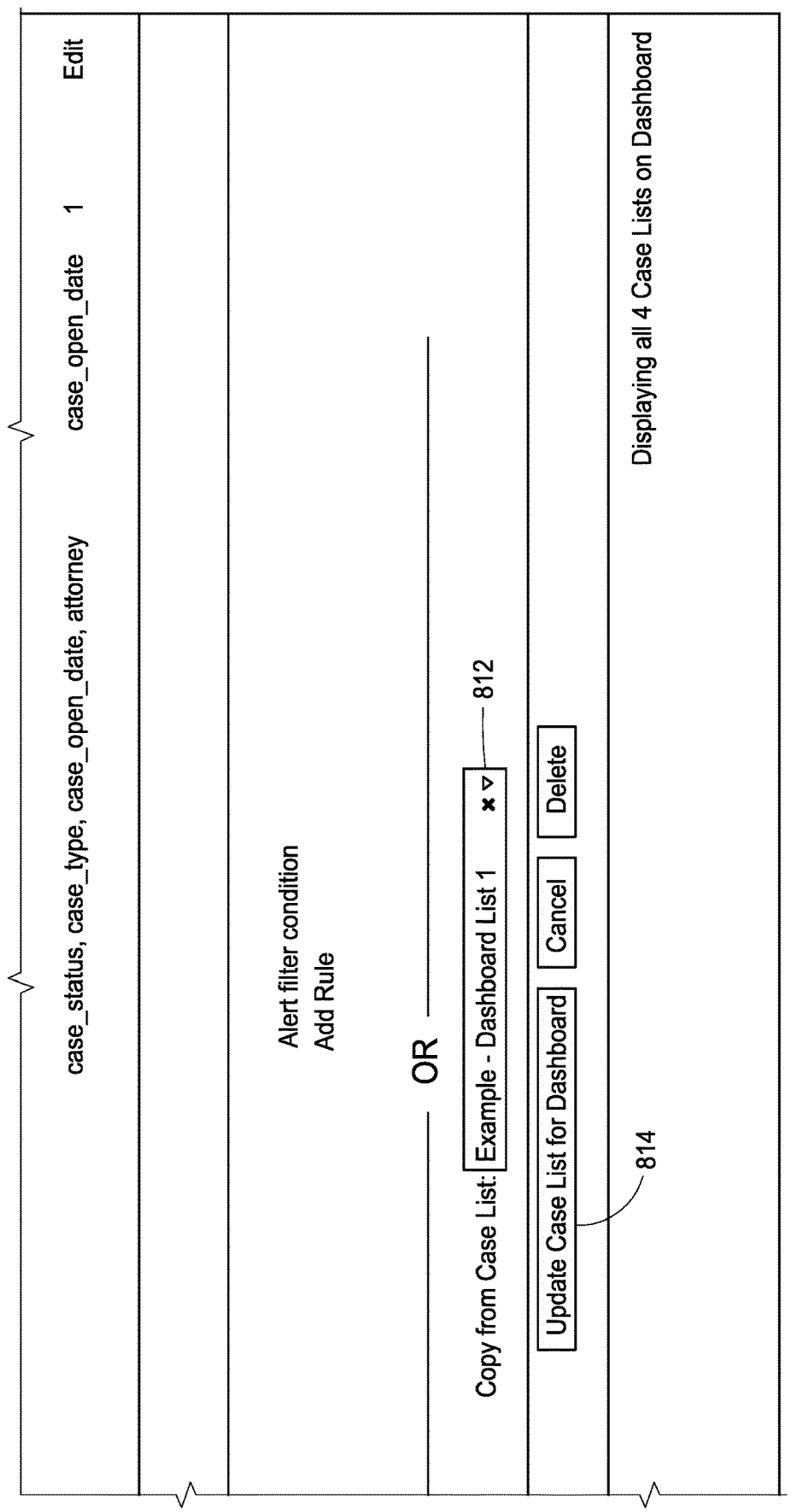
Figure 32A:
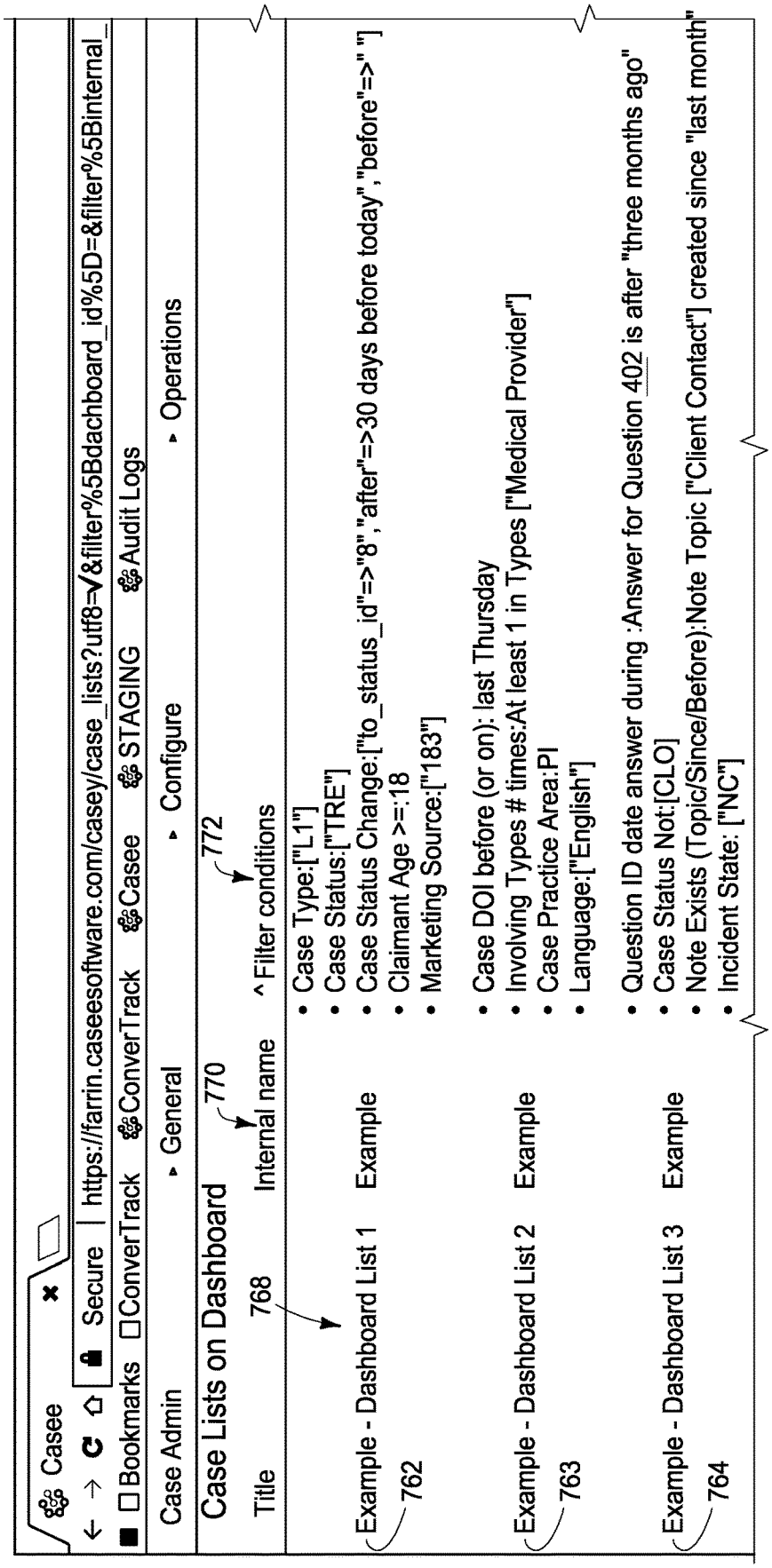
FIGS. 32A, 32B, 32C, and 32D are to be assembled.
Figure 32B:
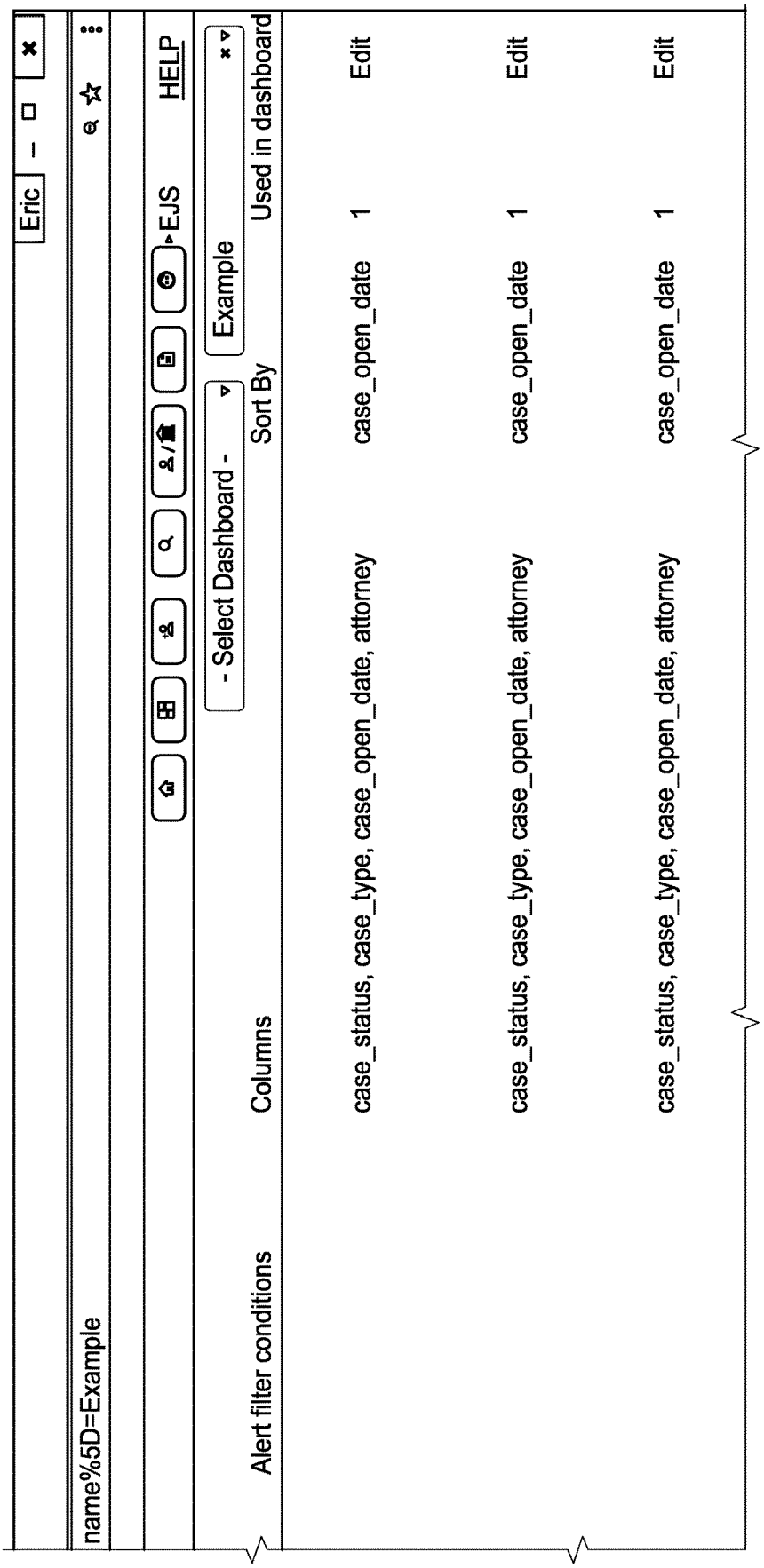
Figure 32C:
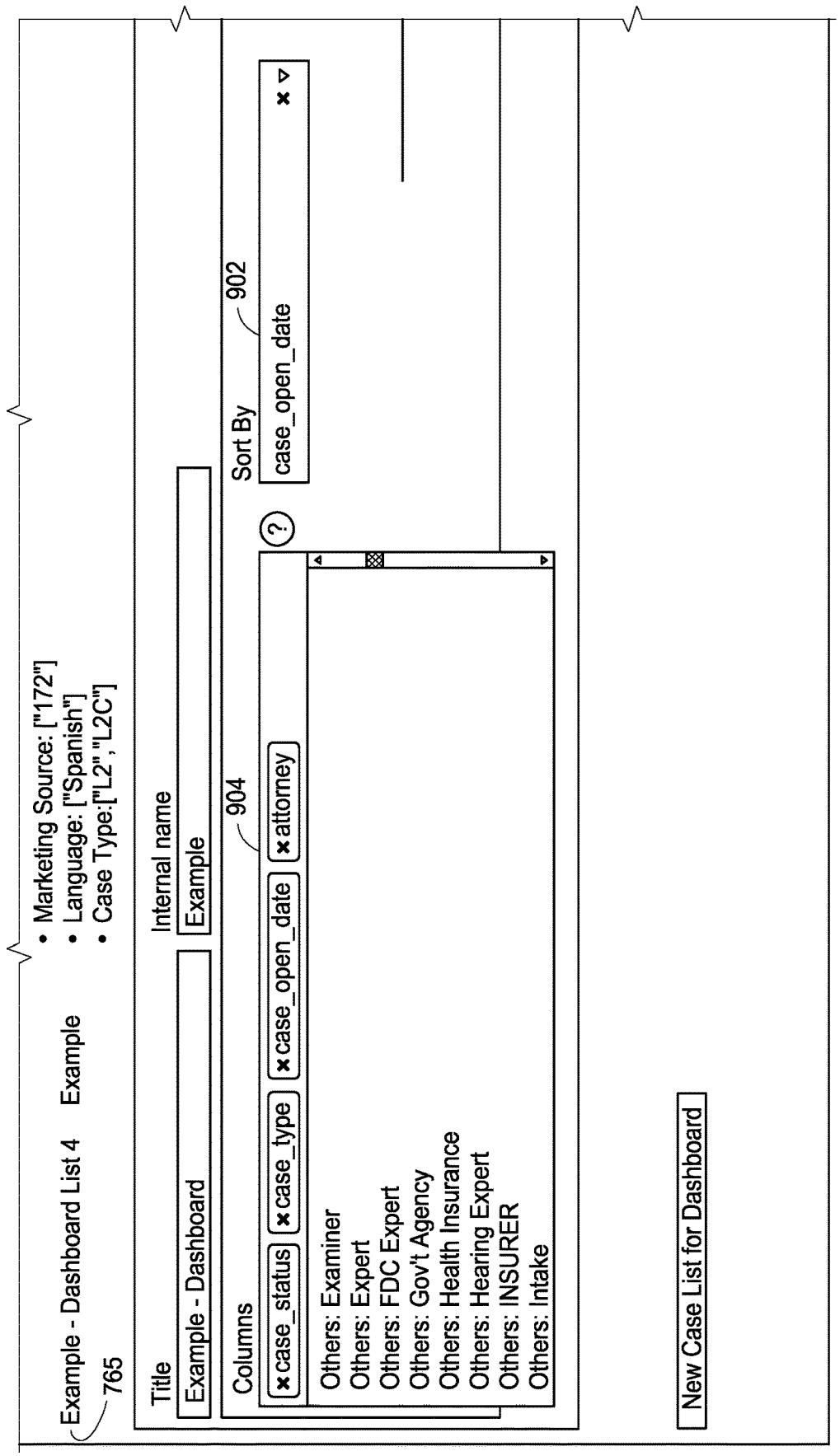
Figure 32D:
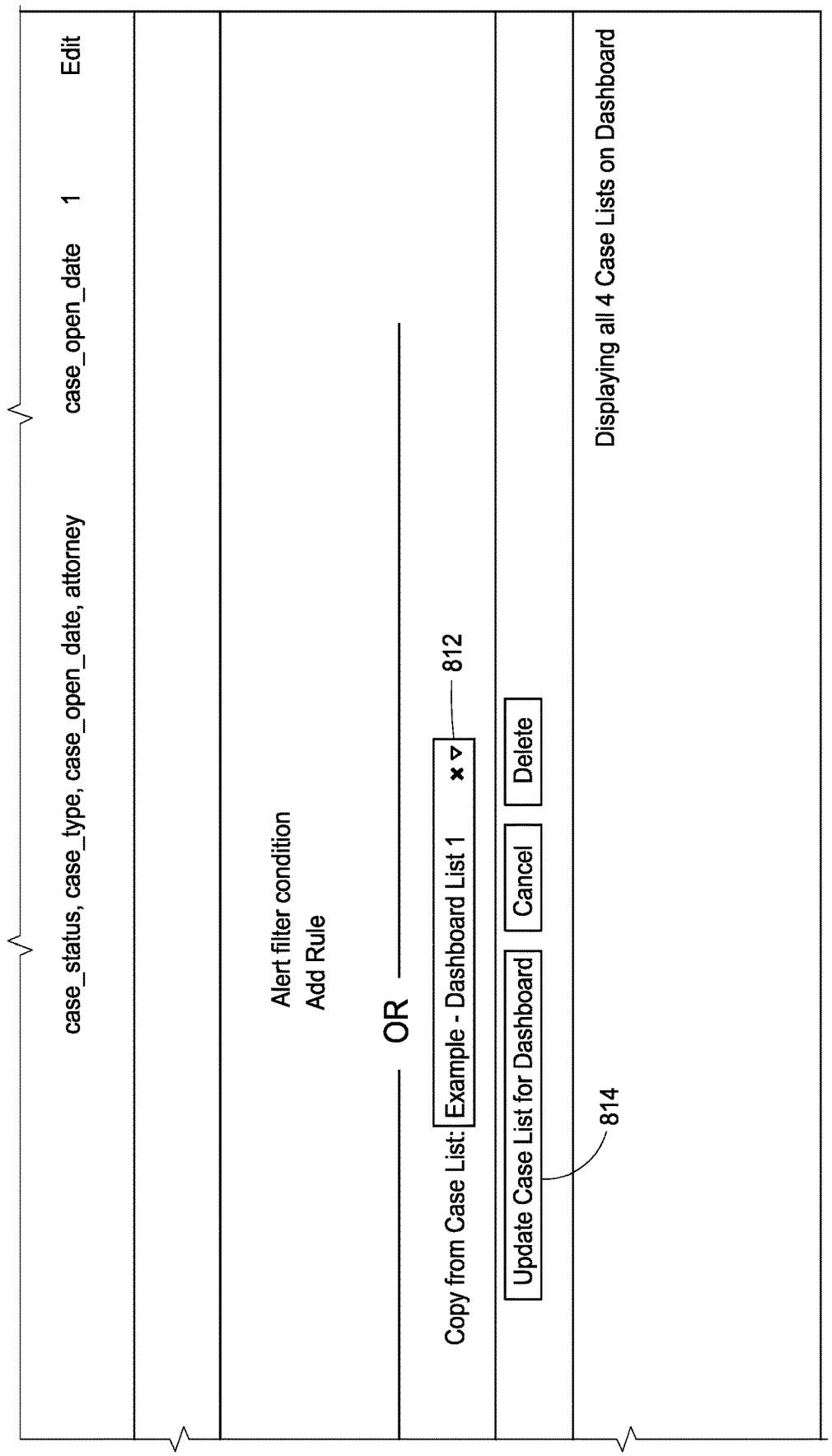
Figure 33B:
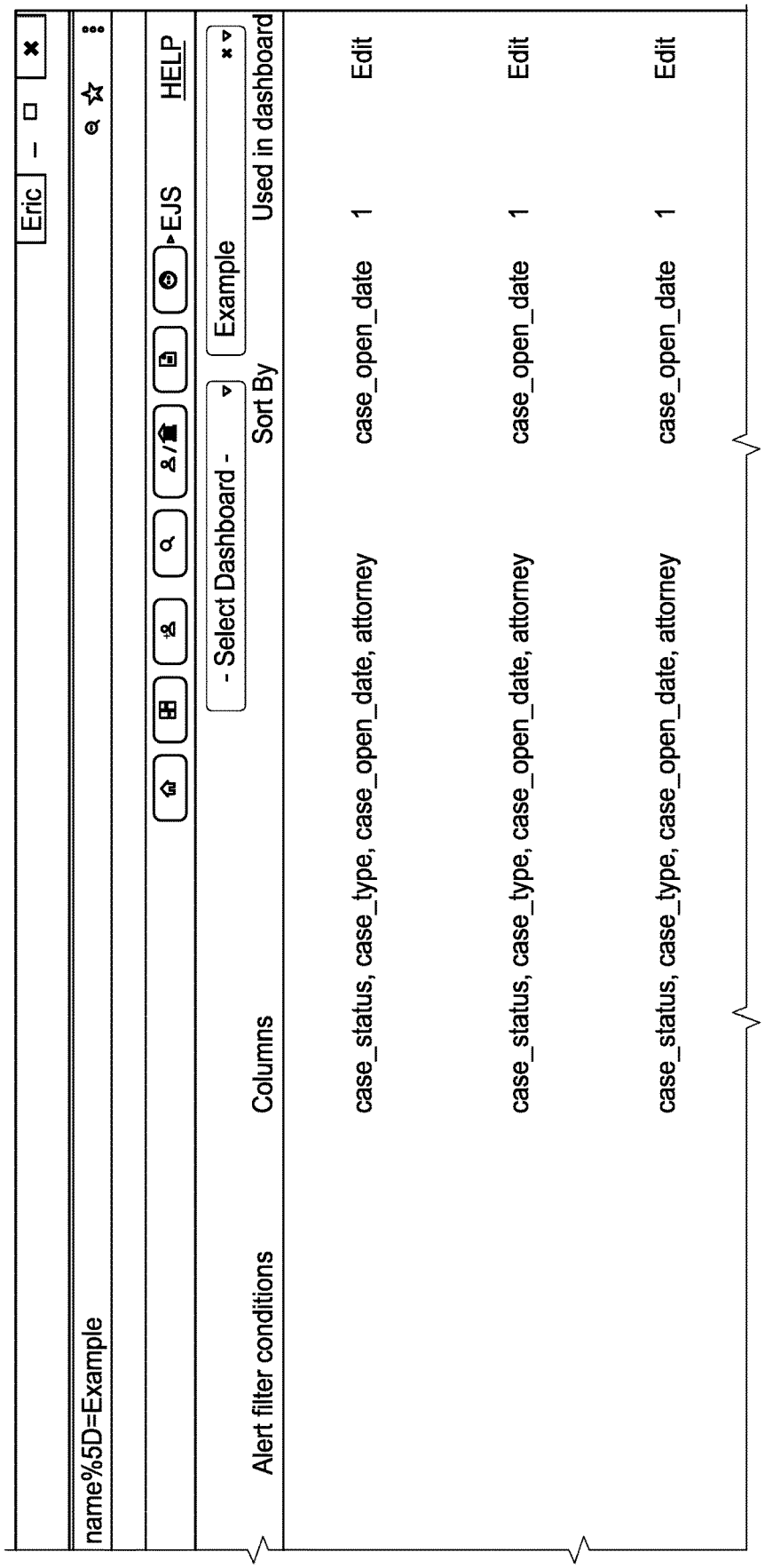
Figure 33D:
Figure 34A:
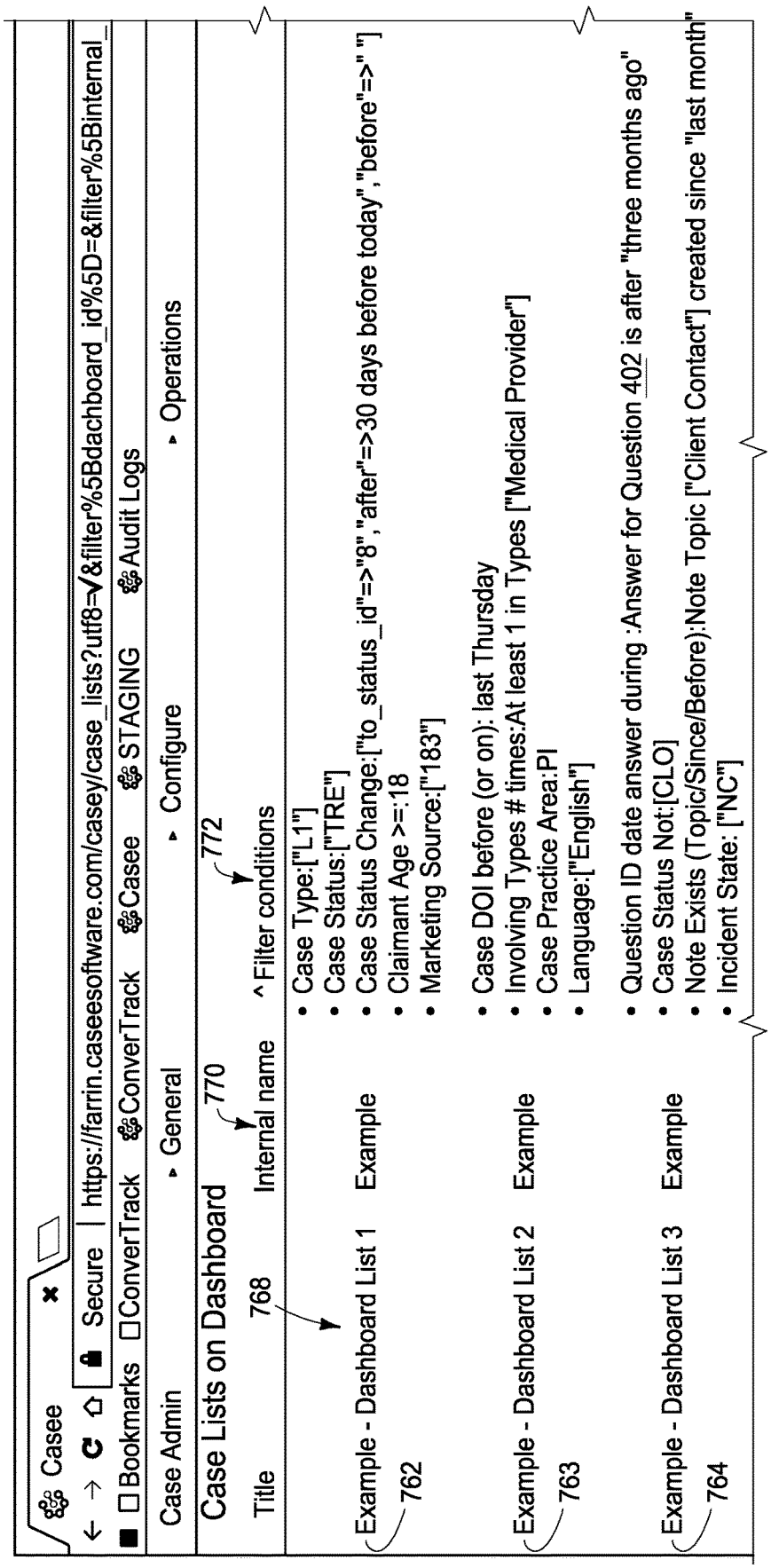
Figure 34:
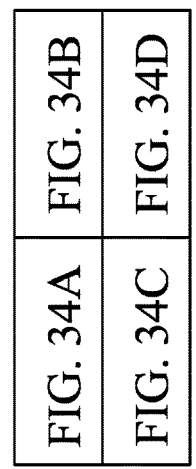
FIG. 34 is a map illustrating how
Figure 34B:
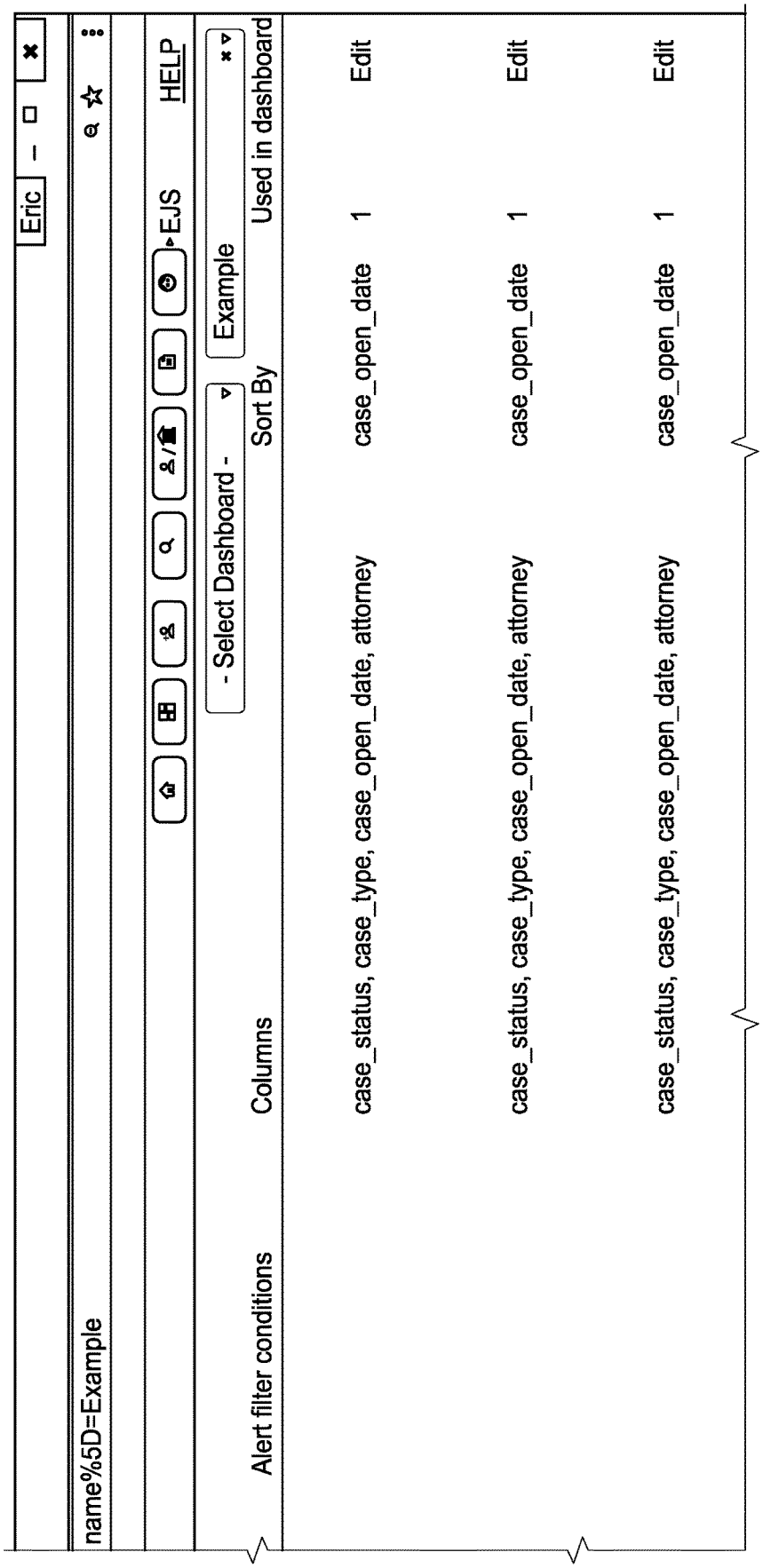
Figure 34D:
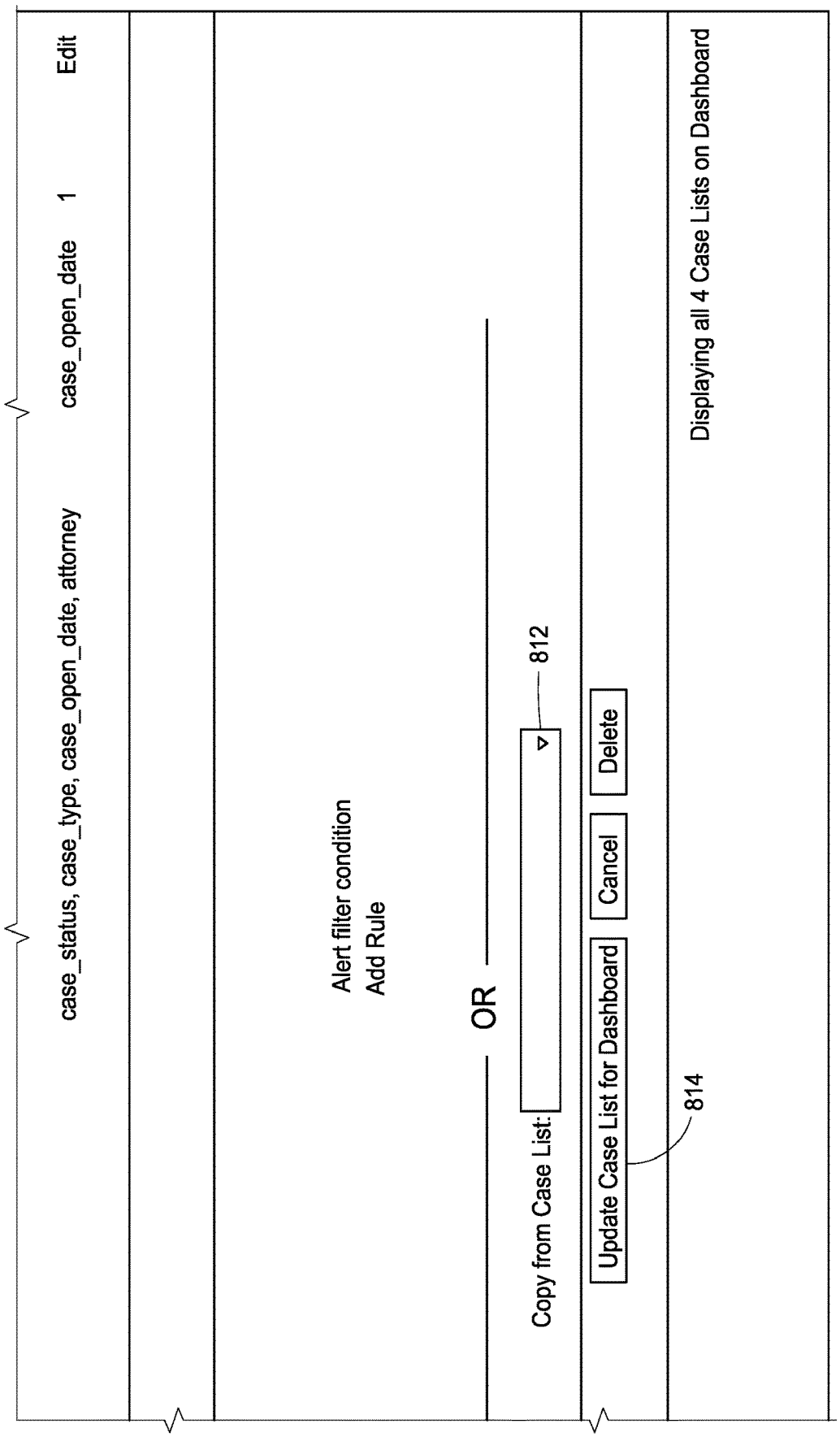
Figure 35A:
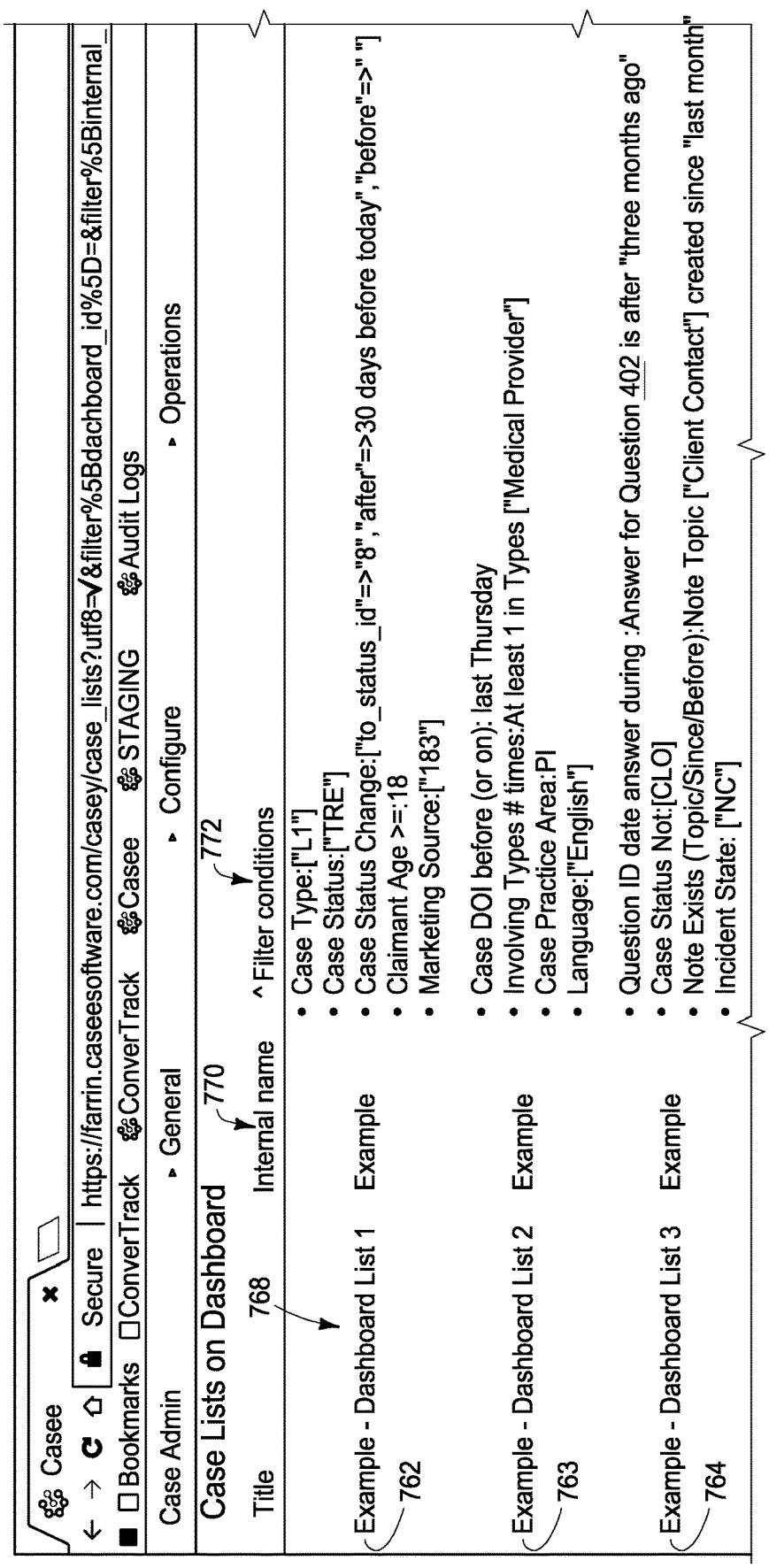
Figure 35B:
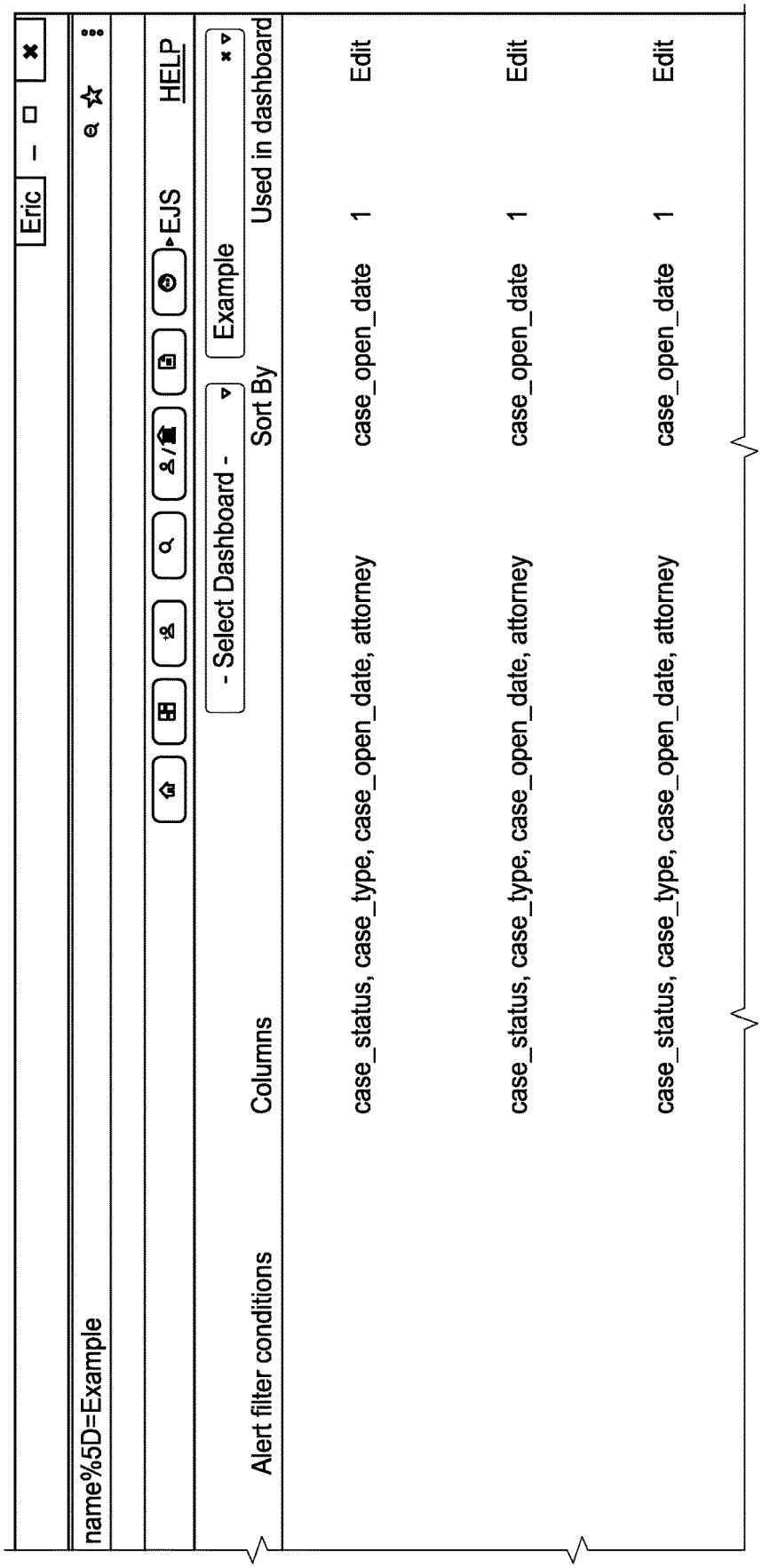
Figure 35D:
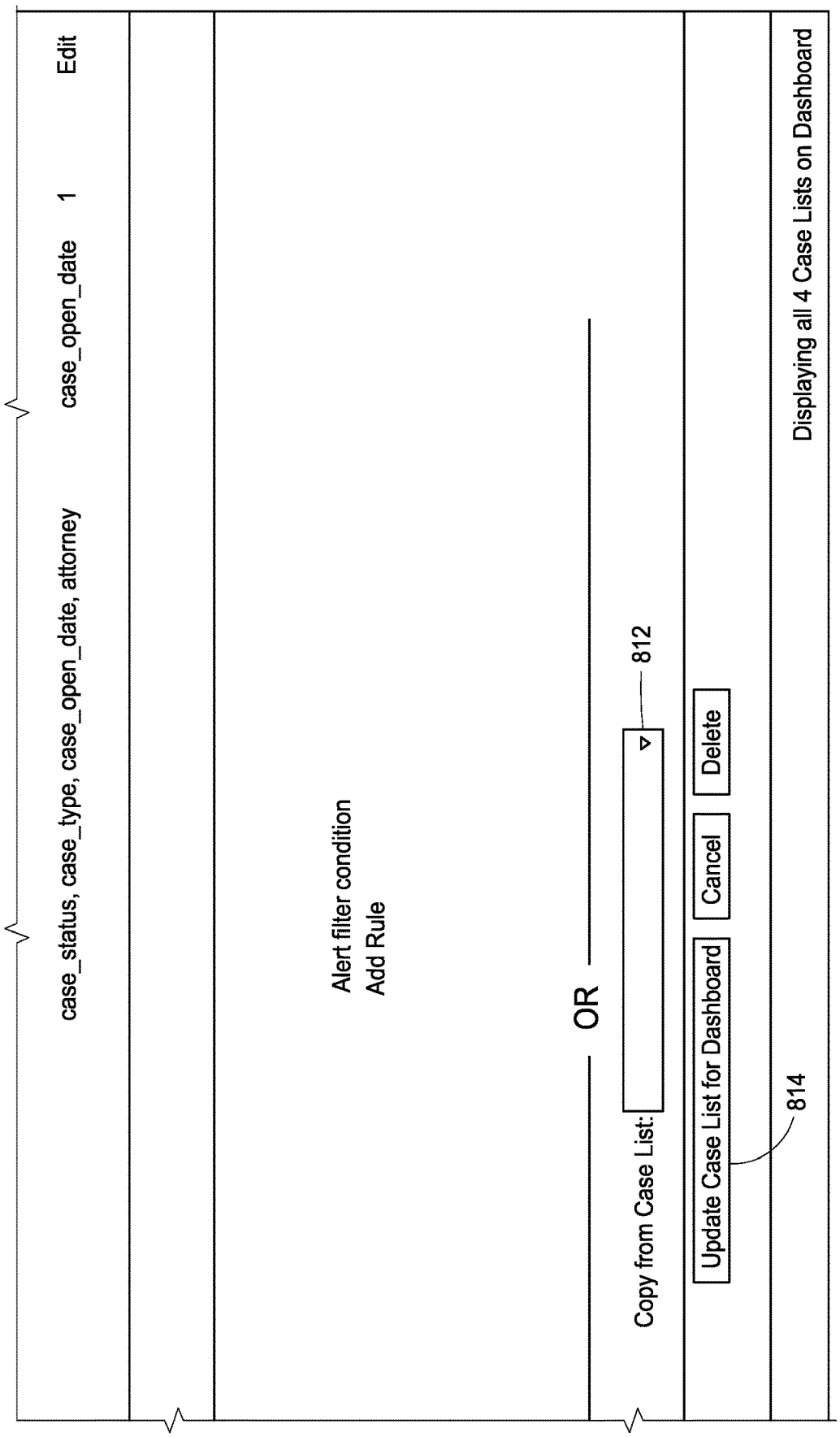
Figures 36, 36A:
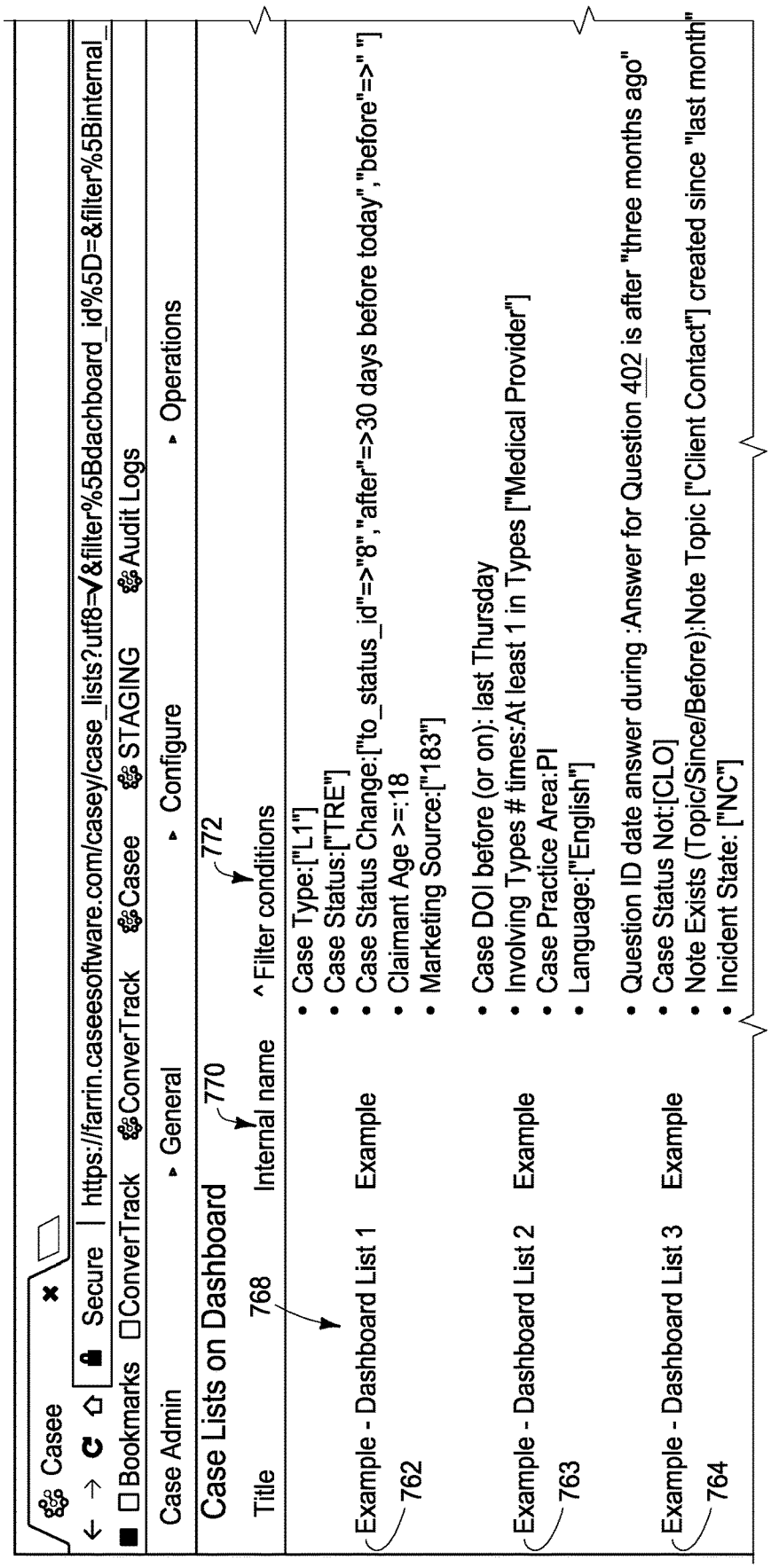
FIG. 36 is a map illustrating how
FIGS. 36A, 36B, 36C, and 36D are to be assembled.
Figure 36B:
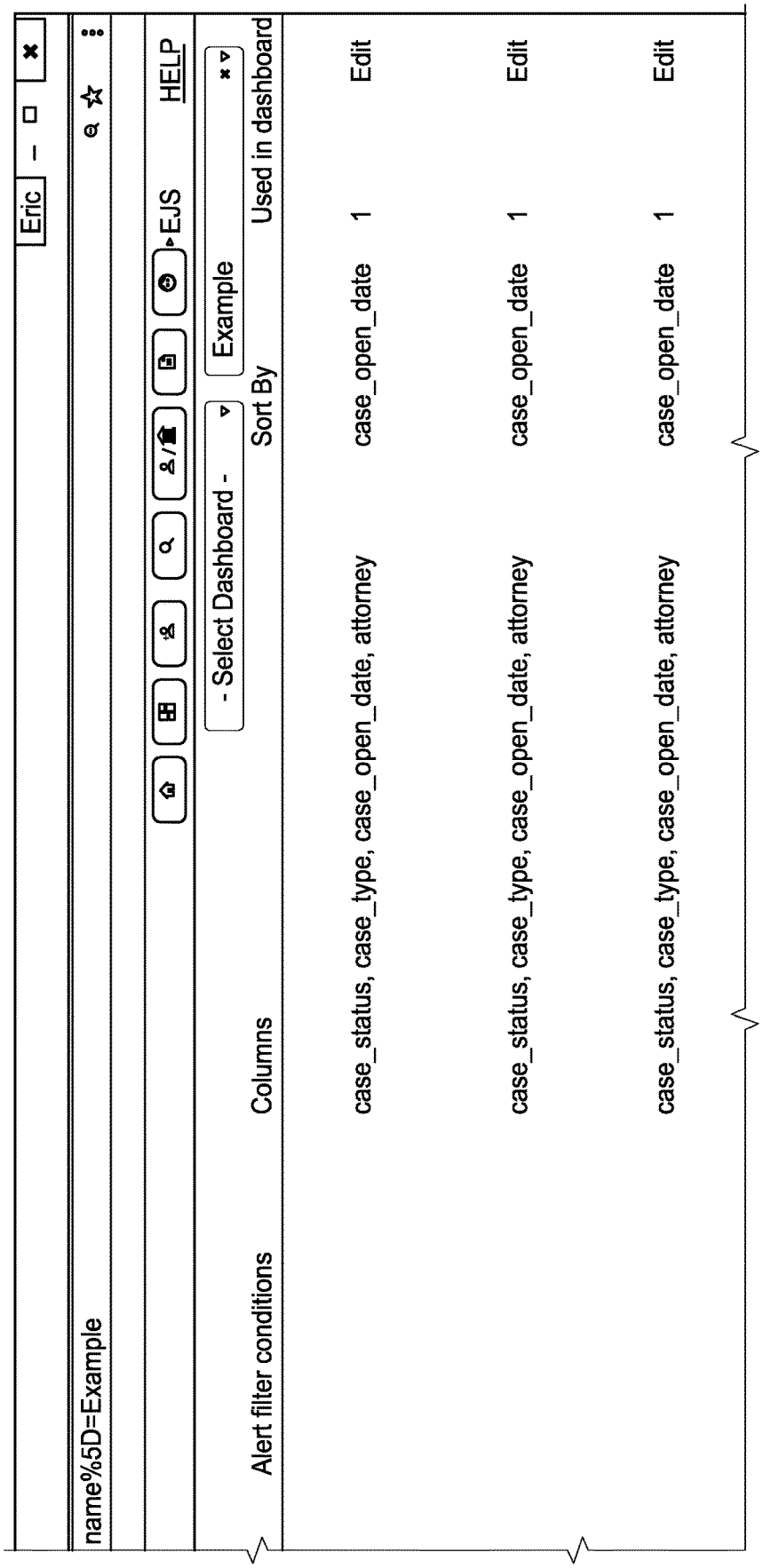
Figure 36C:
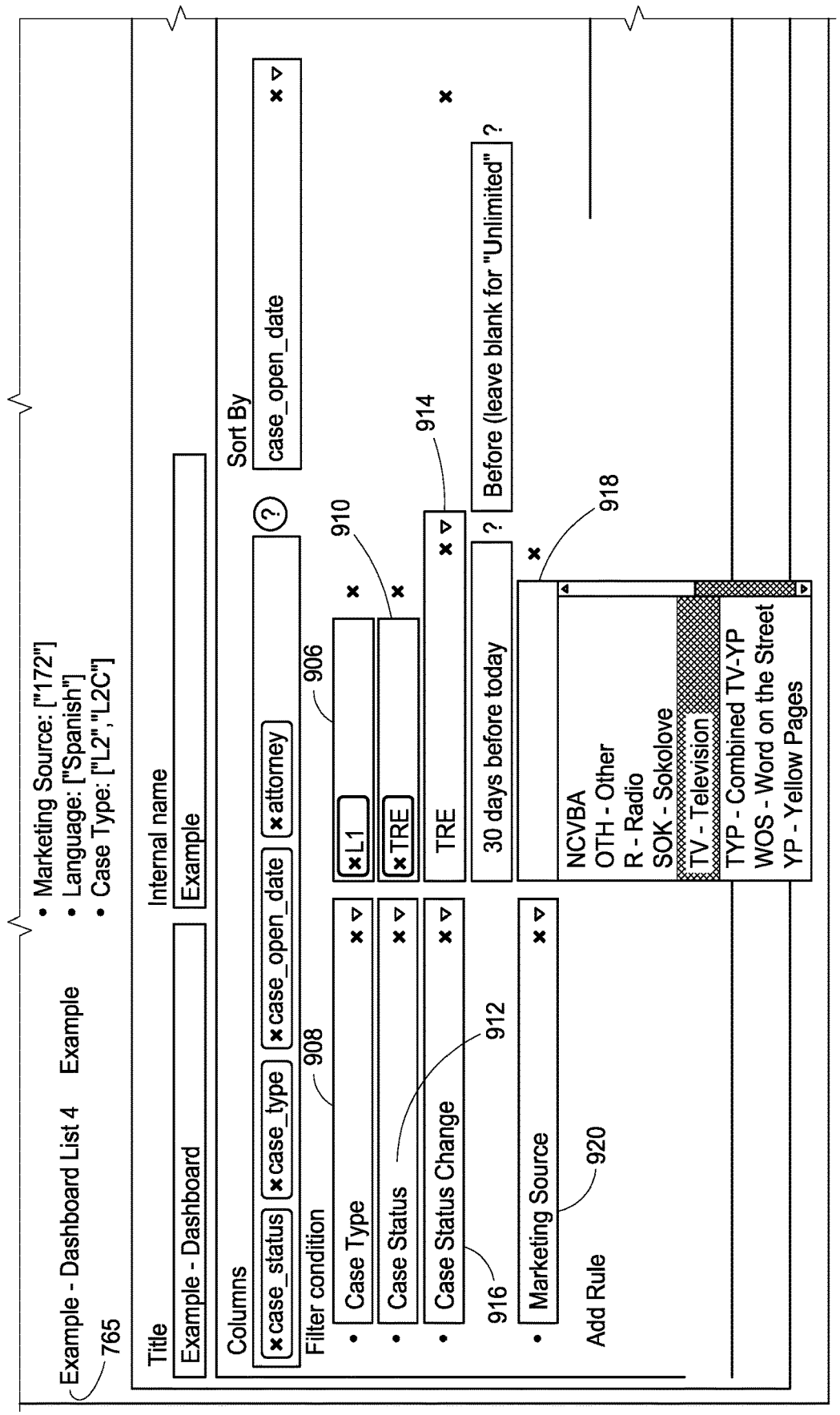
Figure 36D:
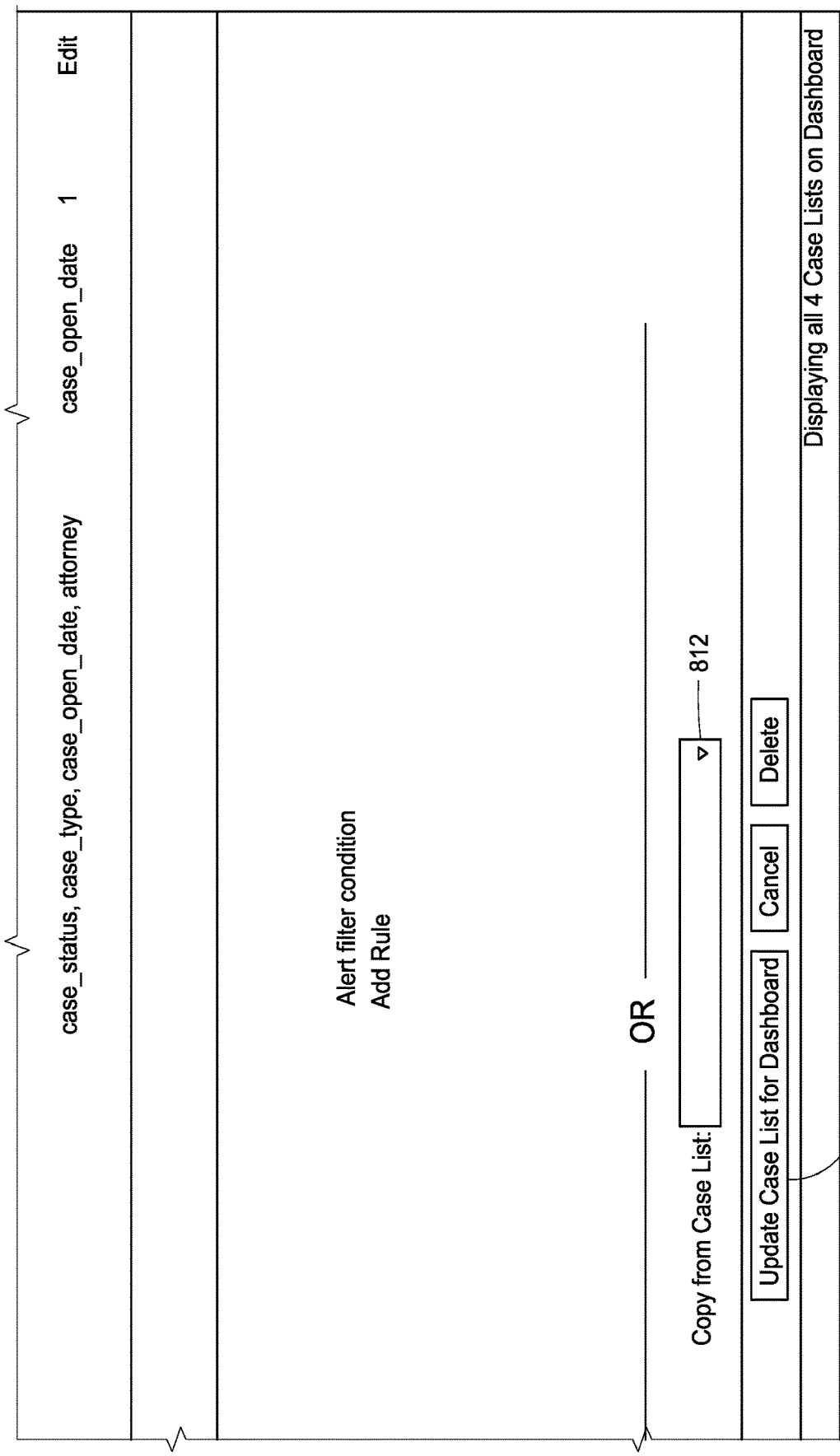

FIGS. 30A, 30B, 30C and 30D illustrate a graphical user interface screen 820, similar to the screens 760 and 790, except showing how dashboard list definition 765 is added. As shown in FIGS. 31A, 31B, 31C, and 31D, a case rule pull down menu 902, corresponding to pull down menu 802 of FIGS. 29A and 29B, is pulled down from the graphical user interface of FIGS. 30A and 30B by a user. FIGS. 32A, 32B, 32C, and 32D show a second case pull down menu 904 being pulled down from the graphical user interface of FIGS. 30A and 30B.

FIGS. 33A, 33B, 33C, and 33D show a rule being added to the definition 765 using pull down menus 906 and 908. In the illustrated embodiments, a rule is being added that requires a case type to be "L1" or level one to appear in the list defined by definition 765.

FIGS. 34A, 34B, 34C, and 34D show another rule, relating to case status in the illustrated embodiments, being added to the definition 765 using pull down menus 910 and 912.

FIGS. 35A, 35B, 35C, and 35D show yet another rule, relating to case status change in the illustrated embodiments, being added to the definition 765 using pull down menus 914 and 916.

FIGS. 36A, 36B, 36C, and 36D show yet another rule, relating to a marketing source in the illustrated embodiments, being added to the definition 765 using pull down menus 918 and 920.

While various specific graphical user elements have been shown and described, just as pull down menus, hyperlinks, text boxes, checkboxes, etc., other types of graphical user interface elements that perform similar functions could be employed.

To better enable one of ordinary skill in the art to make and use a screening tool without undue experimentation, pseudo code will now be provided that could be employed in some embodiments. This is provided as an example, only. The screening tool could be built in other ways and still achieve the desired functionality.

```
Intake Question Scoring Rules and Conditions Administration

Background
  Each Intake belongs to a "Specialty", e.g. Auto or WC
  Each intake Specialty has a set of questions (collectively known as the intake
  questionnaire)
Scoring Rule Administration
  Select a Specialty
  Click button to Create Scoring Rule
    Give the rule a name or description and a numeric score
    Add one or more Conditions
      Note: ALL conditions must apply for rule to kick in
    Offer a list of questions (for the specialty) to select to which this rule will
    apply
    Depending on the type of question, present match options:
    In or Not in
      If question type is text, get a text answer
      If question type is a select, with options, show the options that
      can be selected
    Is or Is not
    Within or Not Within days (date range)
      before (select list of other Date questions for the specialty)
      (use <0 for "days after"; e.g. "–10 . . . –Infinity" is valid)
    <other question types>
    <details>
Intake Answer Automatic Scoring Process
  Intake create (or edit)
    Initialize auto saving
      Javascript JQuery .on("change") event handler
      POST input params to the server on each input value change via
      AJAX
    Enter answer input field
      Edit answer value
      Auto save on input change
      Auto save post action triggers the Intake model update
  Intake model
    Update action/method
      answers_attributes received in update and set on the model
      update attributes triggers a save (to the database)
      save triggers registered callbacks
    before_save callback
      calls set_score method
      set_score method
        sets the intake (self) score by calling the ScoringRule model
        score_for method
  ScoringRule model
    score_for method
      input parameter is the intake
      calls applicable_to method
    applicable_to method
      input parameter is the intake
      Calls candidates_for_intake scope
        candidates_for_intake scope
          Returns all the ScoringRule records in the database that
          apply to any of the questions for the intake:
          Collect the answers that exist for the intake
          Collect the associated questions for those
          answers
          Collect the scoring_rule_conditions that exist
          for all of those questions
          Collect and return all scoring_rules for the set
          of scoring_rule_conditions
```

| Intake Question Scoring Rules and Conditions Administration |
| --- |

```
        For each scoring_rule that candidates_for_intake returns:
            Collect the rules that "match" the intake (see match below)
            Sum the scoring_rule scores for those that "match"
        match? method
            Input parameter is the intake
            The scoring_rule is a match, or applies to the intake, if *ALL* of the
            scoring_rule_conditions for the rule match
            (See ScoringRuleCondition match method)
        ScoringRuleCondition model
            match? method
                input parameter is an answer
                    answer belongs_to the intake
                    answer also belongs_to a question
                    The condition belongs to a question
                    The answer must belong to the same question as the
                    condition
                The answer value must equal the condition value
                    or match one of a set of condition values
                    or falls into the condition range (for dates and numbers)
            The resulting score is saved in the intake
                Note: The ScoringRule score_for method essentially re-calculates the intake
                score for ALL rules after every individual answer is updated. Thus, any other
                rule that could be co-dependent on the answer being updated is also
                considered.
#ScoringRule class code
class ScoringRule < ActiveRecord::Base
    has_many :scoring_rule_conditions, inverse_of: :scoring_rule, dependent: :destroy
    scope :candidates_for_intake, ->(intake){
        joins(scoring_rule_conditions).where('scoring_rule_condition.question_id' =>
intake.answers.pluck(question_id)).uniq
    }
    def match?(intake)
        #for each scoring_rule_condition there is a matching answer
        scoring_rule_conditions.all?{|c|
        intake.answers.detect{ |a| c.match?(a) }
    }
    end
    def self.applicable_to(intake)
        candidates_for_intake(intake).includes(:scoring_rule_conditions =>:question).
select{|rule|
        rule.match?(intake)
    }
    end
    def self.score_for(intake)
        self.applicable_to(intake).map(&:score).inject(&:+)
    end
end
```

Thus, systems and methods have been provided for a user to develop and define their own scoring values to define complex systems for decision-making. In some embodiments, the systems and methods can be used to evaluate legal causes of action and to decide whether or not to accept a client. Alternatively, the systems and methods can be used for other applications that require decision-making based on a number of input parameters.

Without the screening tool, a human would have to review each Intake and assign a value based on rules. Alternatively, a programmer would have to manually write code to express each rule and condition, and to perform the test. Additionally, the programmer would be faced with "hard coding" references to the intake questionnaire questions, thereby making the resulting code brittle and subject to breakage when and if questions were added, updated, or deleted. This quickly would become unruly code and un-maintainable.

Consider for example a very straightforward screening rule named "Passenger?" that applies a weighting value to an intake depending on whether or not the potential client was a Passenger in an Auto accident.

Without the screening tool, a programmer would have to write code to test this single rule and condition. This pseudo code would look something like this:

IF the intake questionnaire has the question named "Were you the Passenger, Driver, or Pedestrian?" THEN;
IF the answer equals "Passenger" THEN add 25 to the intake score value;
END IF Another Auto intake rule named "Date of first treatment less than 2 weeks", that has two conditions (A and B) where the pseudo code would look something like this:
Condition A would be:
True IF AND ONLY IF the intake questionnaire has the question named "Were you the Passenger, Driver, or Pedestrian?"
AND the answer equals "Driver" or "Passenger" or "Pedestrian" THEN
Condition B would be:
True IF AND ONLY IF the intake questionnaire has the question named "Date of first treatment"
AND the answer date is greater than 6 days of the date supplied in response to the "Intake Date" question
AND the answer date is less than 13 days of the date supplied in response to the "Intake Date" question
IF A and B are true THEN add score value 10 to Intake score.

Multiply the code fragments above by, for example, over 120 rules and it becomes apparent that this would be a burdensome task with hard to maintain code.

While certain functions are illustrated as being performed in certain blocks, it should be understood that various functions may be performed in other blocks or in a combination of blocks. The blocks do not necessarily correspond to software functions or routines, to integrated circuits or to circuit blocks. Multiple blocks may be defined by a single function, routine or integrated circuit or a single block may be defined by multiple functions, routines or integrated circuits.

While some embodiments disclosed herein are implemented in software, alternative embodiments comprise hardware, such as hardware including digital logic circuitry. Still other embodiments are implemented in a combination of software and digital logic circuitry.

Various embodiments comprise a computer-usable or computer-readable medium, such as a hard drive, solid state memory, flash drive, floppy disk, CD (read-only or rewritable), DVD (read-only or rewritable), tape, optical disk, floptical disk, RAM, ROM (or any other medium capable of storing program code excluding a carrier wave or propagation signal) bearing computer program code which, when executed by a computer or processor, or distributed processing system, performs various of the functions described above.

Some embodiments provide a carrier wave or propagation signal embodying such computer program code for transfer of such code over a network or from one device to another. The term "non-transitory," if used in the claims, is meant to exclude only such a carrier wave or propagation signal. In compliance with the patent laws, the subject matter disclosed herein has been described in language more or less specific as to structural and methodical features. However, the scope of protection sought is to be limited only by the following claims, given their broadest possible interpretations. The claims are not to be limited by the specific features shown and described, as the description above only discloses example embodiments.

We claim:

1. A system comprising:
   a PBX configured to be coupled to at least one phone line;
   an OAI gateway coupled to the PBX server and configured to provide an interface between the PBX and a network;
   a main server coupled to the OAI gateway via the network, and configured to be accessed by client workstations, the main server including:
      an OAI listener coupled to the OAI gateway;
      a notification server coupled to the OAI listener;
      a memory defining a database and coupled to the OAI listener; and
      an intake application server coupled to the database;
   the main server being configured to present to a workstation a user-fillable intake form having a plurality of questions, and the main server configured to receive answers to the questions from the workstation, and to present a score total to the workstation indicating whether to accept the potential customer, the score total varying depending on the received answers; the main server being configured to provide, to the workstation, an interface which an administrator can use to create a screening rule by defining a question for the intake form, by providing potential answers to the question, and by providing different scores for the respective different potential answers; the system being configured to perform an automated action in response to the score total being at least one of above and below a predetermined threshold value.

2. A system in accordance with claim 1 wherein an administrator can use the interface to define the question by specifying a question name and by choosing a question type from a plurality of predetermined possible types, the question appearing on the intake form.

3. A system in accordance with claim 2 wherein the question types comprise at least three of the following: yes-no, text, number, date, and select one.

4. A system in accordance with claim 1 wherein an administrator can use the interface to create the screening rule by adding at least one condition and entering a rule score to be applied if all conditions of the screening rule are met, the rule score being used as a component to calculate the total score, wherein adding a condition comprises:
   selecting a question from a list of questions;
   selecting an operator from a list of operators; and
   selecting a response from a list of responses, and choosing a question type from a plurality of predetermined possible types.

5. A system in accordance with claim 4 wherein the interface further includes an element which, when actuated, causes fields to be presented on the interface for creating an additional condition.

6. A system in accordance with claim 1 wherein the automated action comprises sending an email.

7. A system in accordance with claim 1 wherein the automated action comprises sending an email accepting or declining the potential customer.

8. A system in accordance with claim 1 wherein the automated action comprises sending a fax.

9. A system in accordance with claim 1 wherein the automated action comprises sending a fax accepting or declining the potential customer.

10. A system comprising:
   a PBX configured to be coupled to at least one phone line having multiple different channels to receive incoming phone calls from potential customers, the different channels coupling to the PBX different phone numbers to be called by potential customers;
   an OAI gateway coupled to the PBX server and configured to provide an interface between the PBX and a network;
   a server coupled to the OAI gateway via the network, and configured to be accessed by client workstations, the server including:
      an OAI listener coupled to the OAI gateway; and
      a memory defining a database and coupled to the OAI listener;
   the server being configured to present to a workstation a user-fillable intake form having a plurality of questions, the form varying depending on the phone number called by the potential customer, and the server configured to receive answers to the questions from the workstation, and to present a score total to the workstation indicating whether to accept the potential customer, the score total varying depending on the received answers; the server being configured to provide, to the workstation, an interface which an administrator can use to create a screening rule by defining a question for the intake form, by providing potential answers to the question, and by providing different scores for the respective different potential answers;

the system being configured to perform an automated action in response to the score total being at least one of above and below a predetermined threshold value.

11. A system in accordance with claim 10 wherein an administrator can use the interface to define the question by specifying a question name and by choosing a question type from a plurality of predetermined possible types, the question appearing on the intake form.

12. A system in accordance with claim 11 wherein the question types comprise at least three of the following: yes-no, text, number, date, and select one.

13. A system in accordance with claim 10 wherein an administrator can use the interface to create the screening rule by adding at least one condition and entering a rule score to be applied if all conditions of the screening rule are met, the rule score being used as a component to calculate the total score for indicating the desirability of the potential customer, wherein adding a condition comprises:
 selecting a question from a list of questions;
 selecting an operator from a list of operators; and
 selecting a response from a list of responses, and choosing a question type from a plurality of predetermined possible types.

14. A system in accordance with claim 13 wherein the interface further includes an element which, when actuated, causes fields to be presented on the interface for creating an additional condition.

15. A system in accordance with claim 13 wherein the potential customer is a potential client of a law firm, and wherein the database includes client records containing information about various communications between the potential client and a law firm.

16. A system comprising:
 a PBX configured to be coupled to at least one phone line;
 an OAI gateway coupled to the PBX server and configured to provide an interface between the PBX and a network;
 a server coupled to the OAI gateway via the network, and configured to be accessed by client workstations, the server including:
  an OAI listener coupled to the OAI gateway; and
  a memory defining a database and coupled to the OAI listener;
 the server being configured to present to a workstation a user-fillable intake form having a plurality of questions, and the server configured to receive answers, input by a clerk, to the questions from the workstation, and to present a score total to the workstation indicating the desirability of the potential customer, the score total varying depending on the received answers; the server being configured to provide, to the workstation, an interface which an administrator can use to create a screening rule by adding at least one condition and entering a rule score to be applied if all conditions of the screening rule are met, the rule score being used as a component to calculate the total score for indicating the desirability of the potential customer, the server being configured to authenticate the administrator and the clerk with user IDs and passwords and being configured to provide greater access to the database to the administrator than to the clerk, wherein adding a condition includes:
 selecting a question from a list of questions, the list including the intake form questions;
 selecting an operator from a list of operators; and
 selecting a response from a list of responses, and choosing a question type from a plurality of predetermined possible types.

17. A system in accordance with claim 16 and configured to perform an automated action in response to the score being at least one of above and below a predetermined threshold value.

18. A system in accordance with claim 16 wherein an administrator can use the interface to create a question for the list of questions by specifying a question name and by choosing a question type from a plurality of predetermined possible types, the question appearing on the intake form.

19. A system in accordance with claim 18 wherein the question types comprise at least three of the following: yes-no, text, number, date, and select one.

20. A system in accordance with claim 16 wherein the interface further includes an element which, when actuated, causes fields to be presented on the interface for creating an additional condition.

* * * * *